(12) United States Patent  
Anderson et al.

(10) Patent No.: US 6,609,200 B2  
(45) Date of Patent: Aug. 19, 2003

(54) METHOD AND SYSTEM FOR PROCESSING ELECTRONIC DOCUMENTS

(75) Inventors: Milton Anderson, Fair Haven, NJ (US); Frank Jaffe, Boston, MA (US); Chris Hibbert, Los Altos, CA (US); Jyri Virkki, Scott Vly, CA (US); Jeffrey Kravitz, Yorktown Heights, NY (US); Sheveling Chang, Cupertino, CA (US); Elaine Palmer, Goldens Bridge, NY (US)

(73) Assignees: Financial Services Technology Consortium, New York, NY (US); International Business Machines Corporation, Hawthorne, NY (US); Sun Microsystems, Inc., Palo Alto, CA (US); Clareon Corporation, Portland, ME (US); Telcordia Technologies, Inc., Morristown, NJ (US)

( * ) Notice: Subject to any disclaimer, the term of this patent is extended or adjusted under 35 U.S.C. 154(b) by 0 days.

(21) Appl. No.: 09/750,379

(22) Filed: Dec. 28, 2000

(65) Prior Publication Data

US 2001/0018739 A1 Aug. 30, 2001

Related U.S. Application Data

(63) Continuation of application No. 09/386,551, filed on Aug. 31, 1999, now Pat. No. 6,209,095, which is a continuation of application No. 08/994,636, filed on Dec. 19, 1997, now Pat. No. 6,021,202.
(60) Provisional application No. 60/033,896, filed on Dec. 20, 1996.

(51) Int. Cl.[7] .............................. H04L 9/32; G06F 17/27
(52) U.S. Cl. ........................ 713/176; 713/155; 713/160; 713/161; 713/181; 705/67
(58) Field of Search .............................. 713/156, 160, 713/161, 164, 165, 170, 175, 176, 181; 705/67; 380/51, 54, 216

(56) References Cited

U.S. PATENT DOCUMENTS

| | | | |
|---|---|---|---|
| 4,302,810 A | 11/1981 | Bouricius et al. | 364/200 |
| 4,423,287 A | 12/1983 | Zeidler | 178/22.08 |
| 4,823,264 A | 4/1989 | Deming | 364/408 |
| 5,005,200 A | 4/1991 | Fischer | 380/30 |

(List continued on next page.)

FOREIGN PATENT DOCUMENTS

| | | |
|---|---|---|
| EP | 0 542 298 A2 | 5/1993 |
| EP | 0 542 298 A3 | 5/1993 |
| EP | 0 542 298 B1 | 5/1993 |
| WO | WO 96/31965 | 10/1996 |

OTHER PUBLICATIONS

C. Kaufman et al., "Network Security: Private Communcation in a Public World," 1995, pp. 190–191.*

(List continued on next page.)

*Primary Examiner*—Justin T. Darrow
(74) *Attorney, Agent, or Firm*—Kevin A. Oliver; Foley, Hoag & Eliot LLP

(57) ABSTRACT

The invention includes a markup language according to the SGML standard in which document type definitions are created under which electronic documents are divided into blocks that are associated with logical fields that are specific to the type of block. Each of many different types of electronic documents can have a record mapping to a particular environment, such as a legacy environment of a banking network, a hospital's computer environment for electronic record keeping, a lending institution's computer environment for processing loan applications, or a court or arbitrator's computer system. Semantic document type definitions for various electronic document types (including, for example, electronic checks, mortgage applications, medical records, prescriptions, contracts, and the like) can be formed using mapping techniques between the logical content of the document and the block that is defined to include such content. Also, the various document types are preferably defined to satisfy existing customs, protocols and legal rules.

70 Claims, 40 Drawing Sheets

U.S. PATENT DOCUMENTS

| | | | |
|---|---|---|---|
| 5,187,351 A | 2/1993 | Clary | 235/379 |
| 5,191,613 A | 3/1993 | Graziano et al. | 380/25 |
| 5,214,702 A | 5/1993 | Fischer | 380/30 |
| 5,218,637 A | 6/1993 | Angebaud et al. | 380/23 |
| 5,224,162 A | 6/1993 | Okamoto et al. | 380/24 |
| 5,283,829 A | 2/1994 | Anderson | 380/24 |
| 5,297,202 A | 3/1994 | Kapp et al. | 380/9 |
| 5,321,751 A | 6/1994 | Ray et al. | 380/23 |
| 5,326,959 A | 7/1994 | Perazza | 235/379 |
| 5,343,530 A | 8/1994 | Viricel | 380/23 |
| 5,465,299 A | 11/1995 | Matsumoto et al. | 380/23 |
| 5,473,690 A | 12/1995 | Grimonprez et al. | 380/24 |
| 5,504,818 A | 4/1996 | Okano | 380/49 |
| 5,521,980 A | 5/1996 | Brands | 380/30 |
| 5,530,755 A | 6/1996 | Pailles et al. | 380/18 |
| 5,532,920 A | 7/1996 | Hartrick et al. | 364/419.1 |
| 5,557,722 A | 9/1996 | DeRose et al. | 395/148 |
| 5,615,268 A | 3/1997 | Bisbee et al. | 380/25 |
| 5,671,282 A | 9/1997 | Wolff et al. | 380/25 |
| 5,673,316 A * | 9/1997 | Auerbach et al. | 380/4 |
| 5,673,320 A | 9/1997 | Ray et al. | 380/25 |
| 5,677,955 A | 10/1997 | Doggett et al. | 380/24 |
| 5,680,461 A * | 10/1997 | McManis | 380/25 |
| 5,708,806 A | 1/1998 | DeRose et al. | 395/615 |
| 5,724,523 A | 3/1998 | Longfield | 395/235 |
| 5,748,738 A | 5/1998 | Bisbee et al. | 380/25 |
| 5,841,970 A * | 11/1998 | Tabuki | 395/187.01 |
| 5,864,828 A | 1/1999 | Atkins | 705/36 |
| 5,905,800 A | 5/1999 | Moskowitz et al. | 380/28 |
| 5,912,974 A * | 6/1999 | Holloway et al. | 380/51 |
| 5,943,423 A | 8/1999 | Muftic | 380/25 |
| 5,956,404 A | 9/1999 | Schneier et al. | 380/25 |
| 6,016,484 A | 1/2000 | Williams et al. | 705/39 |
| 6,021,202 A | 2/2000 | Anderson et al. | 705/54 |
| 6,209,095 B1 | 3/2001 | Anderson et al. | 713/176 |

OTHER PUBLICATIONS

R.L. Rivest, A. Shamir, and L. Adelman, "A Method for Obtaining Digital Signatures and Public–Key Cryptosystems," Communications of the ACM, vol. 21, No. 2, Feb. 1978, pps. 120–126.

"Electronic Authentication of Documents," New Mexico Statues Annotated 1978 §§ 14–15–1 to 14–15–6, including Proposed Rule effective Jul. 1, 1996.

"Applied Cryptography Second Edition: Protocols, Algorithms, and Source Code in C," Oct. 15, 1995, pps. 185–187.

* cited by examiner

```
<TEXTAREA NAME="associated-001" ROWS=6 COLS=40>Order Form Details:

QTY: 1    STOCK: 1234    PRICE:   $19.95
                         TAX:     $0.99
                         ------
                         TOTAL:   $20.94

</TEXTAREA><BR>
```
<u>105</u>

<u>106</u>

```
Amount: <INPUT TYPE="text" NAME="amount" MAXLENGTH=9><BR>
Pay To: <INPUT NAME="pay_to" VALUE="Vendor Inc."><BR>
Pay To Amount: <INPUT NAME="pay_to_account" VALUE="123456"><BR>
Pay To Code: <INPUT NAME="pay_to_code" VALUE="101011"><BR>
Memo:<BR><TEXTAREA NAME="memo" ROWS=4 COLS=40></TEXTAREA>
```
<u>107</u>

Fig. 5

```
begin=echeck-001 ─┐
                  └─ 4
    serial=3918273981273
    number=234
    date=1995/03/24              ← 3
    amount=$19.95
    pay_to=Vendor Inc.
    pay_to_account=12345
    pay_to_code=1010101
    meta=include singer-011 1995/03/24 01:37 ─┐
                                              └─ 7
end=echeck-001 ─┐
                └─ 5
```

Fig. 7

```
sign=echeck-001=F830D7AB6F15C6E94D3A ─┐
              298DB710298F4A3EE79     └─ 102
              SIGNER-011
              1995/03/24 03:27 ─┐
                                └─ 103
```

Fig. 8

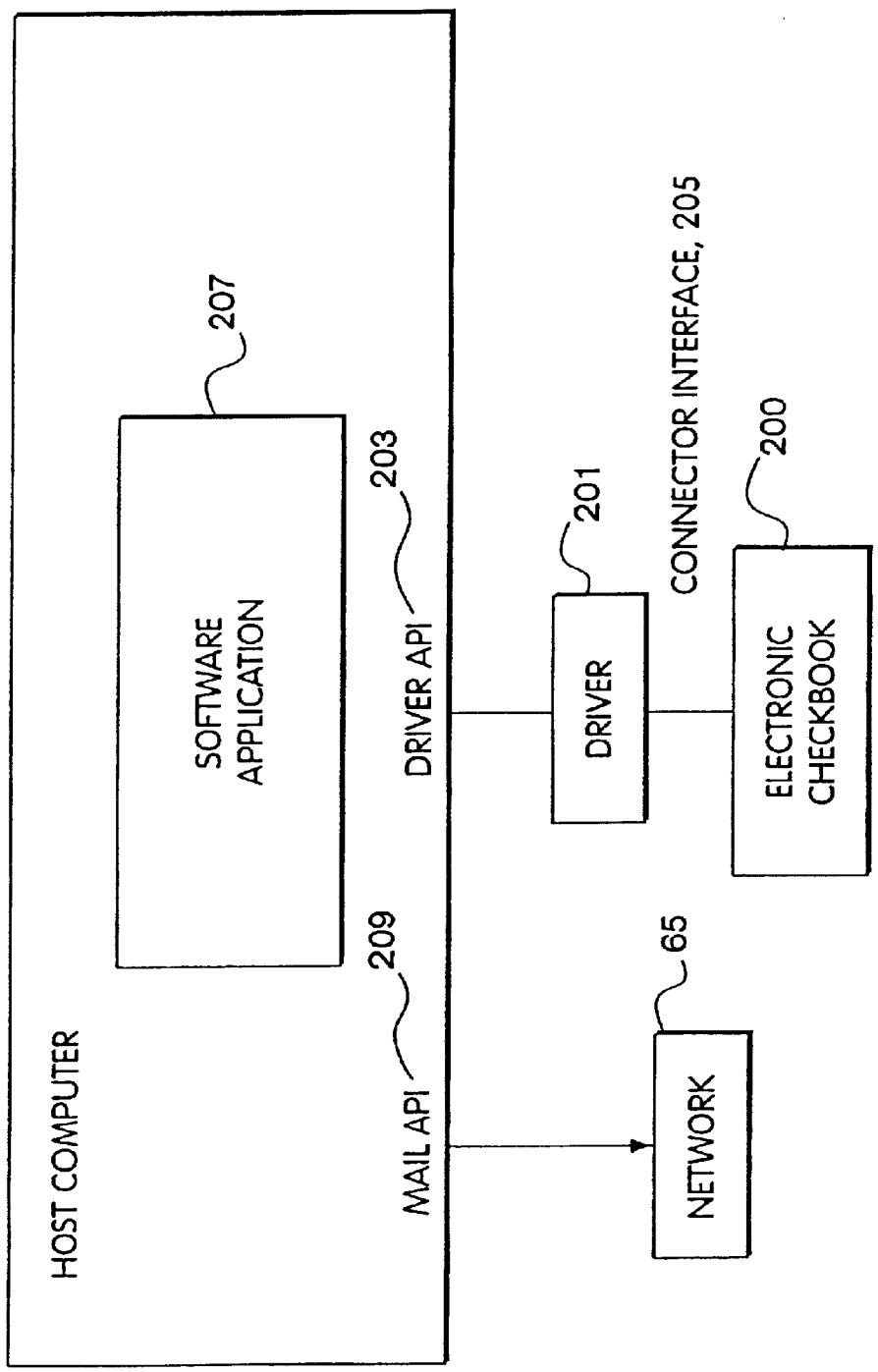

```
<fstc-doc docuname="ccccccc" doctype="ccccccc"> a sequence of one or more blocks and/or nested <fstc-doc> documents

</fstc-doc>
```

Document element definition

Fig. 39

```
<signature>
  <blkname>ccccccc
  <crit>TRUE
  <vers>1.0
  <sigdata>
    <blockred>ccccccc
    <hash alg="SHA">hhhhhh
    <blockred>ccccccc
    <hash alg="SHA">hhhhhh . . .
    <blockred>ccccccc
    <hash alg="SHA">hhhhhh
    <nonca>nnnnn
    <sigref>ccccccc
    <certissuer>ccccccc
    <certserial>nnnnnnnn
    <algorithm>SHA/RSA
    <timestamp>ccccccc
    <location>ccccccc
    <username>cccccc
    <useraddr>cccccc
    <userphone>cccccc
    <usermail>cccccc
    <userridnum>cccccc
    <userotherid>cccccc
  </sigdata>
  <sig>hhhhhhhh
</signature>
```

GENERIC SIGNATURE BLOCK ELEMENT DEFINITION

Fig. 40

BEFORE COMBINATION

```
<fstc-doc docuname="doc 1">
   <attachment>
      <blkname>block1
      . . .
   </attachment>
</fstc-doc>
<fstc-doc docuname="doc2">
   <attachment>
      <blkname>block1
      . . .
   </attachment>
</fstc-doc>
```

AFTER COMBINATION

```
<fstc-doc docuname="newdoc">

<fstc-doc docname="doc1">
      <attachment>
         <blkname>block1
         . . .
      </attachment>
   </fstc-doc>

<fstc-doc docuname="doc2">
      <attachment>
         <blkname>block1
         . . .
      </attachment>
   </fstc-doc>

<signature>
   <blockref>doc1.block1
   . . .
   <signature>
<fstc-doc>
```

Fig. 41

| GLOBAL BLOCK STRUCTURE DETAIL - SIGNED ELECTRONIC CHECK ||||||
|---|---|---|---|---|
| BLOCKS | BLOCK NO. | BLOCK REFERENCES AND CONTENTS | REF BLOCK | BLOCK FUNCTION |
| <action><br><check><br><signature> | C1<br>C2<br>C3 | PAYMENT/PROCESS<br><br>hash of <action><br>hash of <check><br>hash of signer's <account><br>hashes of any <attachments> | C1<br>C2<br>C4<br>C6 | signer's signature |
| <account><br><cert><br><attachment><br><signature> | C4<br>C5<br>C6<br>C7 | reference to <account><br>issuer/serial of <cert><br><br>hash of signer's <account> block<br>hash of signer's <cert> block<br>references to bank's <cert> | C4<br>C5<br><br>C4<br>C5<br>C8 | signer's account block<br>signer's certificate<br>attachments, invoice<br>bank's signature |
| <cert> | C8 | | | bank's certificate |

```
<fstc-doc docname="C" doctype="check">
    <action>     <blkname>C1 ... </action>
    <check>      <blkname>C2 ... </check>
    <signature>  <blkname>C3 ... </signature>
    <account>    <blkname>C4 ... </account>
    <cert>       <blkname>C5 ... </cert>
    <attachment> <blkname>C6 ... </attachment> (optional)
    <signature>  <blkname>C7 ... </signature>
    <cert>       <blkname>C8 ... </cert>
</fstc-doc>
```

Fig. 42

SIGNED ELECTRONIC CHECK BNF DEFINITIONS signed_echeck_doc::= <fstc-doc doctype="check">
                     <(action)>
                     <(check)>
                     acct_sig_group bank_sig_group
                     { <(attachment)> }
                     [ <(invoice)> ]
                     </fstc-doc> multiply_signed_echeck_doc::= <fstc-doc doctype="check">
                     <(action)>
                     acct_sig_group bank_sig_group
                     signed_echeck_doc I multiply_signed_echeck_doc
                     </fstc-doc>

Fig. 43

METHOD AND SYSTEM FOR PROCESSING ELECTRONIC DOCUMENTS

CLAIM OF PRIORITY

This patent application is a continuation of U.S. patent application Ser. No. 09/386,551, now U.S. Pat. No. 6,209,095, entitled "Method and System for Processing Electronic Documents," filed on Aug. 31, 1999 and naming the same inventors as the present application, the contents of which are incorporated herein by reference, and which is a continuation of U.S. patent application Ser. No. 08/994,636, now U.S. Pat. No. 6,021,202, filed on Dec. 19, 1997 and naming the same inventors as the present application, the contents of which are incorporated herein by reference, and which further claims priority to U.S. patent application No. 60/033,896, entitled "Method and System for Processing Electronic Documents", filed on Dec. 20, 1996, the contents of which are incorporated herein by reference.

CROSS-REFERENCE TO RELATED APPLICATIONS

This application incorporates by reference the following patent applications or publications:

1. U.S. patent application Ser. No. 08/418,190, filed Apr. 7, 1995, naming John Doggett, Frank A. Jaffe et al. and Milton M. Anderson as inventors.
2. U.S. Provisional Patent Application No. 60/033,896, filed Dec. 20, 1996, to Anderson et al.
3. Published PCT Patent Document WO 96/31965, published Oct. 10, 1996, pertaining to International Application No. PCT/US96/04771.

The present invention relates to electronic documents and, more particularly, to electronic documents that are both human readable and computer readable.

BACKGROUND OF THE INVENTION

Preparation and storage of copies of documents for paper transactions is expensive and time consuming. Completion of such transactions among geographically distant parties has traditionally required conventional transmission mechanisms, such as mail, with inherent delays associated with such mechanisms. Record keeping for such transactions has required significant additional steps, such as keeping a checkbook log for personal checks, keeping copies of prescriptions and medical records, making many duplicates of mortgage applications, and the like.

The digital computer and computer network make it possible to eliminate many of the drawbacks of paper transactions. The digital computer is a powerful data processing tool that allows a user to organize, store and analyze data at volumes and rates that would be impossible by any prior known techniques. The computer network is a similar step forward. By linking together several computers and by providing shared resources and cross-platform communications, engineers have developed the computer network into a tool that provides sufficient processing power to provide improved access to sophisticated applications by users at remote locations and to permit easy transmission of electronic documents between such locations.

One of the most widely accepted and heavily used networks is the Internet. The Internet is a global system of interconnected computer networks formed into a single world wide network, using an agreed-upon protocol. A user, through the Internet, can interactively transmit messages with users in different countries. Similarly, a user in the U.S. connected to files and libraries and other jurisdictions such as Europe and Asia, can download files for personal use. Accordingly, the Internet computer network provides strong communications functions similar to the communications functions provided by ham radio operators. Moreover, the Internet computer network acts like a universal library, providing electronic access to resources and information available from Internet sites throughout the world.

In addition to the inherent inefficiencies of paper transactions, other problems exist. Many of these problems relate to documents that require signatures. In particular, in order for a reader of a paper document to determine that a particular document or part of a document has been signed, the reader must be given access to the entire document; thus, a party who may only need to know that the document has been signed must be given access to the entire document, including any confidential information contained therein. Signatures are used in a wide range of contexts, including financial instruments, contracts, mortgage applications, and medical records and prescriptions, to indicate the agreement, consent or authority of the signer. Transactions that require signatures have traditionally employed conventional means for execution, such as pen and paper. As used herein, "signature" has its broadest source; that is, it means any indication of agreement, consent, certification, acceptance, or other giving of authority, that is associated with a person or entity.

The present invention leverages the power of distributed network computing to overcome many of the inherent inefficiencies of paper transactions.

It is well known that digital computing and computer networks reduce or eliminate many of the inherent inefficiencies in dealing with documents. Word processing programs are used almost universally by individuals and businesses who produce, store and transmit documents. However, documents that require signatures are a special case that present special problems. The signature itself is the first problem, since a signature is traditionally thought of as a manual signature. Protocols for signing electronic documents have been developed, including cryptographic digital signature algorithms, more particularly discussed below.

In addition to the problem of associating a signature with a document, other special problems are likely to exist in cases of documents that require signatures or affect commercial transactions. In particular, special requirements or protocols may apply to the content of such documents. For example, detailed rules exist as to how various actors are required to complete or respond to the information on each part of a paper check or other financial instrument. Similarly, rules exist as to how to complete and process a mortgage loan application. Different parts of medical records are also completed pursuant to protocols that require specific action on the part of medical personnel, insurers, and the like. In each of these cases the logical content of the different parts of the document is important, and a need exists to use the logical structure in the storage, manipulation and transmission of such document so that documents can be sent to known protocols. For example, if a protocol requires that a document bear a date, a logical element of the document should be defined for data information. Moreover, the protocols associated with signed documents are often established over time through custom and usage, so a need exists to permit electronic documents that closely mirror current practice. Also, although most individuals or businesses have computers, certain functions continue to be performed without the aid of a computer, such as viewing a human signature. Thus, it is important that documents that require signatures not only be machine processable, but also human readable.

A group of computer languages has been developed to help users manipulate documents according to logical content. Such languages, known as "markup languages," are a powerful tool in processing documents. Markup languages also have other advantages more particularly described below. One of the most important such languages is the Standard Generalized Markup Language ("SGML"). Certain advantages of an embodiment of the present invention may be understood by developing an understanding of SGML.

SGML is defined by the International Organization for Standardization in ISO 8879 (Information processing—Text and office systems—Standard Generalized Markup Language (SGML), ([Geneva]: ISO, 1986)). SGML is an international standard for the definition of device-independent, system-independent methods of representing texts in electronic form. SGML is an international standard for the description of marked-up electronic text. More particularly, SGML is a meta-language formally describing markup languages. In the present context, the word "markup" covers all sorts of special markup codes inserted into electronic texts to govern formatting, printing, or other processing. More generally, markup, or encoding, can be defined as any means of making explicit an interpretation of a text.

A markup language is a set of markup conventions used together for encoding texts. A markup language must specify what markup is allowed, what markup is required, how markup is to be distinguished from text, and what the markup means. SGML provides the means for doing the first three; a specific markup language such as that of the present invention fulfills the last function for particular contexts.

Three characteristics of SGML distinguish it from other markup languages: emphasis on descriptive rather than procedural markup; document type definitions; and independence from any one system for representing the script in which a text is written.

A descriptive markup system uses markup codes which simply provide names to categorize parts of a document. Markup codes such as <list> simply identify a portion of a document and assert of that portion that "the following item is a list," etc. By contrast, a procedural markup system defines what processing is to be carried out at particular points in a document, In SGML, the instructions needed to process a document for some particular purpose (for example, to format it) are distinguished from the descriptive markup which occurs within the document. Usually, the instructions are collected outside the document in separate procedures or programs such as that of the present invention.

With descriptive instead of procedural markup the same document can readily be processed by many different pieces of software, each of which can apply different processing instructions to those parts of it which are considered relevant. For example, a content analysis program might disregard entirely the footnotes embedded in an annotated text, while a formatting program might extract and collect them all together for printing at the end of each chapter. Different sorts of processing instructions can be associated with the same parts of the file. For example, one program might extract names of persons and places from a document to create an index or database, while another, operating on text that has been "marked up" in some way, might print names of persons and places in a distinctive typeface.

SGML also provides the notion of a document type, and hence a document type definition ("DTD"). Documents are regarded as having types, just as other objects processed by computers. The type of a document is formally defined by its constituent parts and their structure. The definition of a report, for example, might be that it consists of a title and author, followed by an abstract and a sequence of one or more paragraphs. Anything lacking a title, according to this formal definition, would not formally be a report, and neither would a sequence of paragraphs followed by an abstract, whatever other report-like characteristics these might have for the human reader.

If documents are of known types, a special purpose parser can be used to process a document claiming to be of a particular type and check that all the elements required for that document type are indeed present and correctly ordered. More significantly, different documents of the same type can be processed in a uniform way. Programs can be written which take advantage of the knowledge encapsulated in the document structure information, and which can thus behave in a more intelligent fashion.

SGML also ensures that documents encoded according to its provisions are transportable between different hardware and software environments without loss of information. The descriptive markup feature and the document type definition address the transportability requirement at the abstract level. A third feature addresses it at the level of the strings of bytes (characters) of which documents are composed. SGML provides a general purpose mechanism for string substitution; i.e., a machine-independent way of stating that a particular string of characters in the document should be replaced by some other string when the document is processed. This feature counteracts the inability of different computer systems to understand each other's character sets, or of any one system to provide all the graphic characters needed for a particular application, by providing descriptive mappings for non-portable characters. The strings defined by this string-substitution mechanism are called entities.

The SGML structure for a textual unit is known as an element. Different types of elements are given different names, but SGML provides no way of expressing the meaning of a particular type of element, other than its relationship to other element types. Within a marked up text (a document), each element must be explicitly marked or tagged in some way. The standard provides for a variety of different ways of doing this, the most commonly used being to insert a tag at the beginning of the element (a start-tag) and another at its end (an end-tag). The start- and end-tag pair are used to bracket off the element occurrences within the running text, in rather the same way as different types of parentheses or quotation marks are used in conventional punctuation.

SGML has the ability to use rules stating which elements can be nested within others to simplify markup. Such rules are the first stage in the creation of a formal specification for the structure of an SGML document, or document type definition. SGML is most useful in contexts where documents are seen as raw material to be matched against a pre-defined set of rules. Such rules can include legal rules or known protocols, customs or practices. By making the rules explicit, the designer reduces his or her own burdens in marking up and verifying the electronic text, while also being forced to make explicit an interpretation of the structure and significant particularities of the text being encoded.

A variety of software is available to assist in the tasks of creating, validating and processing SGML documents. At the heart of most such software is an SGML parser: that is, a piece of software which can take a document type definition and generate from it a software system capable of validating any document invoking that DTD. Output from a parser, at its simplest, is just "yes" (the document instance is valid) or "no" (it is not). Most parsers will however also produce a new version of the document instance in canonical form (typically with all end-tags supplied and entity references resolved) or formatted according to user specifications. This form can then be used by other pieces of software (loosely or tightly coupled with the parser) to provide additional functions, such as structured editing, formatting and database management.

A structured editor is a kind of intelligent word-processor. It can use information extracted from a processed DTD to prompt the user with information about which elements are required at different points in a document as the document is being created. It can also greatly simplify the task of preparing a document, for example by inserting tags automatically.

A formatter operates on a tagged document instance to produce a printed form of it. Many typographic distinctions, such as the use of particular typefaces or sizes, are intimately related to structural distinctions, and formatters can thus usefully take advantage of descriptive markup. It is also possible to define the tagging structure expected by a formatting program in SGML terms, as a concurrent document structure.

Text-oriented database management systems typically use inverted file indexes to point into documents, or subdivisions of them. A search can be made for an occurrence of some word or word pattern within a document or within a subdivision of one. Meaningful subdivisions of input documents will of course be closely related to the subdivisions specified using descriptive markup. It is thus simple for textual database systems to take advantage of SGML-tagged documents.

Hypertext systems improve on other methods of handling text by supporting associative links within and across documents. Again, the basic building block needed for such systems is also a basic building block of SGML markup: the ability to identify and to link together individual document elements is an inherent a part of the SGML protocol. By tagging links explicitly, rather than using proprietary software, developers of hypertexts can be sure that the resources they create will continue to be useful. To load an SGML document into a hypertext system requires only a processor which can correctly interpret SGML tags. HTTP servers in wide use for network computing are suitable to interpret SGML.

Although markup languages exist in accordance with the SGML standard that permit the user to manipulate documents according to logical content identified by tags within a document, conventional markup languages have not fully addressed the special problems associated with documents involved in signature transactions. A particular need exists for a flexible markup language that permits a document designer to create documents that are designed to comply with legal requirements and other protocols of a wide variety of particular transaction contexts that involve signatures. Also, a need exists for a markup language that permits the design of documents that are machine processable and human readable. A further need exists for electronic documents that can be subdivided or redacted as transmitted in parts, wherein the integrity of the document and the validity of the signature remains.

The benefits of a flexible, powerful markup language may best be understood by reference to a number of specific transaction contexts in which such a language is particularly useful. These transaction contexts relate to embodiments of the invention. One such context is in the area of financial instruments, and particularly electronic funds transfer instruments. These contexts are described merely by way of illustrations and it should be understood that any context in which signed documents are used may benefit from the present invention.

As seen in FIG. 1, in a typical financial transaction 10 a payer 12 transfers funds to a payee 14. Individual payers and payees prefer different payment methods at different times, including cash, checks, credit cards and debit cards. The transfer of funds between the payer 12 and the payee 14 may involve intermediate transactions with one or more banking institutions 16. The banks' functions include collecting and holding funds deposited by account holders and responding to instructions from the account holders. Checks are an example of financial transactions which invoke these banking institution functions.

FIG. 2 shows a paper check transaction 20, in which a check 22 is transferred from the payer 12 to the payee 14. The check 22 is typically found in a checkbook 24. Each check has several blank spaces (for the date 34, the name of the payee 30, the sum of money to be paid 28, and the signature of the payee 38) to be filled out by the payer 12. As each check is written, the payer 12 keeps a record of the check in a check register 26 which lists check transactions including the sum to be paid 28, the name of the payee 30, the identification number of the check 32, and the date of the transaction 34.

In the body of the check 22, the payer 12 instructs the payer's bank 36 to pay the stated sum of money 28 to the payee 14. The check 22 identifies the payer's bank 36, the payer's account number 40 (using magnetically readable characters) at the payer's bank, and the payer 23 (usually by printed name and address). After filling in the date 34, the name of the payee 30 and the sum of money 28 as ordered by the payee 14, the payer signs the check 22. A payee typically considers a check authentic and accepts it for payment only if it contains the signature 38 of the payer, the printed identification of the payer 23 and the printed name and logo 42 of the payer's bank 36, and does not appear to be altered. The check 22 also contains a routing and transit number 25 which indicates the routing of the check to the payer's bank 36 for presentment.

After the payer 12 presents the completed check 22 to the payee 14 in a financial transaction (such as a sale of goods or services), the payee 14 endorses the check 22 on the back with instruction to deposit the amount 28 with the payee's bank 46. If the check looks authentic, the payee bank 46 provisionally credits the payee's account 48 for the amount of money designated on the face of the check 28 pending clearance through the federal reserve system and acceptance and payment by the payer's bank 36.

The payee's bank 46 routes the check 22 to the payer's bank, possibly using the federal reserve bank clearing house 50 or other established clearing arrangement, which uses the routing and transit number 25 to deliver it to the payer's bank 36, which then verifies the authenticity of the check 22 and (at least for some checks) the signature 38 of the payer 12. If the check 22 is authentic and the payer 12 has sufficient funds in her account 40 to cover the amount of the check 28, the payer's bank 36 debits the payer's account 40 and transfers funds to the payee's bank 46 for the amount designated on the check 28. A complete check transaction 20 thus includes verification steps performed by the payee 14 and the payer's and payee's banks 36 and 46.

The banks 36 and 46 send bank statements 52 and 54 to the payer 12 and payee 14, respectively, which reflect events of the transaction 20 pertinent to each of the parties for reconciliation of their accounts with their records.

Processing a paper check requires time as the physical check is routed to the payer, the payee, the payee's bank, the clearing house and/or the payer's bank. The same is true of other types of financial transactions involving paper instruments, such as credit card slips generated during a credit card sale. In a credit card transaction, a merchant makes an impression of the customer's card, which the customer then signs, to function as a receipt for the transaction. The merchant typically obtains a positive acknowledgment or credit authorization from the customer's credit card company before accepting the credit card slip. This assures that payment will be received.

Several mechanisms for using electronic communication to substitute for paper flow in financial transactions are in use or have been proposed.

Electronic Check Presentment (ECP) is a standard banking channel used to clear checks collected by banks prior to or without routing the physical checks. The Automated Clearing House (ACH) is an electronic funds transfer system used by retail and commercial organizations. The ACH acts as a normal clearing house, receiving a transaction over the network and then splitting and routing the debit and credit portions of the transaction to the payer's and the payee's banks. Electronic Data Interchange (EDI) is a similar electronic transactional system, primarily used for the interchange of business documents such as invoices and contracts. With EDI, the funds transfer is frequently transmitted over other financial networks, such as through electronic funds transfer or ACH.

So-called home banking allows a consumer to use a home or personal computer to, e.g., request that the bank pay certain bills.

Electronic funds transfer (EFT), or wire transfer, is used for direct transfer of funds from a payer to a payee, both usually corporations, using a bank's centralized computer as an intermediary. The EFT system may be used in conjunction with the ACH system described above.

Automatic teller machines (ATM) and point of sale (POS) devices allow an individual to conduct a transaction from a location outside the home. ATMs have remote computer terminals connected to the user's bank which allow access, directly or indirectly through switching networks, to the user's account in the central computer of the bank. Similarly, POS devices are remote computer terminals located at a place of business which allow access to an individual's account information stored in a computer within a network of financial institutions, to permit transfer of funds from the user's account to the merchant's account at another bank.

Check imaging, another electronic transaction procedure, involves the scanning of a paper check by a scanner, which digitizes the image of the check pixel by pixel and stores the image electronically in a memory. The image may then be transferred electronically to substitute for or precede the physical delivery of the check, e.g., to truncate the clearing process. The image of the check may be recreated on a computer monitor or on paper for verification by the appropriate banking institutions.

Several systems are currently used to secure electronic financial transactions. For example, IC chip cards, or smart cards, are small devices (containing chips with memories) which are capable of exchanging data with a computer or a terminal and of performing simple data processing functions, and are thus more versatile than a simple credit card. The smart card is portable and may be easily used in POS and ATM environments.

Other embodiments of the invention relate to execution of legal documents, completion of mortgage applications, and transmission of signed medical records.

As seen in FIG. 18, in a typical contract transaction 401 a first signer 410 signs a legal document 483 and delivers the document to a second signer 422. The document may pass through various intermediaries 421, such as a notary, for other actions, such as notarization. Also, the document may be passed on to various third parties 425 who will read the document in order to verify the signature or the contents of the document. A third party 425 could be a judge, arbitrator 423, escrow agent 427, or other party whose action depends on the contents of the document and the signature.

Referring to FIG. 21, a typical contract transaction 481 is depicted in which the first signer 410 signs a document 483. In addition to substantive contract clauses, the document may include the names of the parties 484, the date 486, a signature line 470, a second signature line 472, a notarization line 474 and other features. Once signed by the first signer 410 the document may be transmitted to a second signer 422. The second signer may sign the document with the second signer's signature 480 at the second signature line 472. The document may then be notarized by a notary 421 with a notarization 482 at the notarization line 474. The document may be transmitted to various third party readers 423. For example, the contract may provide for an escrow of funds with an escrow agent, and the document may need to be transmitted to the escrow agent in order to permit the escrow agent to understand the conditions under which the funds will be released.

In contract transactions such as that depicted in FIG. 21, it is often a condition of the contract that certain information exchanged between the parties be kept confidential. In particular, certain terms of the contract are often required to be kept confidential. However, one or more parties may need to demonstrate to a third party that the contract has been signed as to certain other terms, Often, the third party does not need to know all terms of the contract, only that the contract has been signed as to certain terms. For example, the escrow agent only needs to know the terms of the escrow arrangement, not all of the terms of the business relationship between the parties. Similarly, third parties relying on a statement by one signer that the signer owns certain property only need to see the provisions of the contract that relate to ownership of property. The dilemma is that under known electronic document processing systems, where the signer signs the entire file, such a demonstration requires the disclosure of the entire file. With paper transactions, the confidential information can be blacked out, so that only the relevant information and the signature remains. With an electronic file, such redaction places in question the integrity of the entire document, as well as the validity of the signature. A need has arisen to provide the convenience and flexibility of electronic contracting, along with the security and familiarity of known paper contracting methods.

As with electronic checks, a need also exists for electronic contracts to remain human readable. That is, an individual should be able to read the contract or a portion of the contract on the screen or in a printout and obtain any relevant information that can be obtained through electronic processing. The need for human readability arises from, among other things, the fact that not all readers will have computer systems that are capable of reading the electronic form of the documents.

A mortgage loan application is one type of legal document that may be prepared in accordance with the present invention. Referring to FIG. 19, in typical mortgage transaction 489, a borrower 452 signs a loan application 490. The loan application may be signed at various signature lines. The loan application is then transmitted to a lender in some cases through an intermediary such as a broker 455. The application may then be reviewed and acted upon by various third parties 456, such as mortgage lenders, credit reporting agencies, banking institutions and the like.

Referring to FIG. 22, a typical mortgage loan application transaction 489 is depicted in which the borrower 452 submits a mortgage application 490. The mortgage application 490 may include various information such as the date 491, the names of the parties 493, various signature lines for particular clauses 492, 494, and a signature line 498 for the entire application for the borrower, as well as a signature lines 500, 501 for the lender and for the broker 455. The mortgage application, once signed by the borrower at the signature lines 492, 494 and 498, may be transmitted to the lender 454. The lender may then sign with the lender's signature 505 at the lender's signature line 501 and transmit it to the lender. The broker 455 may also sign at the signature line 500. The document may then be sent on to one or more third parties 456 such as a bank for review. Also other parties may need to see the application, such as a credit reporting agency or an appraiser, to verify that the borrower has given permission to reveal information contained in the application or in a credit report. Once the credit reporting agency and other third party has reported to the lender 454, the lender 454 may then approve the loan and provide an approval 508 to the borrower 452.

Mortgage loan transactions raise similar confidentiality concerns as legal contracts. A credit reporting agency may only need to see the part of the application that authorizes a credit report, but known electronic techniques require the signer to sign the entire file; thus, in order to ensure the validity of the signature, the credit reporting agency must receive the entire document. Other third parties may also need to see only part of the application. Accordingly, a need has arisen to provide for transmission of part of a mortgage loan application while ensuring the integrity and validity of the signature, as well as of the information in the part that is transmitted.

A mortgage application needs to be human readable, because various parties who will read part or all of the document, such as credit agencies, appraisers or the like may not have computer systems that are capable of reading electronic documents. Human readability permits the continued application of existing customs and legal rules, increasing the comfort of users with electronic document processing.

Referring to FIG. 20, another type of document that requires signatures and is subject to various legal requirements is a patient's medical record 520. A first doctor 462 may sign the medical record or part of the medical record and transmit it to a second doctor 464 who may add additional information and signatures to the document. The document may be transferred through or to various intermediaries 467, or third parties 468, such as the patent, other doctors, hospital administrators, insurance companies, guardians, family members and the like.

Referring to FIG. 23, a depiction of a medical record transaction 521 is provided. A first doctor 462 may sign a record 520. The record may include one or more dates 530, 532. The medical record 520 may include various health-related content items such as a diagnosis 522, prescription 524, or an action taken 523, as well as other content items, such as health insurance information 525. The record 520 may include a signature line 528 for the first doctor 462 and a signature line 529 for other items to be signed by a second doctor 464. Once the medical record is signed and completed by a first doctor 462, it may be transmitted to the second doctor 464 for signature 534 by the second doctor 464 at the second doctor's signature line 529. Once the medical record 520 is signed by one or more doctors, it may be transmitted to an intermediary 467, such as a hospital administration, or to a third party 468 such as an insurance company, a medical records sections of the hospital, a guardian, a family member or the patient. One or more of these parties may be required to take action 537, for example to sign the record, to indicate consent to procedures, to indicate insurance coverage, or for other purposes. These parties may need to rely on the signature of the doctors 462, 464 in order to take action on the medical record.

Medical records are like contracts and loan applications in that they contain confidential information that may need to be read by third parties, such as patient health information, insurance information and the like, but most of the third parties only need access to certain portions of the information. For example, an insurer may need to know the diagnosis, but may be excluded from consideration certain information in the record, such as HIV status. Similarly, a doctor diagnosing a medical condition may not need to know insurance eligibility. Under current electronic document systems, in order for the reader to ensure the integrity of the record and the validity of the signature, the entire file is disclosed. A need exists to be able to transmit portions of a signed medical record while ensuring the integrity of the record and the validity of the signature Medical records also need to be human readable. Many of the parties who will read the records, such as doctors and nurses may not have immediate access to computer systems for processing the documents. Also, human readability permits parties in the medical field to continue to use customary practices in dealing with such records. Moreover, if documents remain human readable, then existing legal rules for paper records can be applied to electronic records. Medical records also need to be readable in segments. For example, a health insurer may be entitled to know a particular diagnosis or prescription without having knowledge of a patient's entire medical history.

SUMMARY OF THE INVENTION

The invention includes a computer-based method for creating a signed electronic documents.

In one aspect, the invention includes a markup language according to the SGML standard in which document type definitions are created under which electronic documents are divided into blocks that are associated with logical fields that are specific to the type of block. Each of many different types of electronic documents can have a record mapping to a particular environment, such as a legacy environment of a banking network, a hospital's computer environment for electronic record keeping, a lending institution's computer environment for processing loan applications, or a court or arbitrator's computer system. Semantic document type definitions for various electronic document types (including, for example, electronic checks, mortgage applications, medical records, prescriptions, contracts, and the like) can be formed using mapping techniques between the logical content of the document and the block that is defined to include such content. Also, the various document types are preferably defined to satisfy existing customs, protocols and legal rules.

For example, in the case where the electronic document is an electronic check, the document type definition for electronic checks can be designed to comply with Regulation E, of the Uniform Commercial Code and other state and federal laws for payment instruments. An example of a document type definition for the electronic check is depicted in FIG. 43. Where the document is a medical record, the document type definition can be designed to comply with health care regulations. When the document is a mortgage loan application, the document can be designed to comply with mortgage lending regulations. Other embodiments can be readily envisioned for other types of documents in other contexts that are legally required to have particular content. Document type definitions in FSML or SGML can thus be applied to legally significant communications, such as performative utterances, in a manner that permits the establishment of rules and protocols for handling content for that type of communication. Thus, a content block for the "pay to the order of" block of a check can be defined, and the associated computer software will treat the content in that block as the identification of the payee of the check. Similar protocols can be established for all types of significant content, including content relevant to business practices and legal rules.

In one embodiment, the invention features a computer-based method in which an electronic instrument is created for effecting a transfer of funds from an account of a payer in a funds-holding institution to a payee, the instrument including an electronic signature of the payer. A digital representation of a verifiable certificate by the institution of the authenticity of the account, the payer, and the public key of the payer is appended to the instrument. This enables a party receiving the instrument, e.g., the payee or a bank, to verify the payer's signature on the instrument. A similar certificate of authenticity could also be issued in other contexts. For example, a certifying authority could certify that a doctor is properly licensed and authorized to sign a prescription. A certifying authority could certify as to the creditworthiness of a borrower in a transaction. A certifying authority could certify as to the authority of an individual to sign a contract for a given company. These examples are merely illustrative of all transactions in which a certifying entity participates.

Implementations of the invention may also include one or more of the following features. The electronic instrument may include digital representations of the content of the document. In the case of the electronic check, this may include: (a) payment instructions, (b) the identity of the payer, (c) the identity of the payee, and (d) the identity of the funds-holding institution. In the case of medical records, the digital representations may include the identities of the doctor or doctors, the identity of the patient, the identity of the hospital, as the identity of an insurer. In the case of a mortgage application, the identities of borrower, lender, broker, and other parties and relevant third parties may be digitally represented. In the case of a contract, the identities of all parties may be digitally represented. Digital representations of a verifiable signature of a signing party, such as the payer of an electronic check, may also be appended to the electronic document. The electronic document may be delivered electronically to the institution at least in part via a publicly accessible data communication medium. At the receiving party, the signature of the signer and the certificate may be verified in connection with whatever action is required by the receiving party, such as transmitting funds to the payee in the case of the electronic check. In the case of the electronic check, an account number may be included in the electronic instrument. In other embodiments, similar identifying information, such as the patient's health insurance code number, the number of a given loan application or contract, or the like, may be included. In the electronic check embodiment, the account may be a deposit account or a credit account. The instrument may be an electronic substitute for a check, a traveler's check, a certified check, a cashier's check, or a credit card charge slip. In all embodiments, the publicly accessible data communication medium may be unsecured.

Also appended to the electronic document may be digital representations of a verifiable signature of a second signer. The second signer may be the payee of an electronic check, a second or doctor, a mortgage lender, for example. A verifiable certificate by a third party, such as an institution which holds an account of the payee of an electronic check, or a credit institution in the case of a mortgage application, may also be appended, as may be a verifiable certificate by a central authority, such as a banking authority, with respect to the third party, such as the institution which holds the payee's account in the case of the electronic check.

Delivery of the electronic document may be in part via a private controlled secure communication medium and in part via a publicly accessible data communication medium. The electronic document may be delivered from one third party to another, such as from an institution which holds an account of the payee to the funds-holding institution via an electronic clearing house in the case of an electronic check, from a broker to a lender in the case of a mortgage loan application, or from a hospital to an insurance company in the case of a medical record, for example.

A party reading the signature of the first signer can verify the signature and the certificate of any party certifying the signature. In the case of the electronic check, at the payee, the signature of the payer and the certificate of the institution may be verified. Other signatures and certificates may be verified by other parties to various transactions. Thus, in the case of the electronic check, at the institution holding an account of the payee, the signature of the payer and the certificate of the funds-holding institution may be verified.

The signatures may be generated by public key cryptography. The appending step may be done by a separate signature device from the device which performs the creation of the electronic document.

Digital representations of a proposed transaction and a verifiable signature of the party initiating or proposing a transaction, such as a payee of a check, may be delivered from that party to the other party, such as the payer of an electronic check, at least in part via the publicly accessible communication network.

Information may be automatically transferred from the electronic document to a computer-based data storage, manipulation, access and retrieval system, such as an accounting system that tracks accounts receivable or processes orders. A log or database of information about electronic document transactions may be created, In general, in another aspect, the invention features an apparatus including a portable token having a memory, a processor, and a port for communication with a computer. The memory contains a private encryption key associated with a party or with another item associated with that party, such as an account in a funds-holding institution, or a health insurance number, and which is usable to append a secure, verifiable signature to an electronic payment document executed in connection with the item, such as a check drafted on an account or a claim against a health insurance policy.

Implementations of the invention may include one or more of the following features. The memory may contain certification information provided by the institution and which is usable to append secure, verifiable certificates to electronic documents to certify a relationship between an owner of the signature and a public key of the owner. A unique identifier may be assigned to each electronic document. The portable token may be a PCMCIA compatible card, smart card or smart disk, which may internally hold a private signature key and a secure memory for the check serial number. The certification information may be given a limited useful life. The memory may also contain certification information provided by a third party authority, such as a central banking authority in the case of an electronic check, and which is usable to append secure, verifiable certificates to electronic documents to certify the authenticity of a party, such as the funds-holding institution in the case of the electronic check. The certification information provided by the third party authority may have a limited useful life. In the electronic check embodiment of the present invention, the central banking authority may be a United States Federal Reserve Bank. The memory may also contain a complete or partial register of electronic documents, or a subset of the information contained in the documents, to which signatures have been appended. The appended signature may be a signature of any party to a transaction, such as a payer who holds the account in the institution, an endorsement signature of a payee, a signature of a doctor or patient, a signature of a borrower, broker or lender, or the signature of a contracting party. The memory may also contain a personal identification number for controlling access to the memory.

In general, in another aspect, the invention features a computer-based method of creating an electronic document. Digital data is formed which represents the identity of each party to the transaction, and other relevant facts to the transaction, such as the amount to be paid in the case of an electronic check, or the amount of medicine in the case of an electronic prescription that is part of a medical record. Then, in a secure hardware token, a digital signature is appended to the data.

In another aspect the invention features having a second signer sign an electronic document and enter information about a transaction in digital form into the secure hardware token and, in the token, append a digital signature to the digital information. In the electronic check embodiment, the invention features a computer-based method of endorsing a payment instrument by entering information included in the payment instrument in digital form into a secure hardware token and, in the token, appending a digital signature to the digital information.

In general, in another aspect, the invention features a computer-based method for regulating the use of account numbers with respect to accounts in a funds-holding institution. Digital account numbers are assigned for use by account holders in creating electronic instruments, the digital account numbers being distinct from non-electronic account numbers used by account holders with respect to non-electronic instruments. At the funds-holding institution, electronic instruments are then accepted from account holders only if the electronic instruments include one of the digital account numbers. In implementations of this feature, each digital account number may be linked with a non-electronic account number, and the two numbers may be linked with a common account in the institution, so that electronic instruments and non-electronic instruments may be drawn against the same account. A similar aspect can be applied to regulating unique identifying numbers to information in a particular mortgage application, contract, medical record, or other electronic document.

In general, in another aspect, the invention features a computer-based method of attaching a document to a related electronic document by forming a cryptographic hash of the document and appending the hash to the electronic document. In particular, the invention includes a method for calculating hashes of blocks of content within the document, appending the hashes to document name tags of the blocks, hashing the appended result, and signing the hash.

In general, in another aspect, the invention features a computer-based method for reducing fraud with respect to transmission of an electronic document, such as deposit of an electronic payment instrument with a funds-holding institution. A key-encrypted signature of a first party, such as a payee in the case of the electronic check, a public key of the party, a routing code of an institution or third party, and a number associated with information of the first party associated with the transaction, such as the number of the payee's account in the institution in the case of the electronic check, are included with the document, and, at the third party, there is automatic checking of the routing code and the number before accepting the electronic document.

In general, in another aspect, the invention features a computer-based method for reducing fraud associated with an electronic payment document. A cryptographic signature associated with a party to the document is appended to the document or to part of the document. Upon receipt of an electronic document, there is automatic checking of the cryptographic signature against cryptographic signature information of other electronic documents previously received.

Advantages of the invention may include one or more of the following.

The invention provides an all-electronic payments and deposit gathering instrument that can be initiated from a variety of devices, such as a personal computer, screen phone, ATM or payments accounting system. Financial accounts may be rapidly and securely settled between trading partners over open public or proprietary networks, without requiring pre-arrangement, by interconnection with the existing bank clearing and settlement systems infrastructure. The integration of controlled existing banking communication systems with rapidly growing public networks in a secure fashion will allow for implementation and acceptance by banking institutions, industry, and consumers.

The invention addresses the problem of gathering deposits electronically over public networks, since it enables all customers, retail and commercial, to gather, transmit and deposit, e.g., checks, into their accounts without physically going to a bank branch. The invention provides an electronic payment alternative for trading using public data networks to conduct transactions.

The invention to a degree electronically replicates heavily-used and well-understood existing paper check processes to enable it to be readily accepted by the marketplace. By retaining the basic characteristics and flexibility of, e.g., the paper check, the invention may be adopted more rapidly. Due to its similarity to, e.g., paper checks, the invention can be used within the structure of existing laws, regulations, and standard business practices. Similarly, the medical records, loan applications, electronic contracts and other embodiments of the present invention can be used within existing legal and business structures.

A variety of types of payment instruments may be implemented, e.g., certified checks, cashiers' checks and credit card charge slips, and additional capabilities may be provided, e.g., future dating, limit checks, and multi-currency payments.

The invention may be used in all market segments, from individual consumers to large corporations. It will enable businesses to complete safely and cheaply payments over public networks, to prepare and transmit medical records, to execute and transmit contracts, to complete and process loan applications, and to engage in other transactions that require signatures. Because the contents of the electronic document, or part of the electronic document, may be attached to a party's remittance information, the instrument will easily integrate with existing or new computer applications, such as accounts receivable systems, claim tracking systems, database applications and the like.

The security of the electronic documents enables open public networks to be linked to private networks, such as financial payments and bank clearing networks, hospital networks, or the like, in a secure fashion. The use of digital signatures, hardware based signing, and certification agents, such as banks, make the electronic documents trusted and secure. They are tamper-resistant due to the use of cryptographic signatures. This will provide greater security and reduced fraud losses for all parties in the transaction process by eliminating most of the common causes of bad transactions, such as bad paper checks, fake prescriptions, and the like. To provide confidentiality, the documents may also be encrypted when sent over public networks.

The use of public-key certificates enables easy electronic authentication by a contracting party such as a payee of a check, and third parties such as the payee's and payer's banks. Digital signatures can be validated automatically.

Since the system can be fully automated, and new processing can be done outside of existing applications, such as a standard Demand Deposit Account (DDA), the cost of processing an electronic document will be quite low, and the costs of implementation minimized. To further minimize implementation costs, in the electronic check embodiment, the electronic instruments may be integrated with the existing bank infrastructure, including some of the mechanisms currently used for interbank clearing of checks and electronic payments, such as bilateral arrangements, ACH and ECP.

In all embodiments, parties of all sizes gain substantial benefits. The use of electronic documents will be more cost effective than existing paper documents due to volume efficiencies and the automatic processing capabilities of computers. The use of electronic mail or electronic transmission is less costly than physically transporting paper. In addition to the significantly reduced costs of creating and mailing a document (no check stock, envelopes, stamps, photocopies or incremental labor), the party gains the ability to control the timing of transactions, such as payments, both through future dating of transactions and through the increased reliability and delivery speeds of electronic mail.

The invention addresses the problem of fraud and supports prudent fraud management through integrated fraud prevention measures and distributed liability for fraud. These mechanisms will reduce most of the current causes of fraud, including forgery, alteration, duplication, and fraudulent depositing. In addition, because the electronic check implementation follows the check payment model, the potential liability of the banks for fraudulent transactions will be limited while equitably sharing the responsibilities for the integrity of the system among payer, payee, and banks.

An electronic document may be signed and transmitted from personal financial software and other computing applications, through the use of an open programmatic tool set and application programming interfaces. Electronic instruments capability can be directly integrated into a payer's application, and does not require that a payer "go off-line" to complete a transaction. This benefit will be available to both consumers, through integrations with packages such as Intuit's Quicken™, and businesses through integration with existing accounting systems.

Electronic documents of the present invention have the further advantage that a signer can sign and transmit part of the electronic document, and a third party receiver of part of the document can read that part, without being given access to other parts, and verify that the part is part of a document that is subject to a valid, certified signature.

Other advantages and features of the invention will become apparent from the following description and from the claims.

Advantages and features of the invention may be better understood by reference to certain definitions.

The term "client," as used herein, encompasses any data processing systems suitable for operating a processor according to the invention and for establishing a communication link to an Internet site. An Internet site can be any program running on a data processing platform that connects to the Internet and that receives access requests, whether under HTTP, FTP or any other conventional or proprietary transfer protocol.

The term "application program," as used herein, encompasses any computer file that contains or manipulates data in a format for being accessed and processed by the processing unit of a computer.

The term "disk," as used herein, encompasses any memory device that can store computer data and that provides an interface for accessing the stored data.

The term "network," as used herein, encompasses any system comprising a series of computers linked by telecommunications networks and may include the Internet, intranets, or other computer networks.

The term "browser," as used herein, encompasses any application program which allows for multimedia presentation of information, including text images, sound and video clips. Typically a browser allows the user to connect by the Internet to different sites on the Internet.

The term "hypertext link" as used herein, encompasses any graphical icon, button, highlighted text or other symbol that permits a computer to direct a server to display a page of a site which is associated with the hypertext link.

The term "URL" means "uniform resource locator" and the term encompasses the address of a network site that is accessed by clicking or initiating a hypertext link that is associated with the URL.

The term "HTML" means hypertext markup language, which refers to languages for the creation of pages of the type capable of being viewed by a browser.

The term "FSML" means "Financial Services Markup Language," in accordance with the present invention.

The term "HTTP" as used herein, shall encompass the "HyperText Transfer Protocol", which shall mean a protocol under which messages are sent over the Internet from clients to servers in the client/server model of distributed computing.

BRIEF DESCRIPTION OF THE DRAWINGS

FIG. 5 is a format of an electronic check template example for use with the World Wide Web.

FIG. 7 is a block format of an electronic check.

FIG. 8 is a format of a digital cryptographic signature based on DDS.

FIG. 16 is a block diagram of an electronic checkbook application interface.

FIG. 39 depicts the certain tags of FSML for enclosing blocks of information, in the electronic check embodiment of the invention.

FIG. 40 depicts the FSML tags for signature blocks in an embodiment of the invention.

FIG. 41 depicts the FSML tags for combining blocks.

FIG. 42 depicts the FSML tag structure for an electronic check.

FIG. 43 depicts an example of a document type definition for the electronic check.

DESCRIPTION OF THE INVENTION

Broadly speaking, the invention is a method and system for processing electronic documents. The electronic documents have a predefined structure that is both human readable and computer readable. In an embodiment of the invention, the electronic documents may be financial electronic documents. As an example, one type of financial electronic document is an electronic check. Other examples include loan applications, medical records, contracts and other documents that are signed or certified. Further examples include notarized documents, medical prescriptions, transcripts, wills and trusts, and the like. Any of these documents may be formatted as a document type definition in FSML. The examples herein are merely illustrative and all signed documents and document-based transactions are within the scope of the invention.

Figure 30:
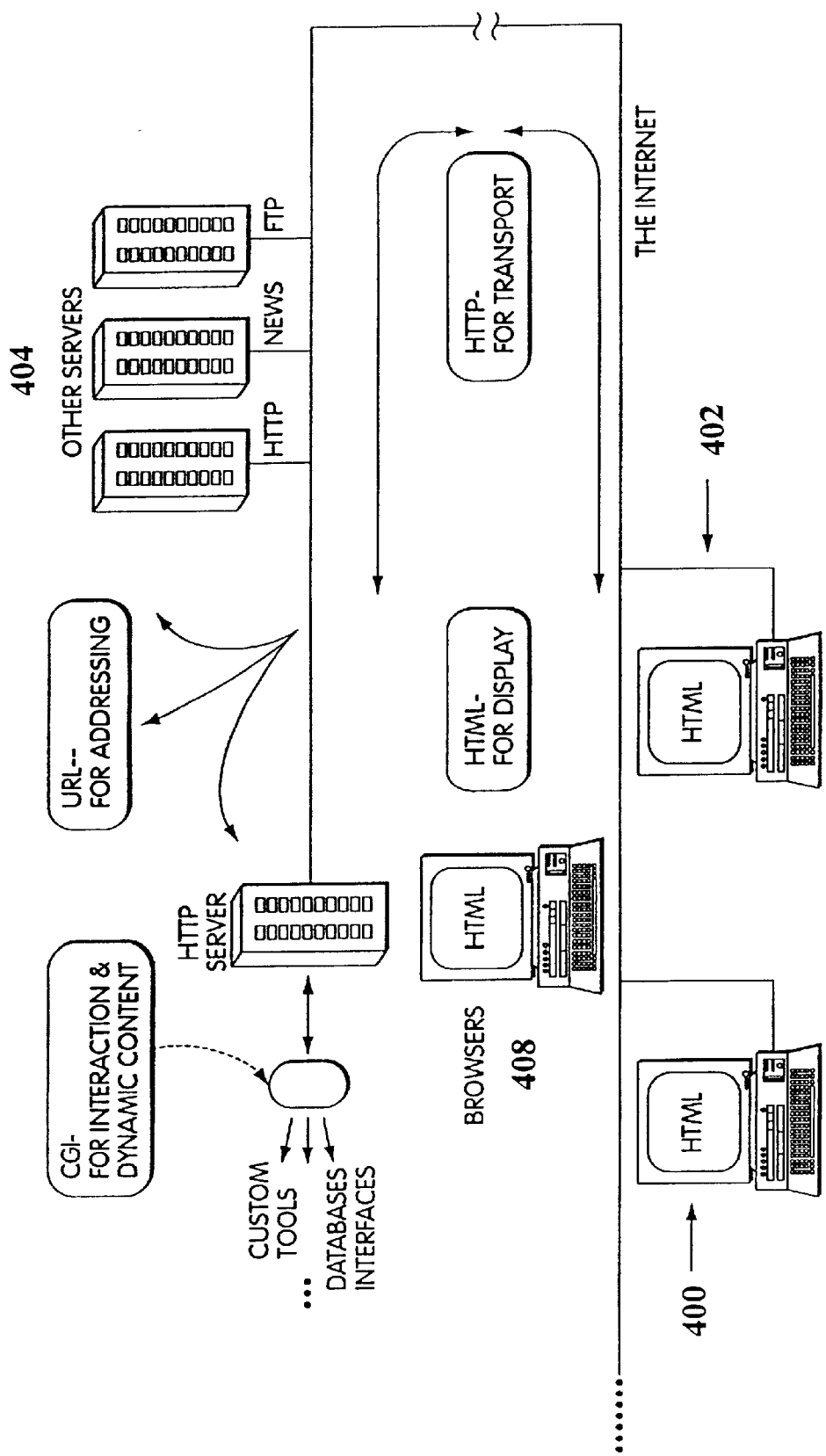
FIG. 30 is a schematic diagram illustrating the basic components of the World Wide Web.

Part of the underlying system for an embodiment of the invention is the World Wide Web. FIG. 30 is a schematic diagram illustrating the basic components of the World Wide Web. FIG. 30 depicts client computers 400 which are connected by telecommunications links 402 to one or more server computers 404. The client computers 400 are equipped with web browsers 408 that permit the client computers 400 to view pages of documents that are prepared according to the SGML standard. The SGML pages, such as HTML pages, are typically displayed in graphical format. Well-known web browsers 408 such as Netscape navigator and Microsoft Explorer automatically format data that is programmed in the HTML language according to well-known protocols. Information is transported back and forth between the client computer 400 and one or more server computers 404 according to a well-known protocol known as the HyperText Transport Protocol. The messages sent according to the HTTP are addressed according to Uniform Resource Locators, or "URLs", which determine where the Internet resource is and which protocol to use to access the resource. Other protocols, such as FTP, are also available.

In the so-called "client-server" model of distributed computing, messages are sent from client computers to one or more servers. Servers that use the World Wide Web are typically called "HTTP servers" or "web servers." "A web server may have installed on it files that include SGML documents that can be displayed on a client's computer screen when accessed from a client computer. Also, web servers may include or provide access to other servers that include Common Gateway Interface ("CGI") programs that permit access to other resources on the web server, such as application programs and databases including application programs for manipulating electronic documents. Thus, without the need for any hardware or software, other than a standard personal computer and a common web browser 408, a user can access dynamic applications and content that are stored on the web server.

A Financial Services Markup Language (FSML) has been developed to allow for the creation of electronic documents that are human readable and machine readable and processable. FSML is a markup language according to the SGML standard. By using FSML, one can create, sign and process electronic documents. In an embodiment of the invention, the electronic documents may be electronic checks, and FSML may be used to create, sign and process electronic checks and their associated documents. In other embodiments, the documents may be medical records, loan applications, contracts, or the like. The creation of the electronic documents uses a block structure as noted below. The signing of the electronic documents can employ a public key cryptographic signature and hash algorithm to provide security attributes. The FSML signature mechanism also allows documents to be combined, or added to, without loss of the security attributes. The processing (e.g., signature verification, endorsements, authentication, payment, etc.) of the electronic documents is also automated.

The FSML documents are ASCII documents that are both human readable and machine readable and processable. ASCII encoding of data items provides integer, hex, real, string and boolean types. Tags and values are readable without special software. SGML escape sequences permit internationalization. ASCII formats are compatible with electronic mail transaction as well as with V.42bis and other data compression.

Figure 31:
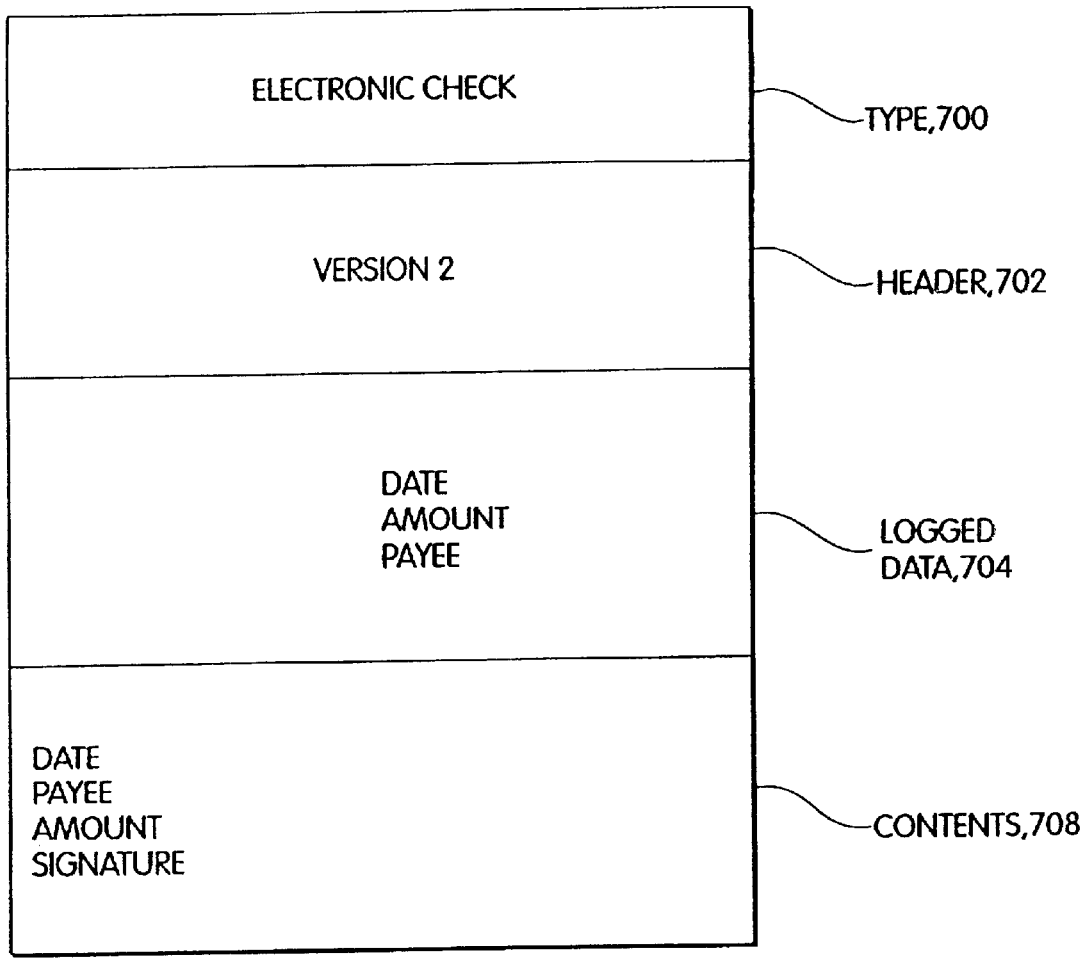
FIG. 31 is a diagram depicting the block structure of an electronic check.
Figure 32:
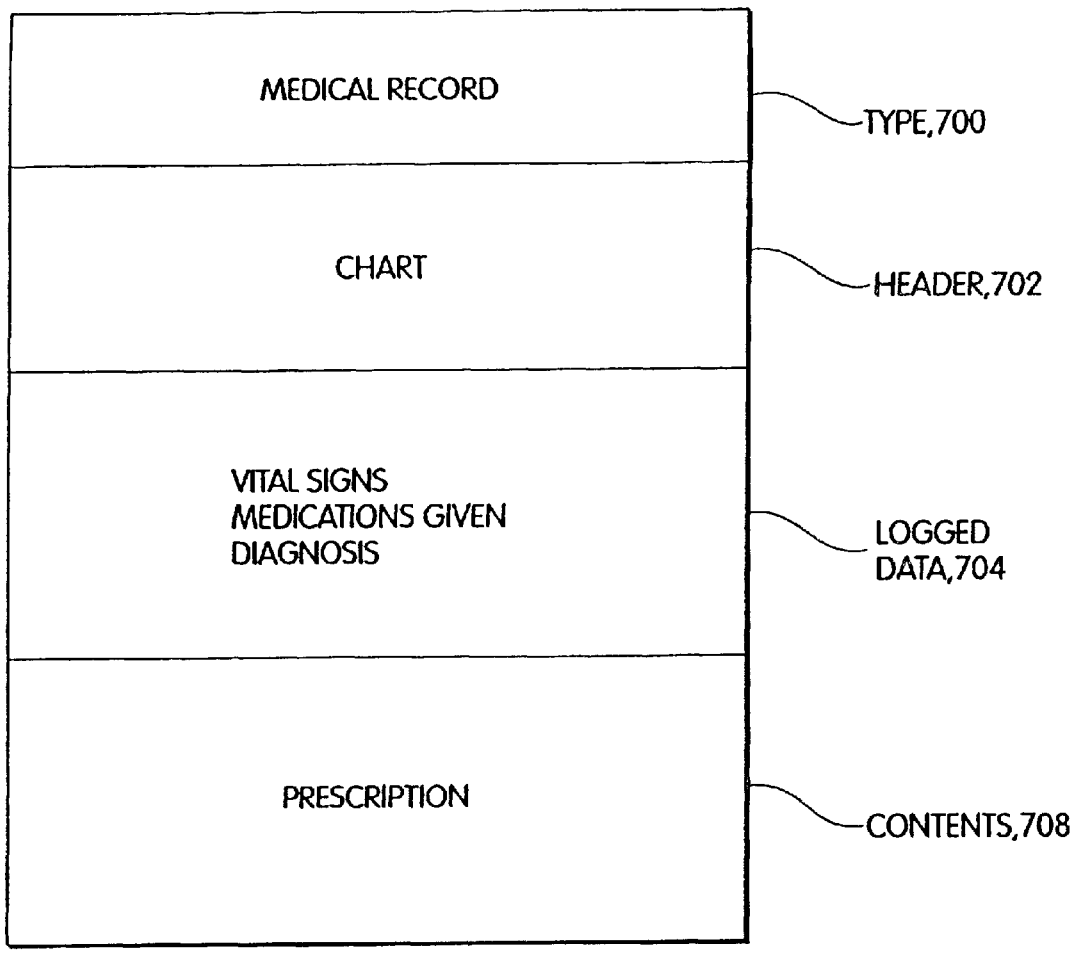
FIG. 32 is a diagram depicting the block structure of a medical record.
Figure 33:
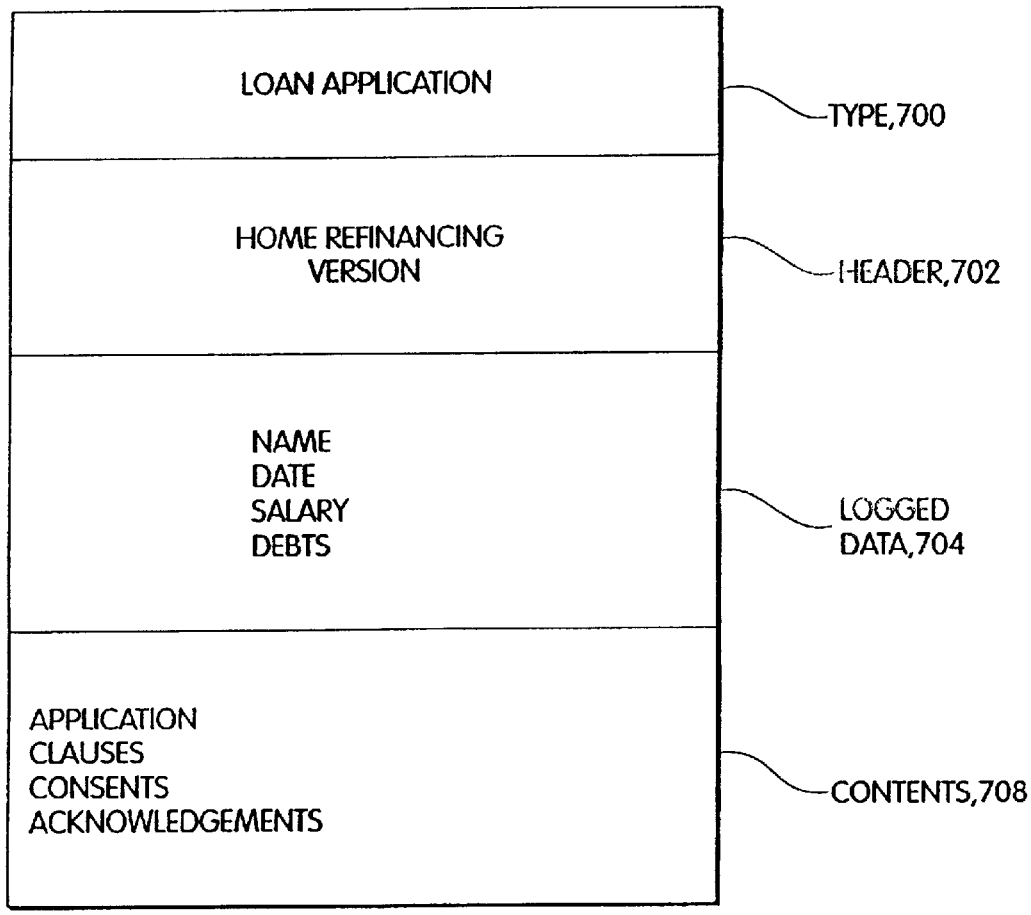
FIG. 33 is a diagram depicting the block structure of a loan application.
Figure 34:
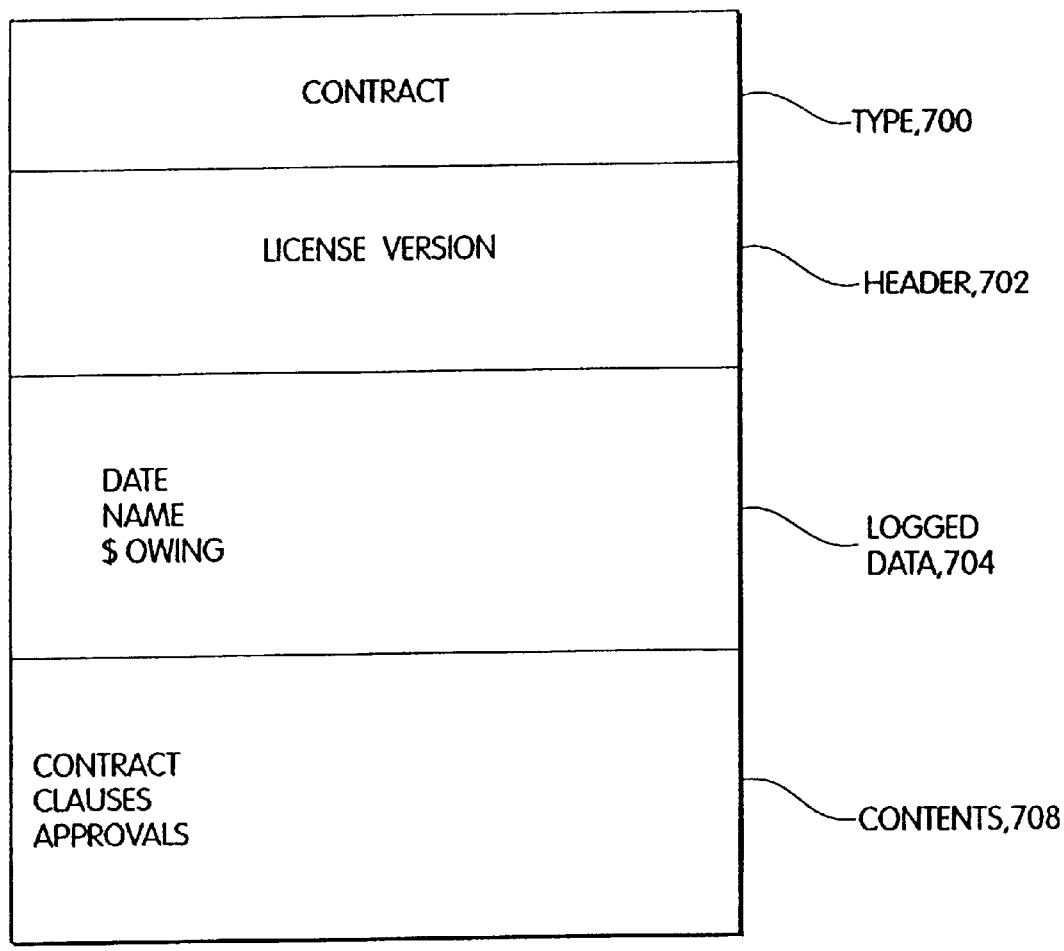
FIG. 34 is a diagram depicting the block structure of an electronic contract.

An FSML electronic document is made up of a number of blocks as depicted in FIGS. 31–34. An electronic check is depicted in FIG. 31. A medical record is depicted in FIG. 32. A loan application is depicted in FIG. 33. A contract is depicted in FIG. 34. Each block contains some common "fields" or "elements" in (SGML) terminology. Every FSML electronic document consists of one or more enclosed documents. These documents are nested. Nesting may be done by enclosing earlier forms of a document inside later editions of the document or by other conventional markup techniques. Each enclosed document is built inside a <fstc-doc> tag structure. The FSML tag structure for an electronic check is depicted in FIG. 42.

Referring to FIG. 31, an electronic check may be a document type 700 and the type appears in the type block of the document. A header 702 may include the name of the check, a version number or similar information. A logged data block 704 may include information that is to be logged by a database, such as an electronic checkbook, such as the date and amount of a transaction. A contents block 708 may include all other content for the check.

Referring to FIG. 32, the type block 700 reflects a medical record type. The header 702 shows a version of the record; e.g. a patient's chart. Logged data block 704 may include dates and amounts of prescriptions, records of vital signs and the like. The contents block 708 may include any contents to be signed, such as a prescription, or other information.

Referring to FIG. 33, the type block 700 reflects a loan application type. The header block 702 may include a version number of the type of application, such as a home mortgage refinancing. The logged data block 704 may include information from the application, such as dates, names, salary information, debts and the like. The contents block 708 may include all items for signature, such as the whole application and separate clauses or consents that require separate signatures.

Referring to FIG. 34, the type block 700 reflects a contract type. The header block 702 may reflect other information, such as the version of the contract or the license agreement. The logged data block 704 may include dates, names and other pertinent items for storage, and helpful for providing an audit trail. The contents block 708 may include one whole contract and any parts that require separate signatures.

The blocks include the relevant data for a transaction. Moreover, these document type definitions permit the establishment of rules that will reject a document that is missing some required element. For example, a contract may require an approval of a clause by a manager, and if approval is not included, the software of FSML would reject the document as an invalid type. Thus, document type definitions may be used to support legal rules and business practices.

The blocks making up the electronic document can be protected from tampering, and all blocks that need to be authenticated are assigned a digital signature contained in a signature block. The digital signature may use one of the standard digital signature algorithms, such as MD5/RSA or SHA/DSS. The digital signatures can be created using a private key, and then later verified using a public key which also can employ a certificate such as an X.509 Version 1 Certificate.

Figure 35:
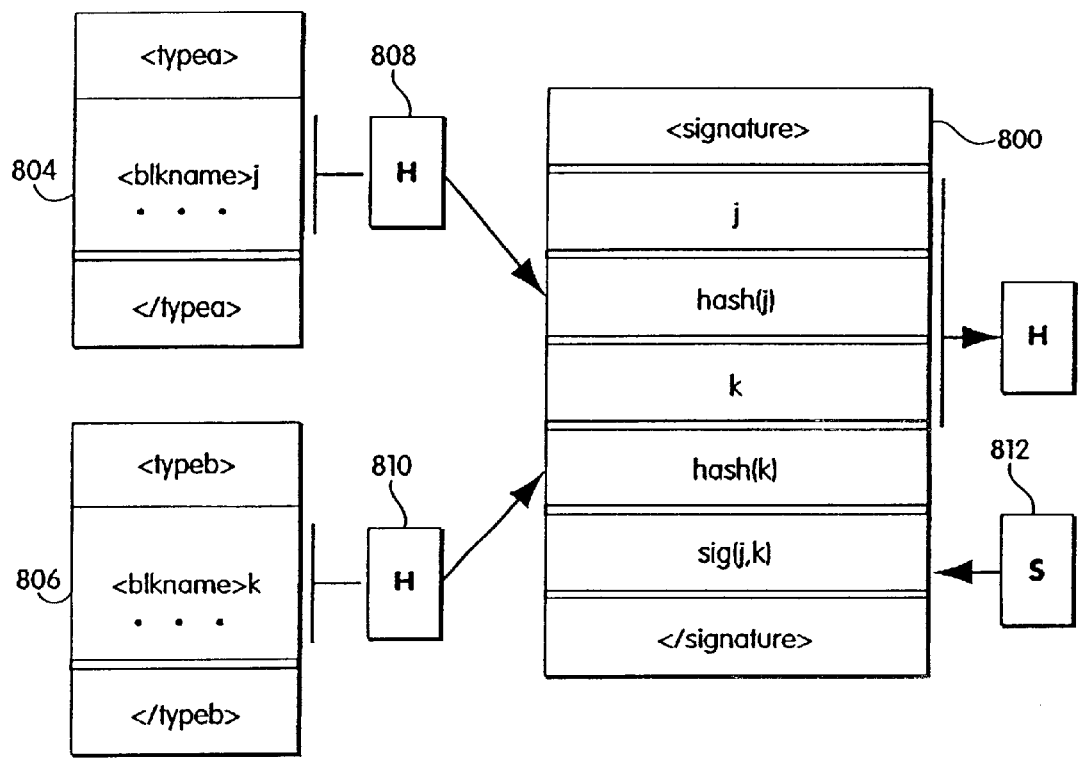
FIG. 35 is a depiction of the multi-level hash method of the present invention.

The various blocks making up the electronic documents and any associated documents may be bound together by a signature block. In one embodiment, depicted in FIG. 35, the signature block 800 contains the block names (j, k) of the blocks 804 and 806 being bound together and the digital hashes 808 and 810 of the content for these blocks. A hash 811 can be generated from the document names and the digital hashes 808 and 810, and a digital signature 812 can be generated by digitally signing the hash 811. The digital signature 812 of the hash 811 can be incorporated into the block 800. Next, the contents of the block 800 can be signed, such as by a private encryption key. By employing this multilevel hashing technique, the binding is such that the receiving software is able to verify that all the blocks that are bound together are present and have not been tampered with. Thus, the integrity of the entire document is verifiable.

Specific block structures for electronic documents and associated documents are described in Appendix B, which contains a Document Type Definition (DTD) for certain FSML electronic documents, namely checks. Additionally, Appendix B contains an example of an electronic check document.

Figure 38:
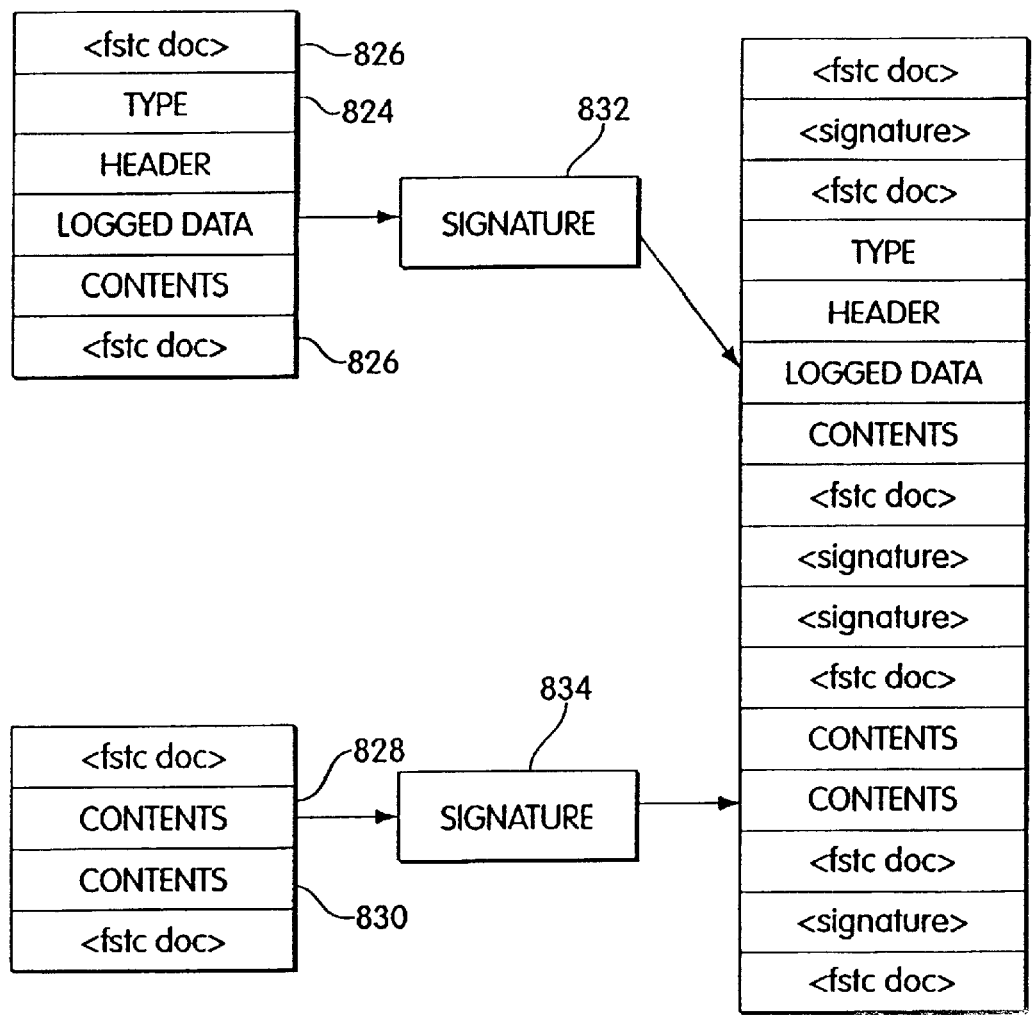
FIG. 38 is a block diagram depicting the nested structure of the documents of the present invention.

In situations in which the FSML electronic document is to pass through various steps and institutions that are part of an entire system that processes the electronic document and perhaps adds new information to the document, a document combining mechanism is described that allows the additional information to be added while allowing the original information to be protected and verified using digital signatures. By binding blocks together, the data in all the blocks being bound is protected from tampering while at the same time the blocks become cryptographically associated. One such process is depicted in FIG. 38. Referring to FIG. 38, to add new information to a document 824, the existing document 824 is enclosed in a <fstc-doc> tag structure 826 which may also enclose new blocks 828 and 830 containing the new information. New signature blocks 832 and 834 may also be contained in the new information and may sign blocks in the inner nested document. Each new, surrounding electronic document (<fstc-doc>) can also have a new <action> block and a DOCTYPE parameter for use by the receiving system to determine the method used to process the modified document. FIG. 39 depicts the certain tags of FSML for enclosing blocks of information, in the electronic check embodiment of the invention.

Figure 36:
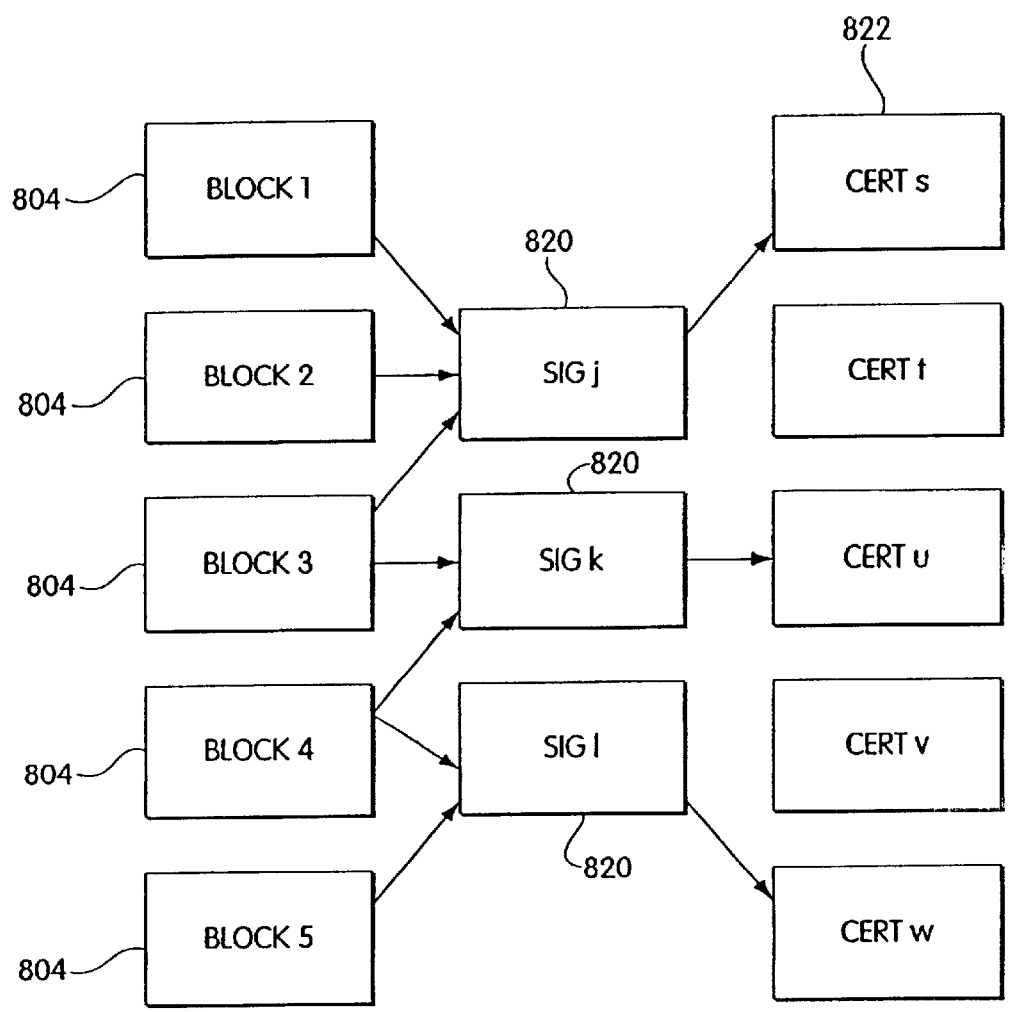
FIG. 36 is a block diagram depicting the document combination method of the present invention.

Referring to FIG. 36, whenever a block 804 is to be authenticated, or tamper-proofed, a digital signature block 820 is added to the electronic document. The signature block 820 contains a reference to a certificate block 822 containing a public key used to verify the digital signature. The signature block can also be used to bind multiple blocks together, so that the resulting compound document can be verified. The FSML tags for signature blocks in an embodiment of the invention are depicted in FIG. 40.

When combining an FSML block into a larger, compound document, the names of the original blocks may not be unique. As such, the document combining process also operates to handle naming conflicts when the documents being combined use block names that are not unique. FIG. 41 depicts the FSML tags for combining blocks.

The digital signature is to insure that the electronic document is authentic and has not been tampered with. By using the multilevel hash operation, the electronic document is able to provide improved authentication and tamper resistance. The multilevel hash operation also allows various blocks or associated documents to be bound together while still providing improved authentication and tamper resistance. The digital signature can pertain to any of the blocks or a set of blocks. Further, improved authentication and tamper resistance allows blocks to be later dropped or remove from a bundle, yet the digital signature is still able to be authenticated. Thus, portions of documents may be transmitted and authenticated, while confidential portions are redacted.

Figure 37:
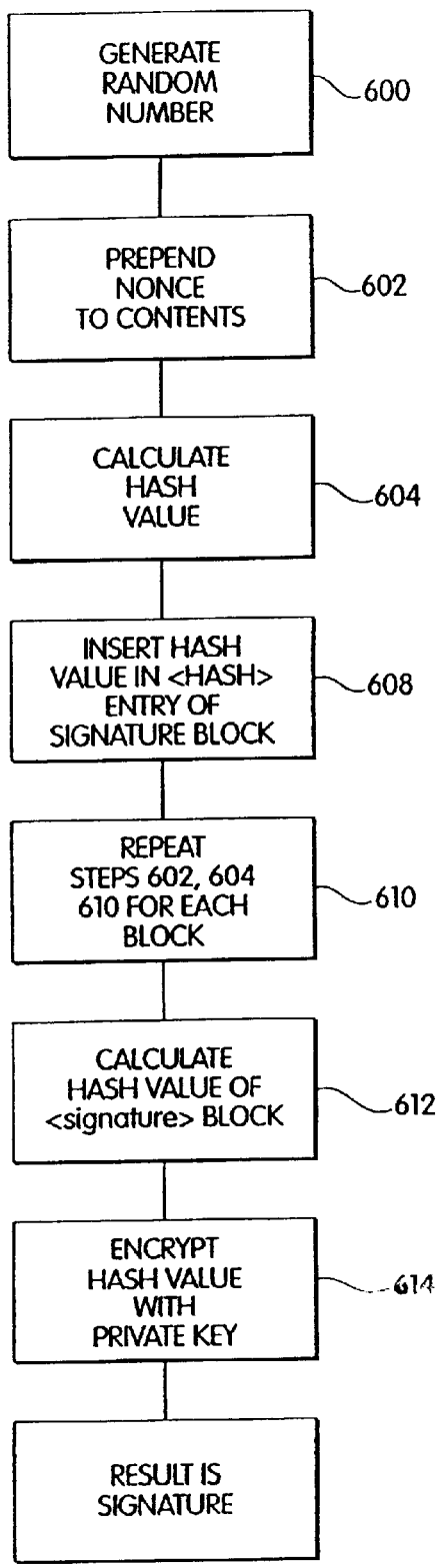
FIG. 37 is a flow chart depicting the steps of the secure hash algorithm of the present invention.

Referring to FIG. 37, the calculation of a digital signature is performed as follows. First, a nonce value (<nonce>) is created as a random number at step 600. The nonce value is used in producing a hash value as discussed below to enhance the security provided by the hash operation. Second, the nonce value is logically prepended to the subject block contents before hashing at a step 602. Third, at a step 604 a hash value is calculated using the contents of the subject block having the nonce value prepended, while excluding the block start tag and block end tag, but including all characters in between, with the exception of all carriage returns, line feeds, and trailing spaces on a line. Leading and embedded spaces in a line are included in the hash. SGML entities, i.e., character names enclosed between an ampersand (&) and a semicolon (;), are left untranslated when hashing. Fourth, at a step 608 the resulting hash value is inserted into the <hash> entry in the signature block. Fifth, at a step 610 the second through fourth steps are repeated for each block to be signed. Sixth, at a step 612 a second hash calculation is performed on the contents of the <sigdata> sub-block, which contains the previously calculated hashes, their block references, and the <nonce>. This includes all characters between <sigdata> tag and the </sigdata> tag, while admitting all carriage returns, line feeds and trailing spaces. Seventh, at a step 614 the second hash value is then encrypted using a private key. The result is the signature which is inserted (as Hex ASCII) into the signature block as the value for the <sig> tag.

An application programming interface (API) between an application program and an FSML electronic document is created by conventional programming means. The API allows developers of application programs to process electronic documents and associated documents without having to handle all of the details associated with the internal format and processing of these electronic documents. Instead, the API facilitates calls to an FSML Object Library that handles all the details of the internal format and processing of these electronic documents.

An FSML Object Library is described to handle processing that deals with the format and contents of FSML documents, an application program thus does not need to know about the actual format of an FSML document or any of the details of the interaction with a database application, such as an electronic checkbook. Likewise, the FSML Object Library will not need to know or care about details of hardware, operating systems, GUI's, databases, etc. In order to have platform independence, the FSML Object Library receives all input from the calling application program which also performs any necessary output. A call is made by the application program to create, parse, verify, modify, bind and otherwise operate on the memory-resonant FSML document. Functions are also provided to allow insertion and extraction of data items into and out of an FSML document.

The FSML Object Library described herein resides over an FSML system library which acts as a lower layer that translates the FSML Object Library requirements into the particular hardware library functionality.

An FSML System Layer API provides a standardized vendor-independent interface to functionality of the electronic checkbook hardware. Application programs do not need to invoke functions of the FSML System Layer Library indirectly but instead may use the API.

An electronic checkbook is an electronic card (e.g., a smart card) that is programmed to act as an electronic checkbook. The electronic checkbook carries signature and decryption private keys, activation PINs (Personal Identification Numbers or passwords) that for security reasons are accessible only by processes internal to the electronic checkbook. Suitable electronic cards are available from National Semiconductor, Inc of Santa Clara, Calif., Telequip Corporation in Hew Hampshire, and others. Electronic cards can be used to store logged data for medical records, loan applications, contracts, and other transactions as well.

Although, FSML is described with respect to electronic checks, FSML is a flexible structure that allows many other documents to be built from these primitives while retaining a standard format which can be partially verified during processing.

The present system and method offers a number of advantages over existing systems for processing of signed documents. The document type definitions of the present invention permit the design of transaction document types according to the logical purpose of blocks of content of such signed documents. The document type definitions thus permit a wide range of flexibility in structuring documents for meeting legal requirements and other requirements for such documents. For example, in the electronic check embodiment of the present invention, documents may be produced that comply with existing legal structures for paper checks.

The flexible document structures also permit the user to design documents that can be accessed by a wide range of transport systems and that can be manipulated by a wide range of computer systems. Thus, in the electronic check embodiment of the present invention, the instruments created with the present system may be accessed and manipulated by existing computer systems for demand deposit accounts.

Since it is created according to the SGML standard, a standard that is designed to permit easy interface to HTTP servers that are connected to the Internet, the present system is compatible with almost all computer network communications systems, including the Internet and local computer networks connected to the Internet by HTTP servers.

In an embodiment of the invention, an architecture for an electronic check system is disclosed. The electronic check system is an all-electronic payment and deposit gathering instrument that can be initiated from a variety of devices, such as a personal computer, screen phone, ATM machine, or payments accounting system. The electronic check system provides rapid and secure settlement of financial accounts between trading partners over public or proprietary networks without requiring pre-arrangement.

The electronic check is an electronic financial instrument which in some respects mimics the paper check. It is initiated and routed electronically, uses digital signatures for signing and endorsing, and relies on digital cryptographic certificates to authenticate the payer and payee and their respective banks and bank accounts and to provide a degree of security to all parties to the transaction.

Figure 1:
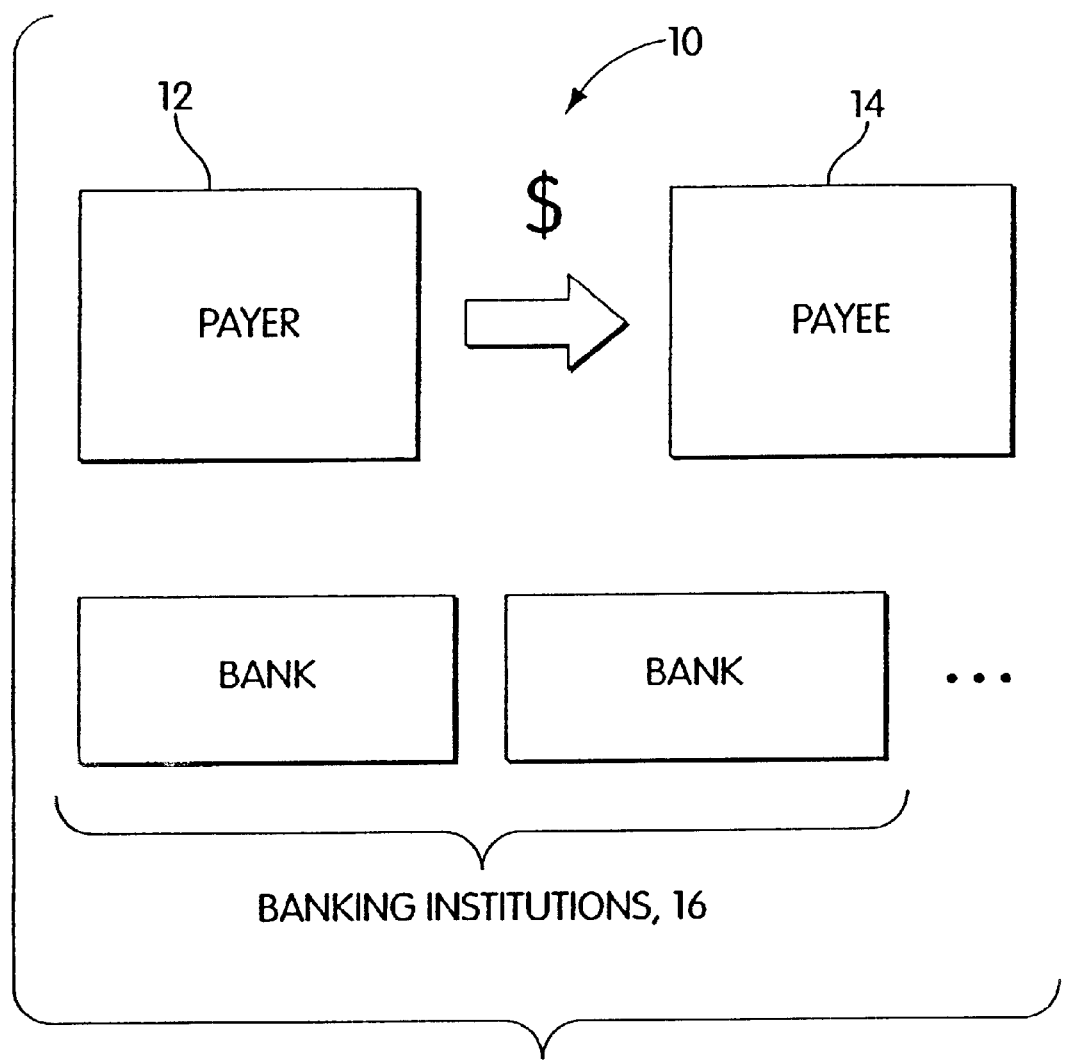
FIG. 1 is a block diagram of a financial transaction.
Figure 2:
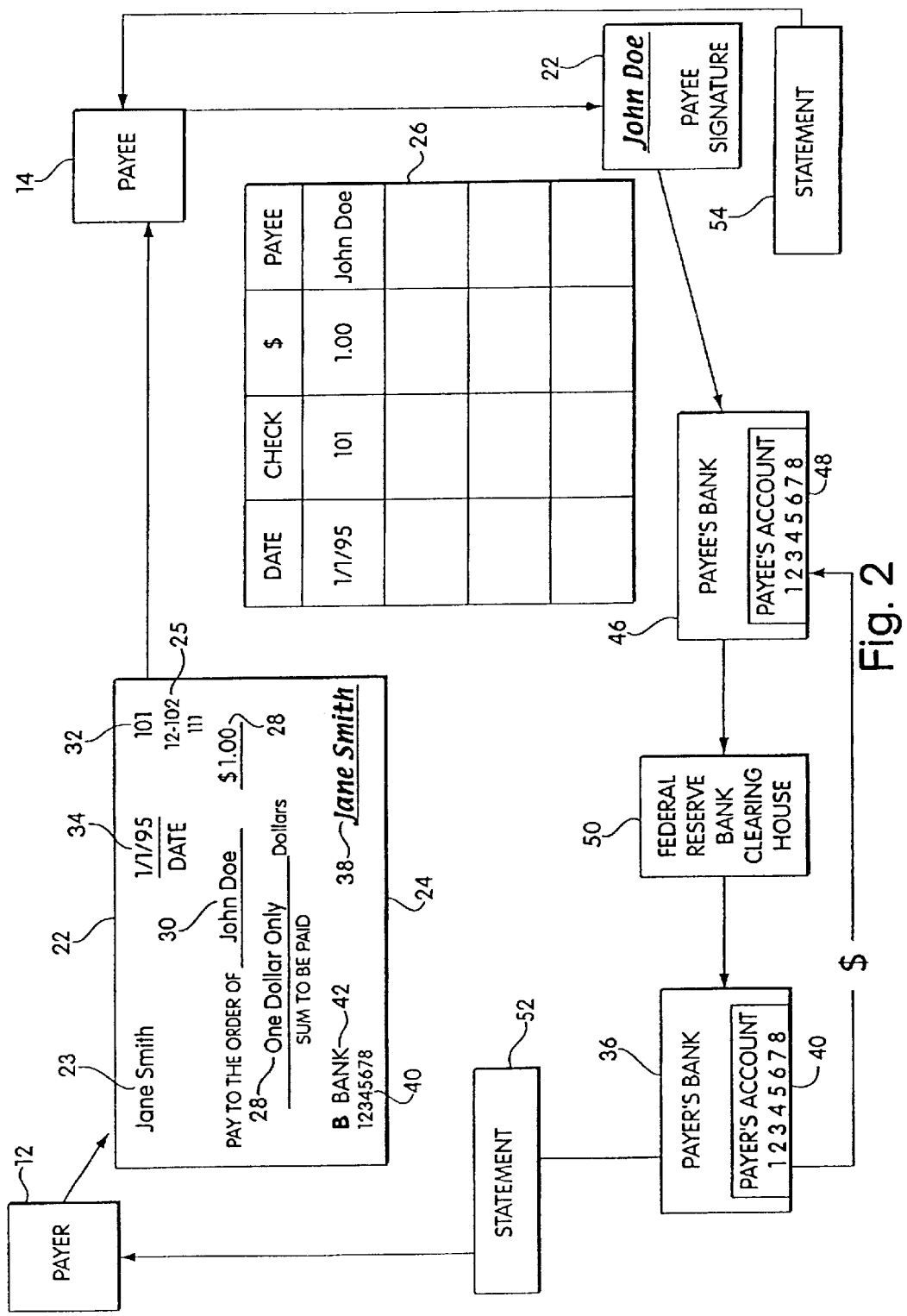
FIG. 2 is a flow diagram of the steps of a check transaction.
Figure 3:
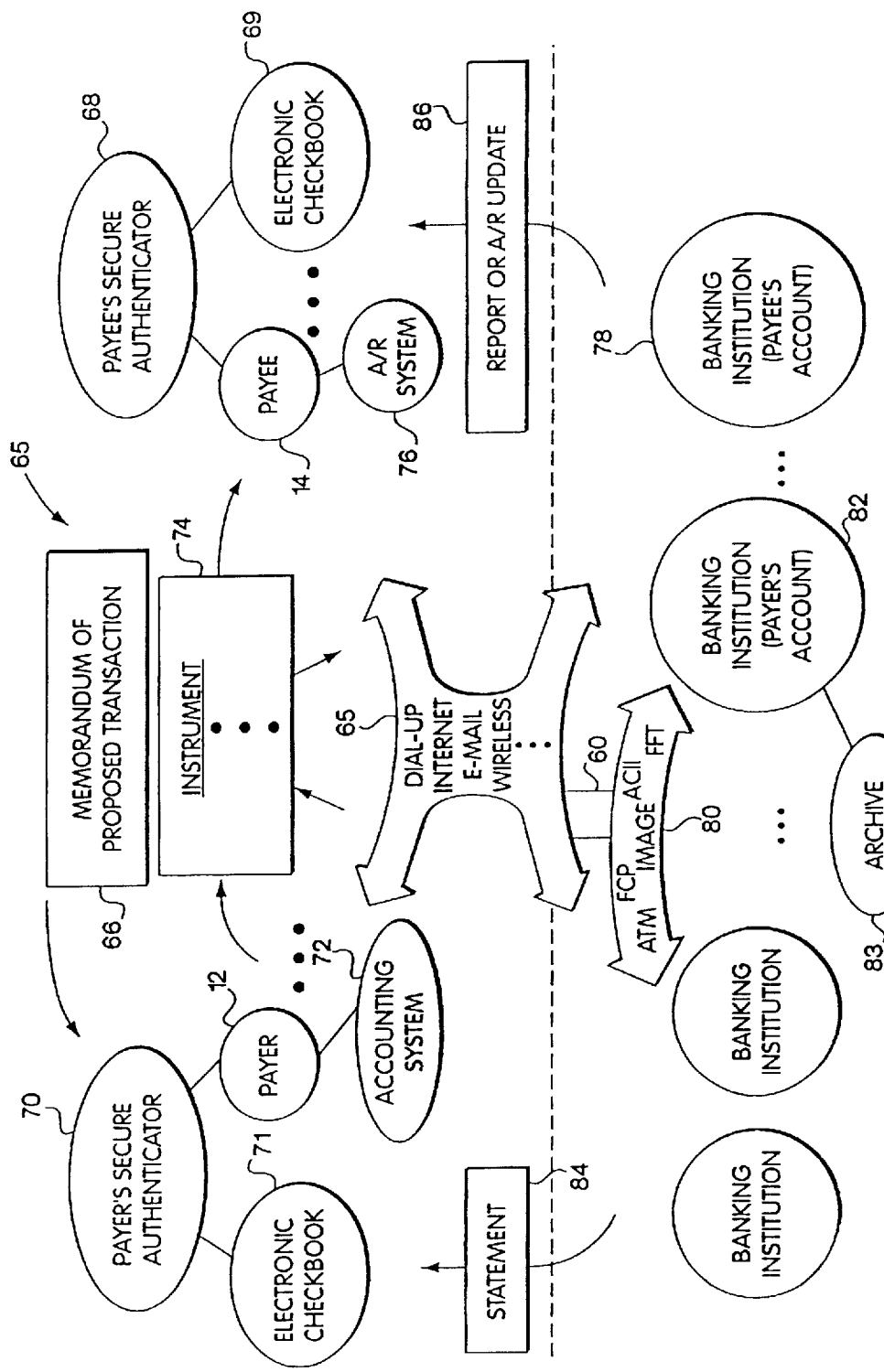
FIG. 3 is a flow diagram of the steps of an electronic instrument transaction.

As seen in FIG. 3, the use of electronic checks may take advantage of the interaction between publicly available, relatively unsecure electronic networks 65, such as dial-up networks, the Internet, wireless, or e-mail networks, are distinct entities in terms of the security of information during transmission over the two types of networks and systems 80. Public networks and banking networks are distinct entities in terms of the security of information during transmission over the two types of networks. Existing communications approaches in the banking system are secure and well disciplined. Public electronic networks are unsecured and to some degree less disciplined. The cryptographically sealed and authenticated electronic check passing across gateway 60 is the link between the public networks and secured financial networks. The gateway filters undesired traffic through and helps to prevent corruption of the secure financial networks resulting from intentional or unintentional access by persons operating in the public networks.

As seen in FIG. 3, in a broad sense, a transaction is initiated when a payer 12, e.g., a consumer, electronically receives a memorandum of a proposed transaction 66, such as a bill, invoice or order form, from a payee 14, e.g. a merchant. Alternatively, a transaction may be initiated by the payer 12 only. The memorandum 66 may contain the payee's digital signature, which may be generated by the payee's secure authenticator 68 using public key cryptography. The payer 12 validates the payee's signature by using the payer's public key to verify the payee's digital signature and thus authenticates the payee 14. To proceed with the transaction, the payer 12 electronically creates a financial instrument 74, e.g., an electronic check (e.g., on a personal computer), payable to the order of the payee 14, and signs and records it using the payer's secure authenticator 70. In effect, the secure authenticator 70 enables the payer 12 to digitally sign the instrument 74 with a private signature key and enter the transaction in a secure log, such as an electronic check book 71. A record of the transaction may also be kept in the payee's accounting system 72. The authenticator also appends to the check cryptographically signed certificates of, e.g., the payer's bank and the federal reserve bank authenticating the payer's account and the payer's bank, respectively. The payer 12 then electronically sends the instrument 74 and the memorandum 66 via a public network 65 to the payee 14.

Upon receipt of the instrument 74 from the payer 12, the payee 14 validates the payee's digital signature using public key cryptography. The payee 14 verifies the payer's bank 82 and the payer's account with the certificates. The payee 14 also verifies that the instrument 74 is not a recent duplicate, and holds it in storage until the date specified by the payer 12, if necessary. The payee 14 endorses the instrument 74 with the payee's digital signature using its authenticator 68. In effect, this enables the payee 14 digitally to sign the instrument 74 with a private signature key and enters the transaction in a secure log, such as an electronic checkbook 69. The authenticator also appends to the check cryptographically signed certificates of, e.g., the payee's bank and the federal reserve bank authenticating the payee's account and the payee's bank, respectively. The payee 14 detaches the memorandum 66 and forwards the memorandum and appropriate payment information from the electronic check to the payee's accounts receivable system 76. Finally, the payee 14 electronically deposits, typically via a public network, the instrument 74 with the banking institution which maintains the payee's account 78.

The payee's bank 78 receives the endorsed instrument 74 deposited by the payee 14, validates both the payee's digital signature of endorsement and the payer's original digital signature using public key cryptography, verifies that the instrument 74 is valid and checks the certificates. The payee's bank 78 then credits the sum of money specified in the instrument 74 to the payee's account and clears the instrument 74 with the payer's bank 82 via existing electronic settlement procedures, e.g., bilateral arrangements, ECP, ACH, ATM, EFT, or check imaging. The settlement procedures are carried out over a network 80 connecting the computers of a large number of banking institutions, the network 80 itself indirectly connected with the public network 65.

After clearance of the instrument, the payer's banking institution 82 receives the processed instrument 74. The payer's bank 82 validates both the payer's and the payee's signatures using public key cryptography. The payer's bank 82 also verifies that the instrument 74 is not a duplicate and that the date of the instrument 74 is valid, and checks the certificates. If there are sufficient funds to cover the face value of the instrument 74 in the payer's account, the payer's bank 82 debits the payer's account, treating the items as a normal DDA transaction, and electronically sends payment to the payee's bank 78 over the financial network 80 to settle the payment. The instrument 74 is archived for permanent storage and retrieval 83 at the payer's bank or elsewhere.

After the transaction has been completed, the payer's bank 82 issues a DDA statement 84 to the payer 12 reflecting the debit to the payer's account, and the payee's bank 78 issues a statement, report or accounts receivable update 86 to the payee 14 reflecting the credit to the payee's account. Supplementary information related to the transaction in the instrument 74, such as the payer's and payee's names or memo lines, can be included in the statement 84 or the report 86. The information contained in the statement 84 and the report 86 may be automatically compared with the payer's accounting system 72, and the payee's accounts receivable system 74, respectively, to verify that the transaction was carried out properly.

Figure 4:
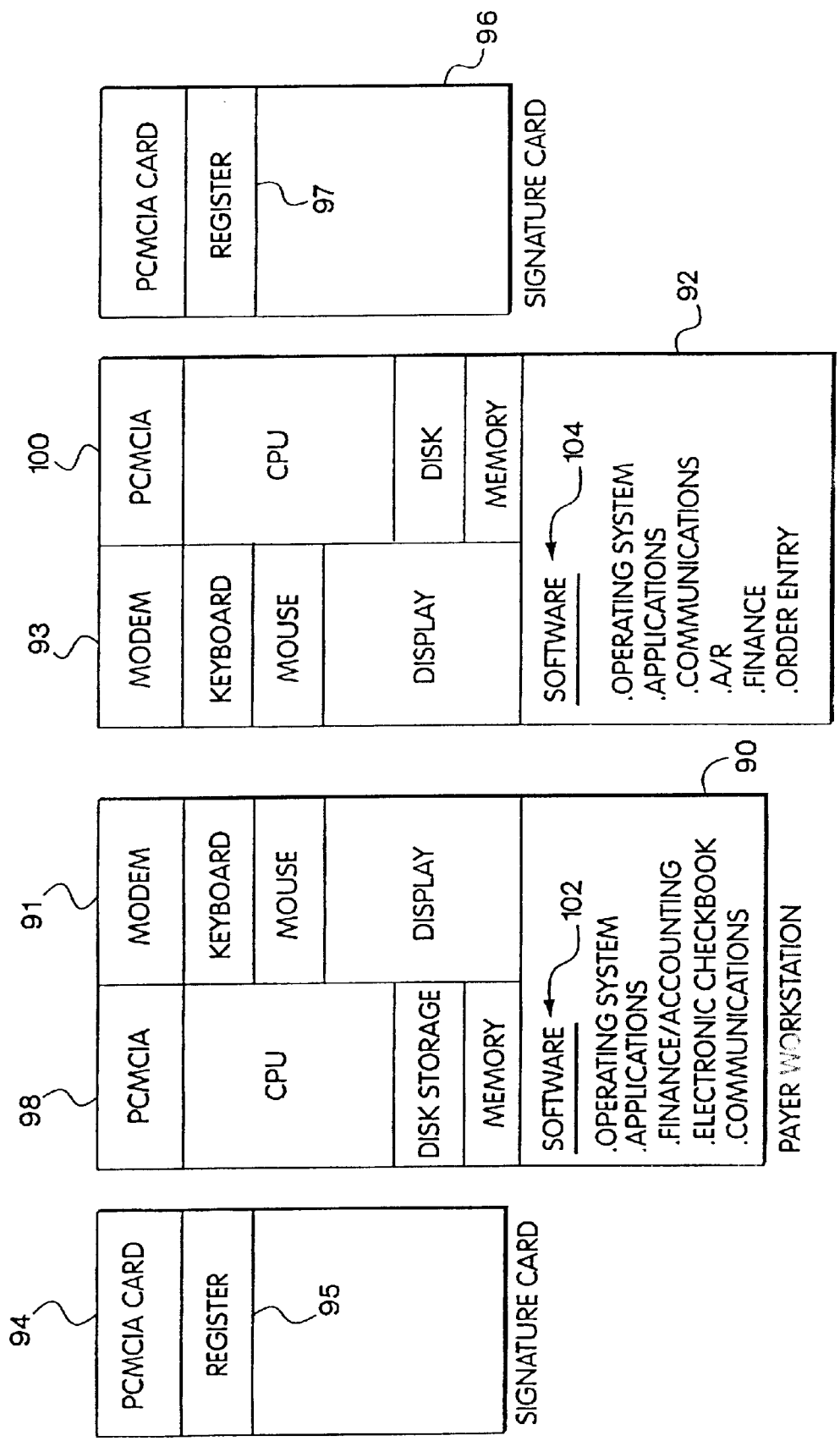
FIG. 4 is a block diagram of a workstation.

As seen in FIG. 4, an electronic document, such as an FSML document, such as an electronic check, may be created or verified and endorsed at a computer terminal or workstation, such as the payer's workstation 90 or the payee's workstation 92. Both workstations have the same general format. Each has a CPU with disk storage and memory and a keyboard, mouse and display for interaction with the user. Modems 91 and 93 (or other network connections) are attached to the workstations 90 and 92 and permit information, including the electronic check, to be passed electronically to other parties to the transaction via one of the electronic networks. Each workstation 90 and 92 also has a PCMCIA port 98 and 100, into which a signature card, such as a PCMCIA card 94 or 96, may be inserted. The PCMCIA card 94 or 96 is an electronic device that acts as the user's digital signature card, provides a secure means for generating a signature with a private signature key, and acts as an electronic checkbook. Alternatively, the electronic checkbook with its register may be a separate card from the digital signature card.

Each workstation 90 and 92 contains a software package 102 or 104 to be run by the CPU. Besides the usual operating system, the software package contains programs for handling electronic checks. The payer's workstation 90 has manipulations of the electronic checkbook as one of its software applications, including invoking the signature function of the PCMCIA card 94 to attach the payer's signature to an electronic check. The electronic checkbook application prepares an electronic check to be sent to the payee 14 upon the input of the necessary information by the payer 12 and records the transaction in a secure electronic register 95. The payer's workstation 90 also helps finance software for keeping track of the payer's transactions and communication software for sending the electronic check and other information electronically over one of the networks from its modem 91 to another party's modem.

The payee's workstation 92 similarly has finance and communications software applications. However, the payee's workstation 92 has software for preparing an order or invoice to be sent to the payer 12. It also contains software for invoking the signature function of the PCMCIA signature card 96 to attach the payee's signature to an electronic check as an endorsement before the payee 14 sends the electronic check to the payee's bank for deposit.

The formatting of the electronic check has a number of embodiments. A preferred embodiment is as an FSML document, as described above. In another embodiment, the electronic check is formatted as a series of 7 bit ASCII text lines using a restricted character set in order to be compatible with a wide variety of electronic mail systems, including those implementing the Internet Simple Mail Transfer Protocol. The format of this other embodiment of the electronic check is based on tagged value pairs. Each information line is composed of a label name and a value, e.g., amount= $19.95. In this embodiment, an electronic check is typically created with a template document, as seen in FIG. 5. The top portion 106 of the template 105 contains the payee's remittance information. The bottom portion 107 of the template contains field that the payer completes to prepare the electronic check. The template may be sent by e-mail from the payee to the payer. In which case the payer can use an editor or word processor to enter order and remittance information. The check body can also be pre-formatted by the payee with the amount, "pay to the order of", and payer's public key lines already completed, allowing the payer to enter minimal information into the body of the electronic check before signing it. Alternatively, the payer can use a general template and an editor, word processor and other application, such as Quicken, to create a properly formatted electronic check.

In any embodiment, once the template is filled in by the payer as the FSML document is complete, the electronic check may be signed by passing it through the payer's electronic checkbook. The electronic checkbook is contained within a PCMCIA card containing the payer's private signature key and certificates from the bank and the federal reserve. The certificates may be cryptographically signed letters of reference attesting to the validity of the payer's account and the payer's authority to write checks against the account, and the bank, respectively.

Figure 6:
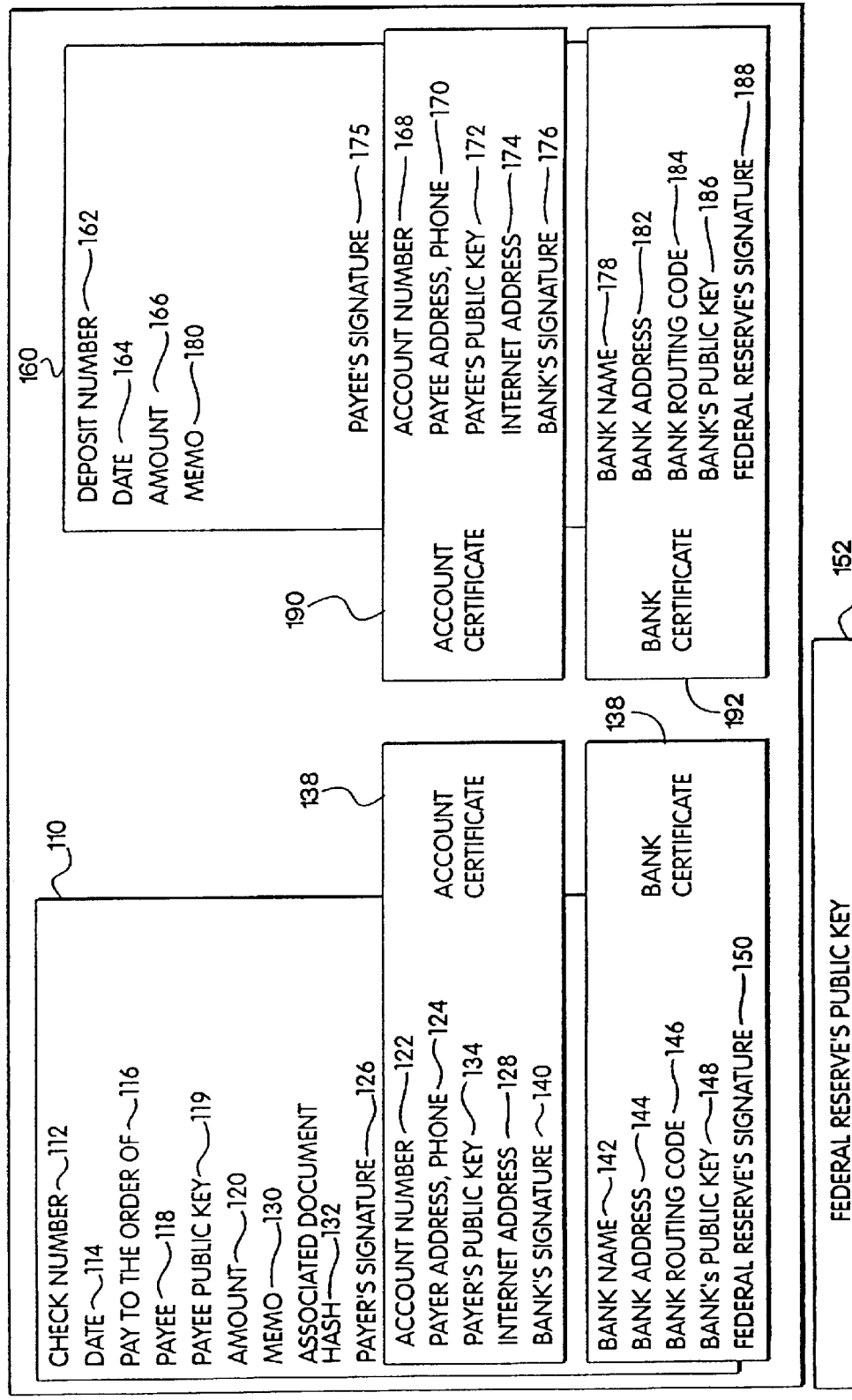
FIG. 6 is a format of an electronic check and deposit endorsement instrument.

For example, in FIG. 6, electronic check 110 contains an identification number for the electronic check 112, the date that the electronic check was created 114, an order to the bank to pay a certain sum of money 116, the name of the payee 118, the payee's public key, the sum of money to be paid 120, the payer's account number 122, the name, address and telephone number of the payer 124, and the payer's signature 126 in digital format verifiable using the payer's public signature key 134. An additional feature of an electronic check delivered over a public network is the payer's network address 128, e.g. an Internet address, to permit the payee to acknowledge receipt of the electronic check. The electronic check also may contain a memo block 130 for storing information personal to the payer and a secure hash algorithm (SHA) 132 resulting from a calculation over an associated document, to attach securely items such as an invoice received from the payee. The hash algorithm may be of the type more particularly described above.

Whenever a block must be authenticated, or tamper-proofed, a digital signature block is added to the electronic document. The signature block contains a reference to a certificate block containing a public key used to verify the digital signature. The signature block can also be used to bind multiple blocks together, so that the resulting compound document can be verified.

When combining FSML into a larger, compound document, the names of the original blocks may not be unique. As such, the document combining process also operates to handle naming conflicts when the documents being combined use block names that are not unique.

The standardized format of an electronic check makes it a flexible instrument, permitting multiple signatures, annotations and transformation into other document types. The standardized electronic check is also usable over different transportation means, such as Internet and e-mail. In particular, the transport protocols include FTP, STTP and HTTP for the Internet. The format of the electronic check is independent of the transport protocol.

Further, in the various embodiment of the invention, the format of an electronic check may be modular, in that several information lines can be grouped as a block, as seen in FIG. 7. Any number of information lines 3 grouped between begin and end lines 4 and 5 is a block 6. Each block has an identifying name which is used to reference it, and blocks can be combined to form other more complicated documents with a meta line 7. The modularity of electronic checks also allows for independent signature of any block by any entity and for use of the system for other financial instruments, such as letters of credit and loan documents.

The security and authentication aspects of electronic checks are supported by digital signatures using public key cryptography. Public key cryptography uses very large numbers and complex mathematical calculations to protect the integrity and secrecy of an encoded electronic transmission. As seen in FIG. 8, a digital cryptographic signature 101 is a long number or numbers (here expressed in hexadecimal notation) 102 which are produced by the signer's use of his private signature key and the message to be signed as inputs to the public key signature algorithm. The signature may also be accompanied by a date and time stamp 103. The cryptographic infrastructure is used to authenticate the payer and account, electronic check document and issuing bank, and to securely seal the electronic check, permitting the use of public networks for sending the electronic check. Most importantly, digital signatures may be used to verify a document after issuance.

A public key, applied to verify cryptographic digital signature, is always generated in conjunction with the private key which is used to create the signature. The payer's digital signature 126, the payer's public verification key 134, and the message which was signed are used as inputs to the public key signature verification algorithm, which produces a true or false value. Public key cryptographic signatures are useful because the signature of a signer, computed using the signer's private key, can be verified by anyone else who knows the signer's public key. Since the signer computes his signature on a document using his private key, and since the verifier verifies the signer's signature using the signer's public key, there must be a way for the verifier to trust the association between the signer (and his account information) and the public key used to verify the signer's signature on the electronic check. Cryptographic signatures are used to sign checks when they are written, co-signed, endorsed and processed. Cryptographic signatures are also used by certification authorities to sign certificates or "letters of reference" that contain a name or description of a signer and the signer's public key. Thus, anyone who trusts the certification authority and who knows the certification authority's widely publicized signature verification key can verify the certificate and trust the signer's public key for use in verifying the signer's signature.

A party signing an electronic check is the only entity in possession of its private signature key. The private signature key need never be exposed to a third party, making it difficult to forge. The private signature key generates a cryptographic signature in a secret code, which is unique and is identified only with the signer. Signature cards always keep the private key internal to the processor and memory on the card. The document to be signed is sent into the signature card, and the signature card uses the private key to compute the signature. The private key is never accessible via the card's connector.

The public signature key must be used in conjunction with a cryptographic signature verification algorithm upon receipt of the signer's signature to verify the signature. The public signature key is known and used by others, who obtain the public keys prior to or during a transaction. The use of public key cryptography allows the public keys to be used and stored independently of the private keys. However, the public and private keys are mathematically linked, since they are generated as a pair.

Tamper-resistant signature cards or other hardware devices are useful to compute the cryptographic digital signatures without the possibility of disclosing the signer's private signature key. Tamper-proofing of an electronic check and associated information is achieved using digital signatures and a secure hash algorithm. Signature cards, or special cryptographic processors, can be used to better secure the private keys and greatly reduce the need for diligence and skill on the part of the account holders to secure their keys, especially against attacks through network connections by computer hackers. Further, the signature card may keep a non-erasable log of documents signed, so that the holder can review whether all uses of the card have been legitimate.

The digital signature is to insure that the electronic document is authentic and has not been tampered with. By using the multilevel hash operation, the electronic document is able to provide improved authentication and tamper resistance. The multilevel hash operation also allows various blocks or associated documents to be bound together while still providing improved authentication and tamper resistance. The digital signature can pertain to any of the blocks or a set of blocks. Further, improved authentication and tamper resistance allows blocks to be later dropped or remove from a bundle yet the digital signature is still able to be authenticated.

Referring still to FIG. 6, one difference between an electronic check and a paper check is the presence of authenticating certificates, in particular an account certificate 136 and a bank certificate 138. The payer can expedite the establishment of trust among the parties to the transaction by enclosing with the signed check a "letter of reference" or cryptographic certificate 136 regarding the payer's account, stating the payer's name, address and telephone number 124 and Internet address 128, account number 122, and public signature verification key 134, signed by the bank holding the payer's account with its digital signature private key 140. Similarly, a second letter of reference or certificate 38 regarding the payer' bank states the payer's bank's name 142, address 144, electronic network routing code 146 and public signature verification key 134, signed by the bank holding the payer's account with its digital signature private key 140. Similarly, a second letter of reference or certificate 38 regarding the payer's bank states the payer's bank's name 142, address 144, electronic network routing code 146 and public signature verification key 148, signed by a central body such as the federal reserve with its digital signature private key 150. Therefore, anyone knowing the federal reserve's public signature verification key 152 can sequentially verify the bank's certificate 138, the account certificate 136, and then the payer's signature 126 on the electronic check.

The certificates are the electronic check mechanisms for providing a trusted identification between trading partners. The trust mechanism currently used is pre-arrangement of the transaction, so that the receiving part is assured of the secure transmission of the transaction. The structure of the electronic check system with certificates enables banks or their agents, in the role of trusted parties, to provide certificates that validate the identity and authenticity of the electronic check issuer. Trading partners will be able to validate these certificates, if desired, on-line, and conduct business without pre-arrangement, but with the assurance that the other party to the transaction is authentic.

The use of certificates in the electronic check system permits validation at any point, by anyone, in the payment cycle. Electronic checks and electronic checkbooks can be authenticated by the use of public key certificates at any point in the settlement cycle by the payee or the bank. Further, deposit slips and endorsements by the payee may be cryptographically linked to an electronic check as it is processed, resulting in an electronic document suitable for archiving and use as evidence of payment.

In order for payers to determine the public signature keys of payees, and thereby help to ensure that their checks are paid to the correct person, it may be useful to publish the public signature keys in a public director. Alternatively, the payee can furnish his public signature key and certificates with the order blank, invoice or remittance information. In this case, the payer may consult the certificate revocation list (CRL) potion of the director service to determine whether the certificate and account are still valid. Similarly, the payee may consult the CRL to determine the status of the payer's account prior to endorsing and depositing the electronic check.

An electronic check may be delivered by hand, direct transmission or public electronic mail systems. An electronic check may be printed out at the bank of first deposit and passed through the system as a paper check. The signatures and certificates are also produced with OCR and scanned by the issuing bank. Electronic checks transmitted via electronic mail be accessed at personal computers with industry-standard protocols or Application Programming Interfaces (API's), such as VIM or MAPI, or they may be embedded within dedicated application protocols such as the HTTP server protocol used by Internet World Wide Web servers. In either case, the format of the electronic check is independent of the underlying transmission protocol. Further, disclosure of the electronic check instrument during transmission will not enable fraudulent presentation by others. Thus, the payee need not acknowledge receipt of the electronic check. However, the payer's e-mail address is included to permit acknowledgment. Systems providing certified electronic mail may be used to provide a guarantee of delivery.

Upon receipt of the signed electronic check and associated order, invoice or remittance information, the payee processes the payer's order, extracts the electronic check and endorses the electronic check. The endorsement is done by the payee's electronic checkbook, which signs the check, adds its own endorsement information and appends the payee's certificate information. The payee's PCMCIA card also automatically assigns sequential transaction numbers to endorsements to ensure that each endorsement is unique. This number should be included in the deposit and clearing information, so that the payee can reconcile checks mailed to the payer's bank for cashing with the deposits recorded in his bank statement.

Upon endorsing the electronic check, the payee creates a deposit instrument 160 which is attached to the electronic check 110, as shown in FIG. 6. The deposit instrument 160 may be an FSML document type and may contain some of the same information as in the endorsement, such as the payee's account number. The deposit instrument 160 contains an identification number 162, the date 164, and the sum of money to be deposited 166. It also contains the payee's account number 168, the name, address and telephone number of the payee 170, the payee's Internet address 174 and the payee's signature 175 in digital format readable using the payee's public signature key 172. The deposit instrument 160 also may contain a memo line 180, The deposit instrument may also contain an account certificate 190 and a bank certificate 192. The account certificate 190 states the payee's name, address and telephone number 170 and Internet address 174, account number 168, and public signature verification key 172, signed by the bank holding the payee's account with its digital signature 176. Similarly, the bank certificate 192 regarding the payee's bank states the payee bank's name 178, address 182, electronic network routing code 184 and public signature verification key 186, signed by a central body such as the federal reserve with its digital signature 188. Anyone knowing the federal reserve's public signature verification key 152 can sequentially verify the bank certificate 192, the account certificate 190, and then the payee's signature 175 on the electronic check.

The endorsement function of the electronic checkbook need not be as secure as in the case of originally signing an electronic check. However, a heightened level of security is needed if the same signature card is used by the payee for both check writing and endorsement.

The endorsed check is then forwarded to the payee's bank to be deposited or cashed, with the proceeds to be deposited to the payee's account. Payments or deposits consisting of electronic checks are gathered by banks via e-mail or other protocols and cleared through standard banking channels, such as bilateral agreement, ACH or ECP, automatically following the bank routing code 146.

Upon receipt of the endorsed check after clearance, the payer's bank verifies that the check was properly endorsed using the payee's public signature key. It also verifies the payer's signature, and optionally the account and bank certificates. The amount of the check is debited from the payer's account, assuming available funds, and then stored for archival purposes. Finally, an ACH credit transaction is originated to settle with the payee bank (or multiple transactions with the payee bank may be settled in an accumulated group), which credits the proceeds of the cashed check to the payee's account at the payee's bank. If the size of the check so warrants, the payee's account may be credited by Fed Wire or other expedited processing. For example, the payer's bank may e-mail notification to the payee's bank for crediting prior to receipt of actual funds by other means.

The payer's bank will return the endorsed electronic check to the payee if it cannot be cashed, e.g. due to insufficient funds, or if the deposit transaction fails, e.g. the payee's account is closed. For example, if the deposit transaction fails, the payer's account may credited with the amount of the returned check in some flows.

The payer's and payee's banks provide statements or reports to the payer and the payee, respectively, regarding their electronic check transactions. These statements may be generated electronically or on paper. The payer's bank may include a copy of the electronic check with the payer's statement. The payee's bank may identify the payee's deposit transaction on the payee's statement, including the deposit number, so that the payee can reconcile an electronic check sent electronically to the bank for cashing with the transactions actually credited to the payee's account.

The primary security element of electronic checks is the use of an electronic checkbook in the form of a PCMCIA card, which generates an electronic check and stores a record of it in a secure check register. Possibly suitable PCMCIA cards are Tessera, National Semiconductor's iPower and the Telequip CryptaPlus card. Alternatively, the electronic checkbook may be implemented in an ISO format IC chip smart card or smart disk (perhaps without the check register due to memory limitation), or it may be implemented in cryptographic hardware processors for use by systems that process large volumes of checks or maintain a number of electronic checkbooks. The PCMCIA card is ideal for a transaction between two personal computers, but the smaller and more portable smart card is better suited to a POS transaction at a merchant's premises (if the appropriate smart card reader is implemented).

A PCMCIA card is an electronic device that provides greater security for a financial transaction. A PCMCIA card, or in the case of mainframe accounting systems, a secure black box, e.g. a Racal's Guardata, protects transactional systems from unauthorized access. The PCMCIA card is a separate, narrowly defined, secure electronic environment used in conjunction with a terminal such as a personal computer. Information passes back and forth between the PCMCIA card and the terminal or workstation.

The tamper-resistant PCMCIA card contains a mechanism to generate or store unique check identifiers and calculates and verifies digital signatures and certificates using public key cryptography. The PCMCIA card securely stores the user's private cryptographic key, which is used to digitally sign electronic checks when they are written and endorsed. The PCMCIA care is preferably initialized by deriving its own random private key using an internal hardware random number generator. Certificates are provided and backed by a Certificate Issuing System (CIS).

The PCMCIA card is also protected by providing for entry of a personal identification number (PIN). The PIN and private signature key must be stored in the electronic checkbook. Some mechanical action may be required of the payer for each new check, either reinsertion of the PCMCIA card into its port on the payer's workstation or activation by a push button on the card itself, to guard against fraudulent use of the card once it is attached to the payer's computer. Additionally, a timeout mechanism may be used. The PCMCIA card also maintains a register of checks signed and issued. The electronic check register should be read only from the PCMCIA's interface. The register may be read, but not overwritten.

Figure 9:
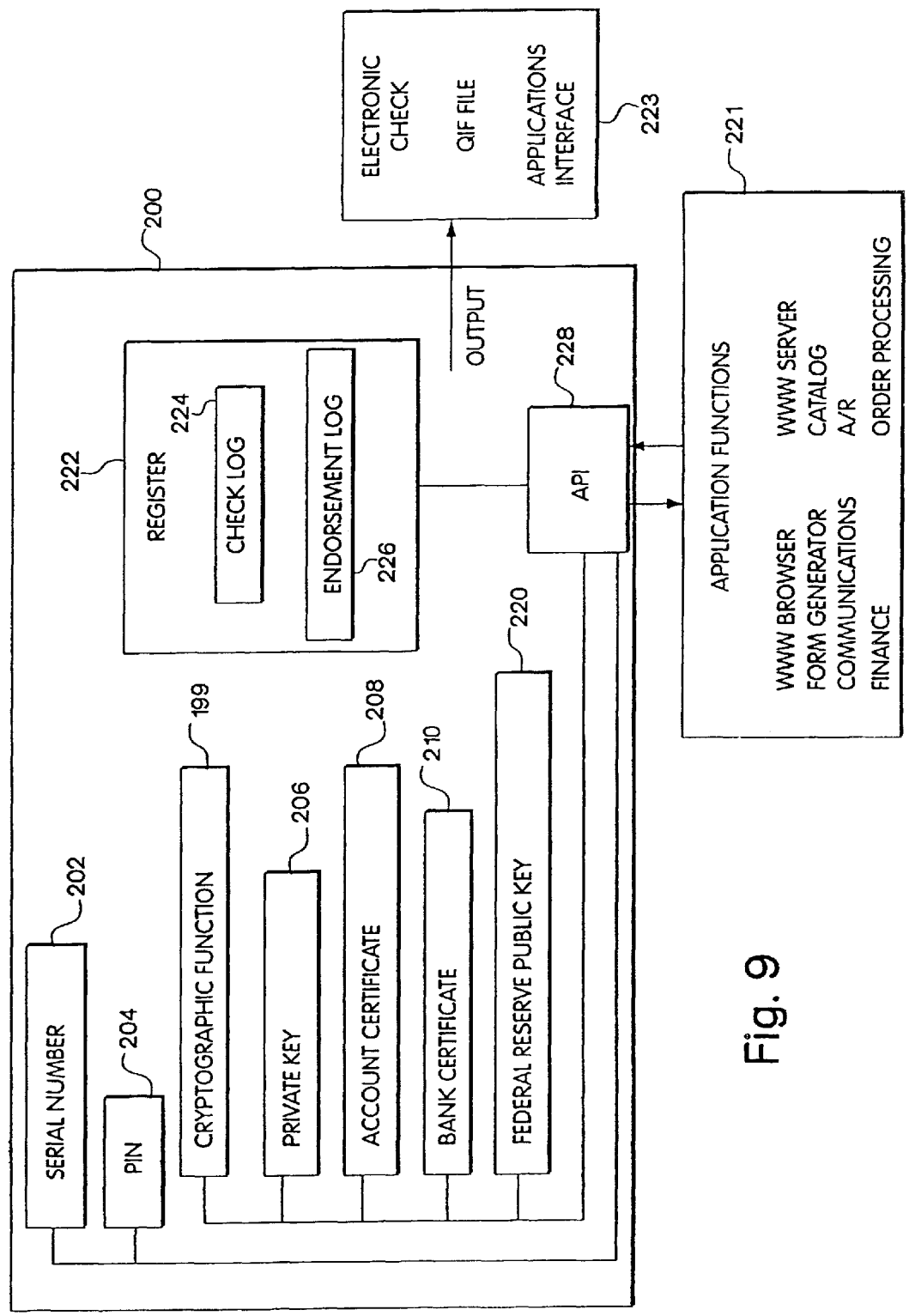
FIG. 9 is a block diagram of an electronic checkbook card.

As seen in FIG. 9, a PCMCIA card 200 must contain at least the PCMCIA card serial number 202, the PIN 204, the cryptographic function 199, the signer's private signature key 206, and check and endorsement logs 224 and 226 in a register 222. The public keys for the federal reserve 220, the account certificate 208 and the bank certificate 210 may be kept on the PCMCIA card, but storing them in the workstation permits verification using the federal reserve's public key in the case of suspected alteration of the certificates. The electronic checkbook should be accessed using a standard API 228. The input and output of the electronic checkbook should be compatible with mail user agents, file editors and other software for general uses, as well as specialized financial applications, on a variety of platforms including personal computers and workstations.

The electronic check book contains a register 222 that functions like a conventional checkbook register, but without account balances. When an electronic check is created, the electronic check number, date, amount, payee, signature and hash are recorded in a check log 224. For each deposit made into the electronic check account endorsed by the electronic checkbook, the deposit number, date and amount are stored in an endorsement log 226. If the electronic checkbook has the capability, there may also be entries for bank fees and interest earned on the account. Integrating the electronic checkbook with other software applications would allow the electronic check account to be automatically balanced. Since the register may only have a limited memory space, the oldest transactional items are removed automatically when the memory has been exhausted.

The PCMCIA card 200 acts as an electronic checkbook in conjunction with various application functions 221. For example, an interface with the Internet is set up in a World Wide Web browser and server. There is also a form generator for electronic checks and other forms. In particular, a merchant will have applications such as a sales catalog, accounts receivable and order processing. There are also communications and other personal finance application functions. The output 223 of the PCMCIA card is an electronic check, either signed by the payer or endorsed by the payee. A QIF formatted file or an applications interface file are generated in software outside the electronic checkbook.

Figure 10:
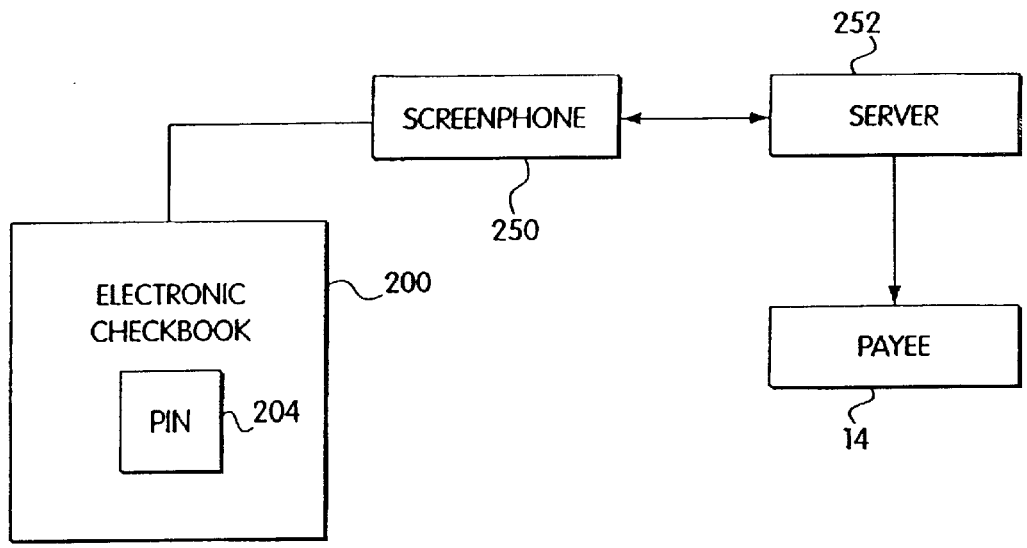
FIG. 10 is a block diagram of the interaction between a screen phone and a server.

The electronic checkbook 200 should also be compatible with a screen-based telephone 250 connected to a dial-up server 252, as seen in FIG. 10. In this case, most of the contents of the electronic check would be assembled by the screen phone 250 and the server 252 using information stored by each. The variable information, such as the payee and amount, would be sent from the screen phone to the server as part the on-line transaction. To complete the electronic check, the screen phone would enable the electronic checkbook 200 using the payer's PIN 204, the electronic checkbook would sign the electronic check, and the screen phone would send the signature and assemble the completed and valid electronic check for mailing to the payee 14.

The PCMCIA card prefixes each electronic check with its serial number, which is imbedded in the processor of the card during its manufacture. This number helps determine whether the electronic check was signed by a legitimate electronic checkbook in case of fraud investigations. The PCMCIA card also automatically increments the numbers of the electronic checks. Since the check numbers for each PCMCIA card will be sequential and since each PCMCIA card will have its own public signature key, every check will be unique.

Another feature of the PCMCIA card is the use of a secure hash algorithm (SHA), such as an NIST Secure Hash Algorithm, with respect to documents or information associated with or attached to documents or information associated with or attached to an electronic check. This feature "seals" the associated information and binds it to the signed electronic check. The payee can then verify that the associated information belongs with the electronic check and has not been change after the electronic check was signed.

The only function which must be performed by the PCMCIA card is creating the signature, since the payer's private signature key can never be allowed to leave the PCMCIA card, for security reasons. However, better security is achieved if the SHA of the electronic check is also performed by the PCMCIA card, so that the PCMCIA can be sure that the number, date, payee and amount logged into the PCMCIA card are the ones used in the computation of the SHA.

The electronic checkbook is issued by the bank that holds the electronic checking account. Initialized electronic checkbooks may be sent to the account holder, in which case the PIN should be sent separately for security reasons. Alternatively, uninitialized cards may be distributed to bank branches. The bank officer can then use a trusted initialization terminal and a special smart card identifying the bank officer to establish a secure connection to a centralized CIS. The new card is inserted into the terminal to be initialized. This method has the advantage of making electronic checkbooks immediately available to new customers, accounts can be added to electronic checkbooks already being used by the customer, and certificates can be refreshed prior to their expiration dates without issuing new electronic checkbooks. The bank, or its agent, is also acting as a certifying authority since it is responsible for authenticating the identity of the electronic checkbook and PIN are delivered to the correct person. The electronic check may also support correspondent banking relationships, and will allow another bank or approved third party to act as a stand-in processor for electronic checks for banks that are unable to directly support the processing requirements for electronic checks. This will facilitate electronic check deployment in a secure way without affecting the traditional bank-customer relationship.

Similar functions to those of the PCMCIA card can be served by large scale cryptographic processors, such as Atalla or Racal Guardata boxes, for large operations where individual signature cards are impractical. For servers or mainframes which issue or endorse a large volume of checks, or which issue or endorse checks on behalf of a number of account holders, the processing and key storage capacities of signature cards may be exceeded. In this case, special cryptographic hardware must be used.

Although the electronic check's primary use is to make electronic payments on public networks, it may be used in any situation where a paper check would be used. For example, banks will use electronic checks to gather electronic deposits from public network users, providing an opportunity for complete full service electronic remote banking anywhere the customer is connected. POS and ATM implementations are also possible.

The electronic check also provides a generic model for all electronic, digitally signed and authenticated financial instruments. The check provides a well understood model for payment, and its electronic analog is necessary for electronic commerce, even if other forms of electronic payment exist. The electronic check will tie other forms of payment into the financial infrastructure, since checks end up involved at some point in most payment mechanisms.

Through specifications of user-defined attribute parameters and routing information, the electronic check, unlike a paper check, can be made to resemble other financial payments instruments. The flexibility of the parametric approach enables multiple electronic payments instruments to meet current needs, while providing for new financial instruments. The electronic check may embrace a wide variety of the debit and funds transfer functions found in today's banking, as well as other functions yet to be introduced. The provision of new parameters would enable a variety of simple and compound transactions, such as cashier's and certified checks, drafts on a savings account or lines of credit, traveler's checks, credit card debits or credits, foreign or multi-currency drafts, and "split" or "limit" checks that may be endorsed "up to" a predefined limit. These possible instruments will present new processing options. For example, an electronic check may be made out such that it is valid p to a certain amount, e.g. for a hotel room deposit. When endorsed, the electronic check can then be endorsed for the actual amount of the expense, up to the previously defined limit. Other examples may include letters of credit, loan agreements and loan applications. In some cases, changing the instrument type may change the conceptual flow, or routing information; in other cases, the flow may remain unchanged.

Figure 11:
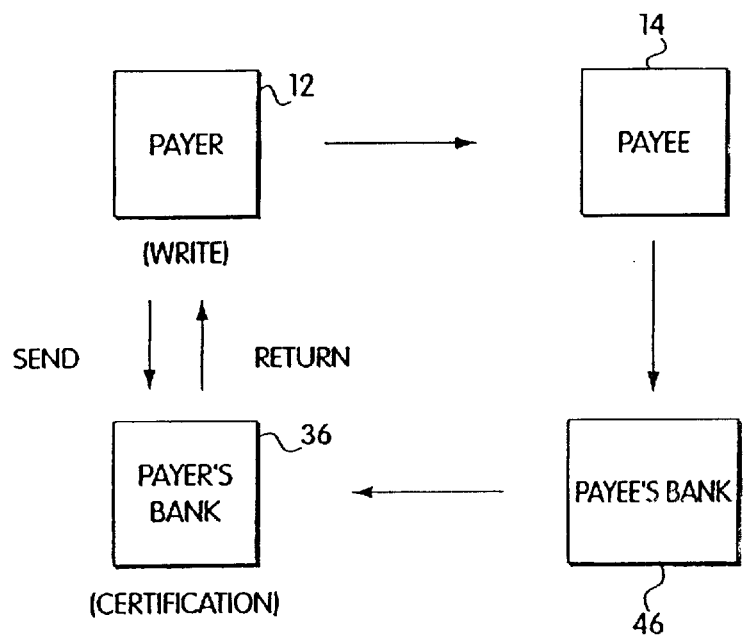
FIG. 11 is a block diagram of a certified check transaction.
Figure 12:
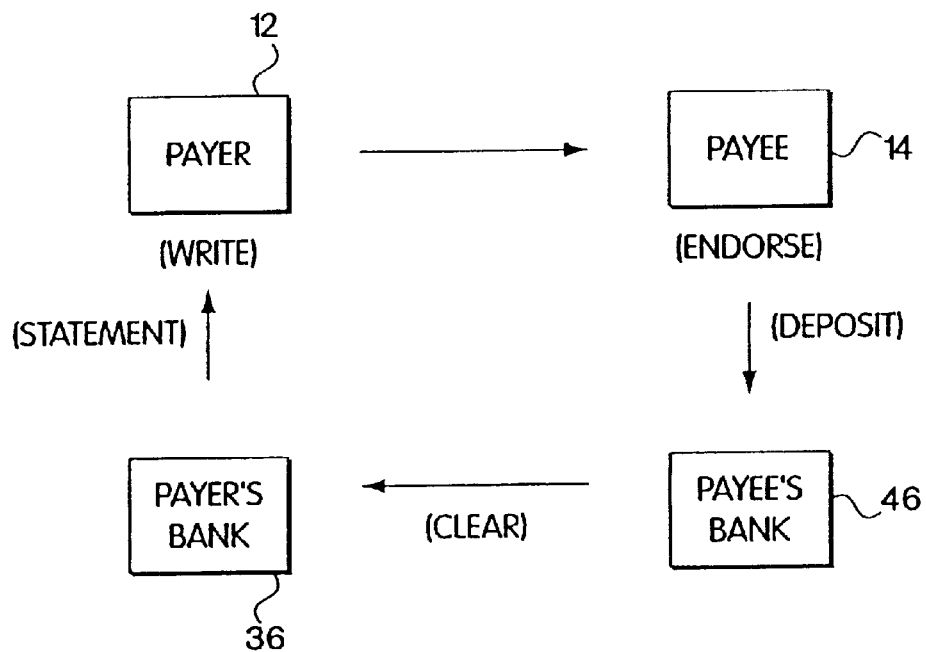
FIG. 12 is a block diagram of a normal transaction flow.
Figure 13:
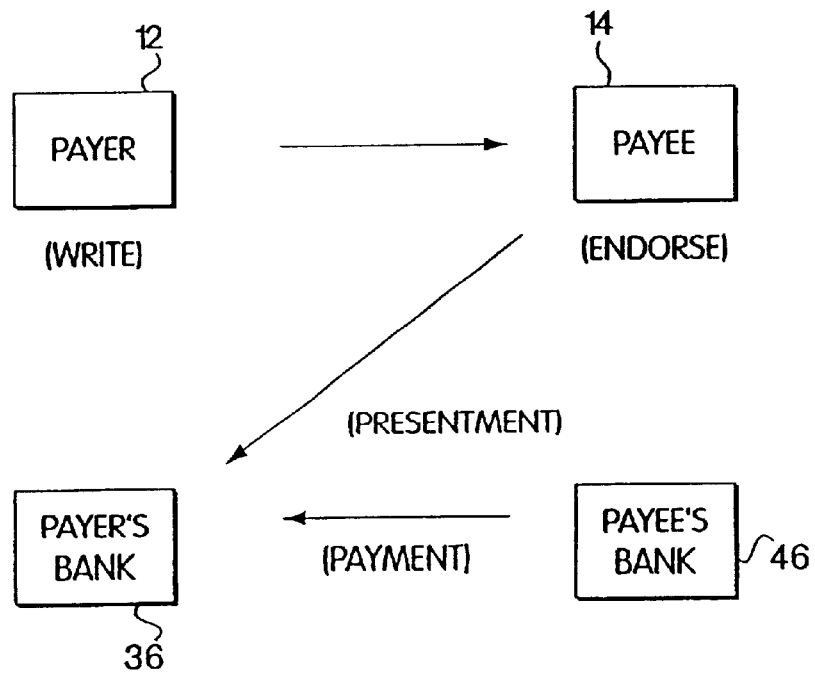
FIG. 13 is a block diagram of a cash and transfer transaction flow.
Figure 14:
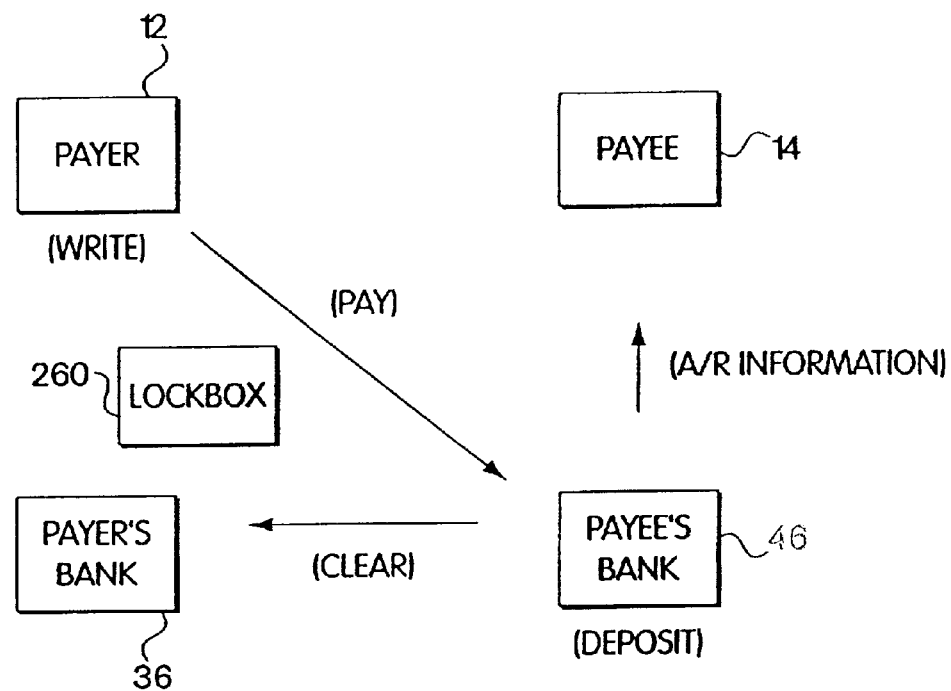
FIG. 14 is a block diagram of a "lockbox" transaction flow.
Figure 15:
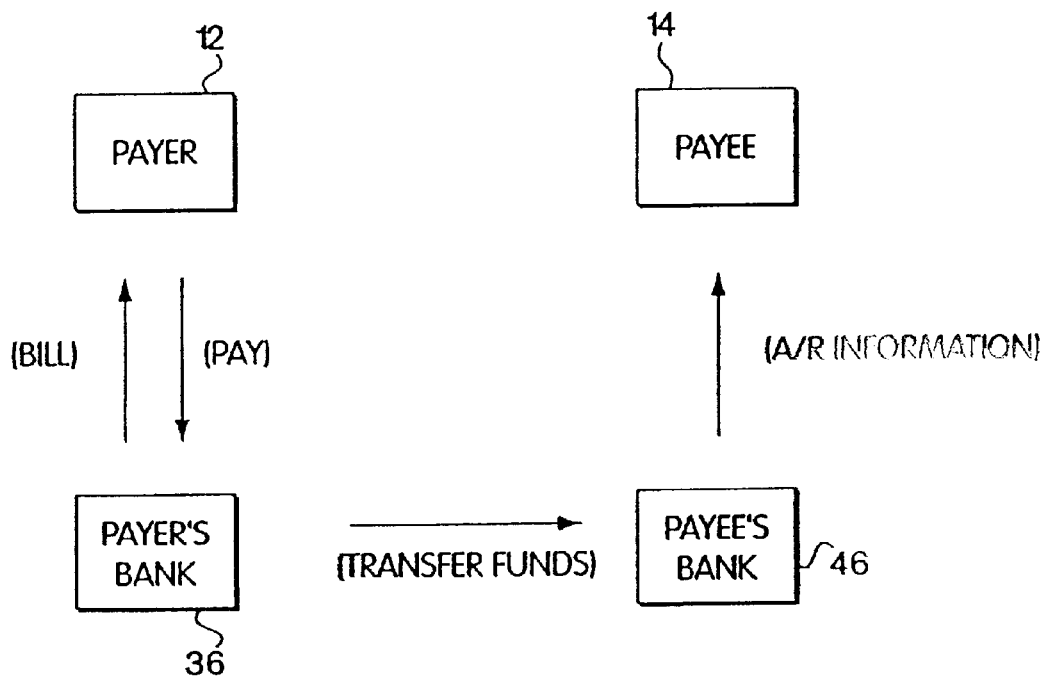
FIG. 15 is a block diagram of a funds transfer transaction flow.

For example, as seen in FIG. 11, a certified electronic check involves a payer 12 creating an electronic check in the usual manner as described above. Certified checks are endorsed and cashed similar to normal checks, except that the payee 14 is guaranteed that the funds are available. The payer 12 e-mails the electronic check to the payer's bank 36 for certification. The bank may require the use of privacy enhanced mail or an equivalent to ensure the identity of the enhanced mail or an equivalent to ensure the identity of the payer and that the communication with the payer is confidential. The bank will then append a certifying signature to the check and e-mail it back to the payer. Upon receipt of the certified electronic check, the payee can verify the bank's certification signature as part of the validation of the check.

As seen in FIGS. 12–15, there are multiple scenarios for the functional flow of electronic checks. In the "deposit and clear" scenario (FIG. 12), the payer 12 receives a bill or invoice from the payee, issues an electronic check, and sends it to the payee. The payee 14 endorses the electronic check and presents it to his bank 46 which, in turn, will settle it with the payer's bank 36. This is the usual format, as described in detail above. In the "cash and transfer" or "Z" scenario (FIG. 13), the payer 12 receives a bill or invoice from the payee, issues an electronic check and sends it to the payee. The payee 14 endorses the electronic check and presents it directly to the payer's bank 36, which sends payment to the payee's account at his bank 46. For the "lockbox" scenario (FIG. 14), the payer 12 receives a bill or invoice from the payee 14, issues an electronic check, and sends it to the payee's bank 46, either directly or via a lockbox 260 or other secure intermediary. The payee's bank 46 then sends accounts receivable information to the payee and clears the payment with the payer's bank 36. In this scenario, there may be no payee endorsement. Finally, in the "funds transfer" scenario (FIG. 15), the payer 12 receives a bill or invoice from his bank 36 (assuming electronic bill presentment allows for capture of the payee's bills by the payer's bank), issues an electronic check and sends it to his bank. The payer's bank 36, in turn, transfers funds to the payee's account at the payee's bank 46, which sends a record of the transaction to the payee 14 with accounts receivable information.

It is clear that electronic checks can be used directly between individual parties, or through third party service providers. Electronic checks can be exchanged consumer to consumer, consumer to business, business to consumer, and business to business. If the payer is a business, then the requirements for signing and logging capacity in the electronic checkbook may be greater due to volume requirements.

The formats of an electronic check and the entire electronic check system will be uniform, so that the electronic check system may be interconnected and used in conjunction with standard Application Programming Interfaces (API's), such as standard electronic checkbook interfaces and electronic check display interfaces. API's apply on the level of individual check processing as well as integration of the entire system. For example, the C language may be used to define an electronic check with field such as the date, the amount and the payee. Also, the Internet World Wide Web browser interacts with the electronic checkbook using an API to create the complete electronic check. The electronic check API's do not change, so that the system may be interfaced with any system by rewriting the particular system API and the link to the electronic check system.

For example, as seen in FIG. 16, an electronic checkbook 200 sends an electronic check over the network 65 after interfacing with a driver 201 at a connector interface 205. The driver 201 works under a driver API 203, which is connected to the signer's application software 207. Through a mail API 209, the completed electronic check is sent over the network 65.

The electronic check system may be considered a module which provides services to other modules and to API's. The flow of an electronic check through the system is governed by a series of protocols. The API's provide electronic check services to user interface applications, to financial applications such as bill payment, and to third party applications. The modular design of electronic checks also permits separation of the cryptographic functions from the applications which write and endorse checks, both physically and logically, to facilitate application of the cryptographic infrastructure to secure other financial instruments or documents; i.e. two cards may be used.

The five primary applications and API's needed for the electronic check embodiment of the present invention are management, check writing, check acceptance and endorsement, check clearing and reconciliation. Management functions allow for card issuance, inactivation, reactivation, and signature key management functions. Check writing is assumed to be performed by the payer, acceptance and endorsement by a payee, clearing by the banks, and reconciliation by the payer. Most users and organizations will assume the roles of both payer and payee, but at different times.

There is a base set of supporting modules. These base modules provide for the creation, destruction, and manipulation of a parameterized electronic financial instrument (the electronic check), the interpretation of such instruments as electronic checks, the generation and verification of digital signatures on the payment instruments, and the interaction with electronic checkbook hardware devices.

API functions for supporting the application needs described include a "write" function, for creating an electronic check, binding it to an attached document (if present) and signing the electronic check; a "co-sign" function, for appending a second signature to the electronic check; a "verify" function, for verifying signatures on a check and validating the binding to an associated document (if present); an "endorse" function, for verifying signatures on the check and if valid, appending an endorsement and signing the check to be deposited or cashed; a "register read" function, for reading the contents of the check register contained in the electronic checkbook; and a "registry entry" function, for appending an entry to the check register.

For example, an electronic check an be attached to electronic remittance information provided by a remote payee. This enables the payment to be made, routed correctly and automatically posted to both parties' accounting systems. Integration with micropayment accounting systems for high volume, small value financial transactions will enable those systems to settle accounts using an electronic check. The standardization of the electronic checkbook interfaces and the API's to access electronic checkbook functions simplifies integration with a variety of home and small business accounting and communications software packages. By defining the layout of the electronic check, the information it contains (e.g., account number and amount) can be readily extracted from the electronic check and used in other applications through the API's.

Additional API functions are used to process ancillary electronic messages such as acknowledgment of deposit, returned checks, and electronic statements. The parametric financial instrument approach allows reuse of the cryptographic infrastructure, especially the verify function, to safeguard the integrity of these messages. For instance, the verify function can be used by the payee to verify the signature of the payer, as well as by the payee's bank and the payer's bank to verify check signatures and endorsements prior to further processing to cash or clear the electronic check.

The API functions will be implemented by a combination of software operating in the user's personal computer and in the electronic checkbook hardware. In the case of a PC Card, using the PCMCIA interface and standard Card and Socket Services, most of the functions may be implemented on the PC Card since it can support substantial processing, memory and interface bit rate. This approach maximizes the portability of electronic checking information because the electronic checkbook register function is physically coupled to the signature function.

Figure 17A:
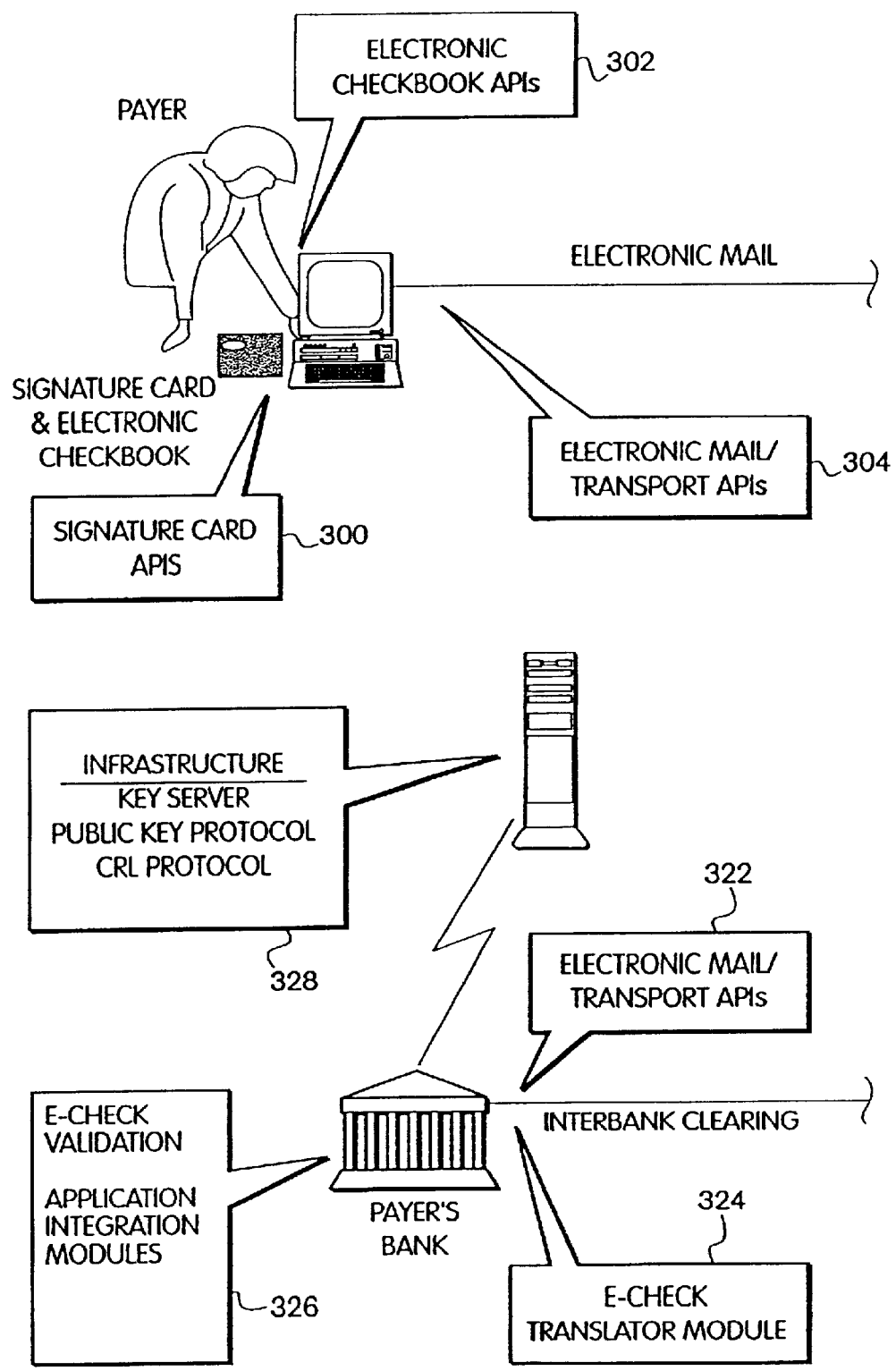
FIGS. 17A and 17B are block diagrams of electronic check API's, modules and protocols.
Figure 17B:
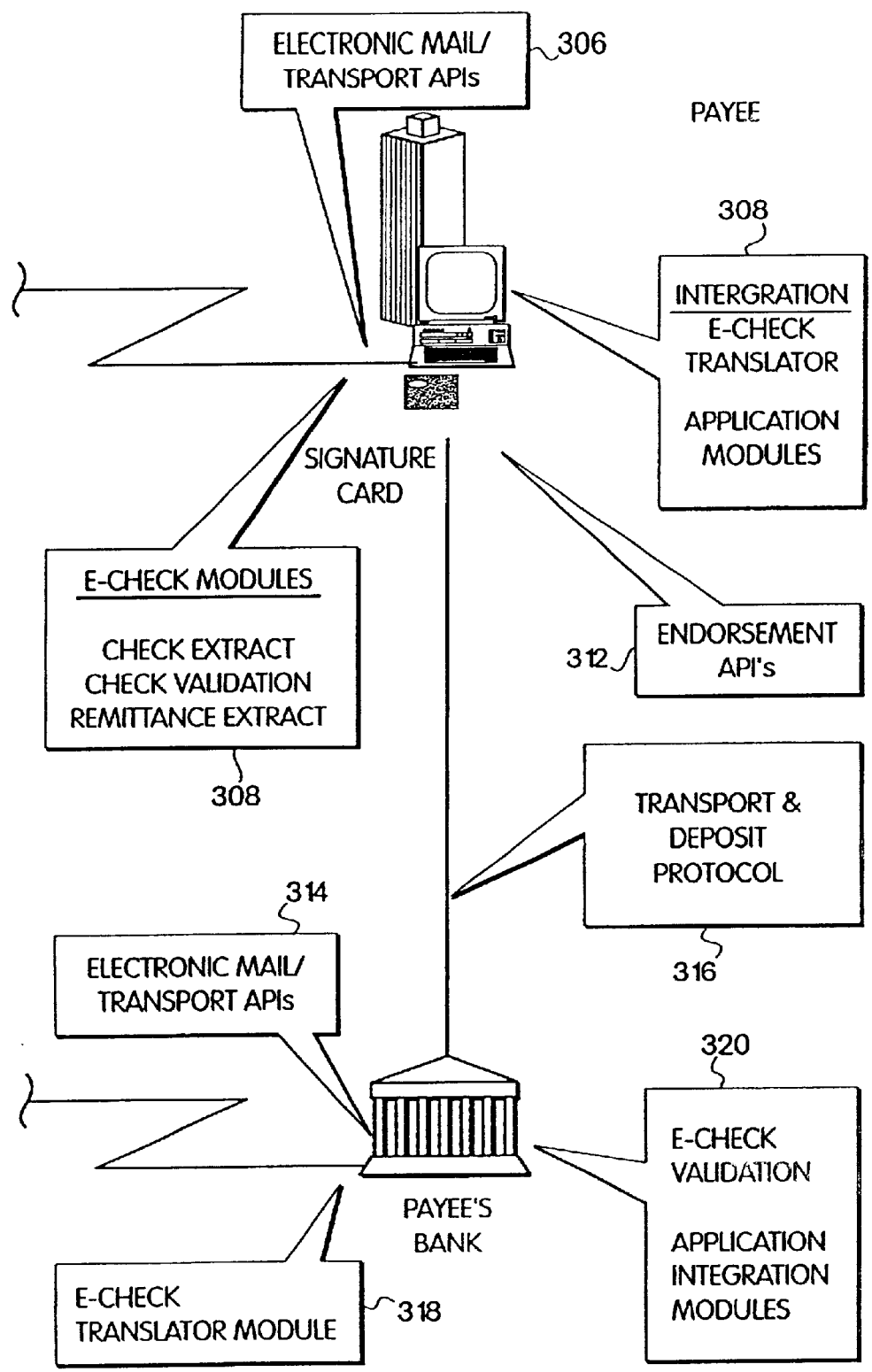
Figure 18:
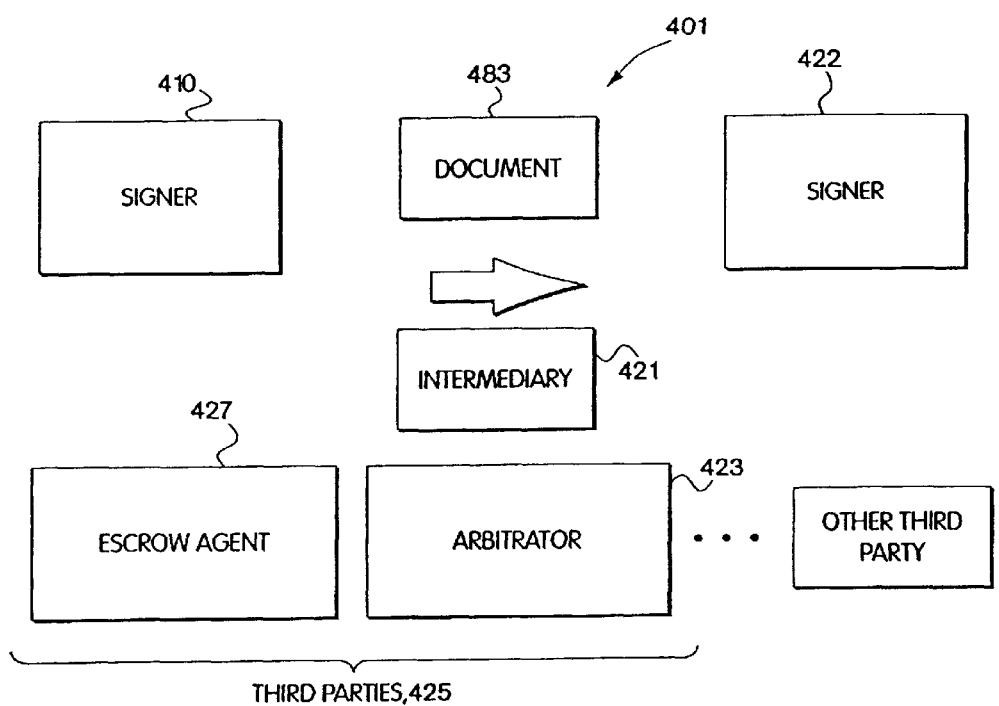
FIG. 18 is a block diagram depicting a contract transaction.
Figure 19:
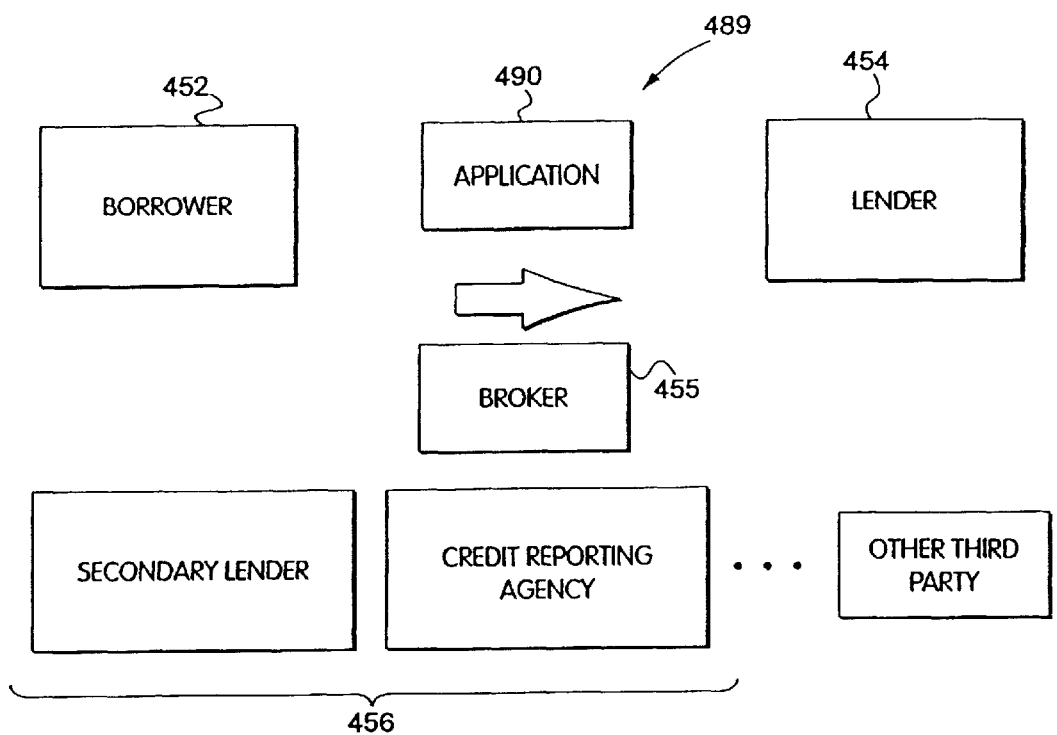
FIG. 19 is a block diagram depicting a loan application transaction.
Figure 20:
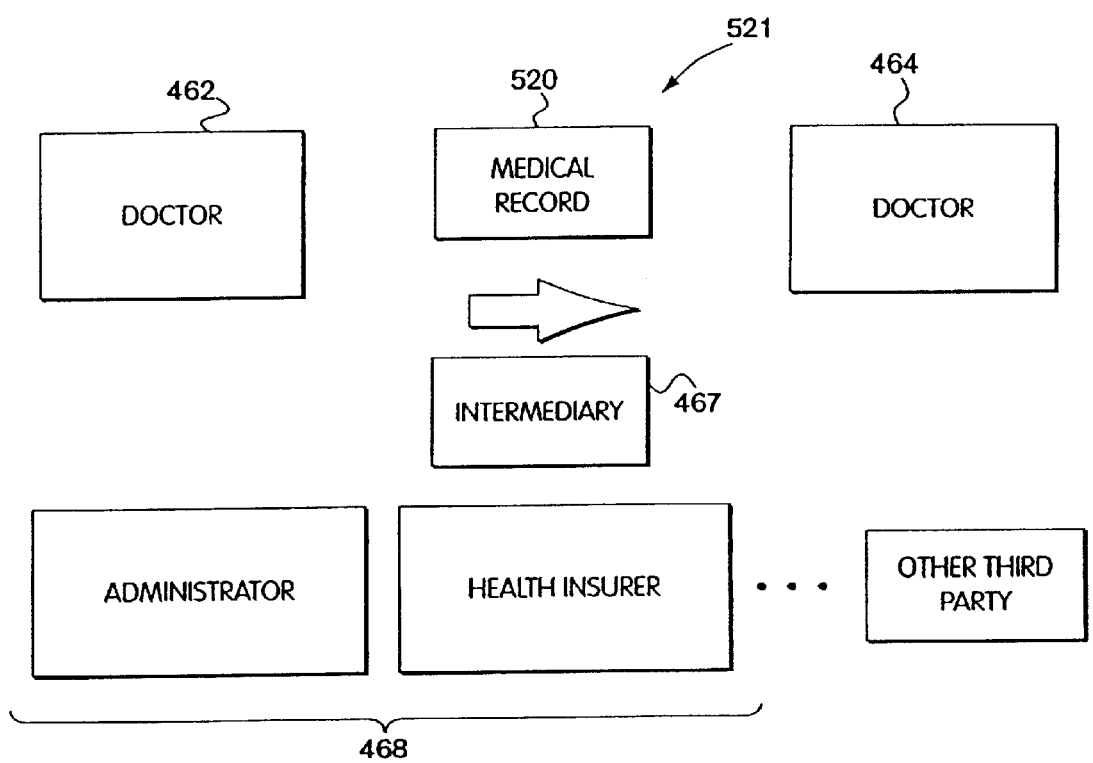
FIG. 20 is a block diagram depicting a medical record transaction.
Figure 21:
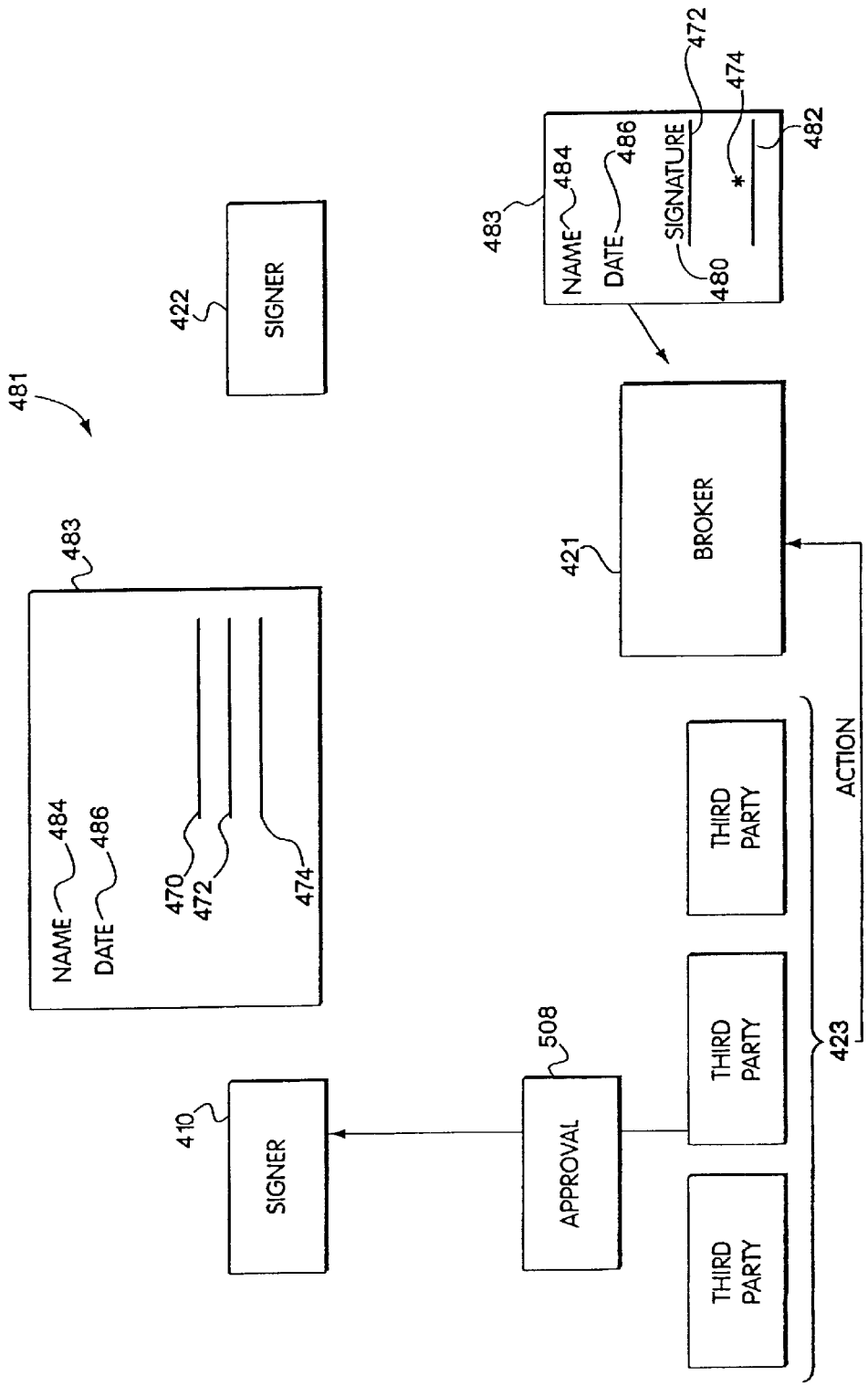
FIG. 21 is a block diagram depicting additional details of a contract transaction.
Figure 22:
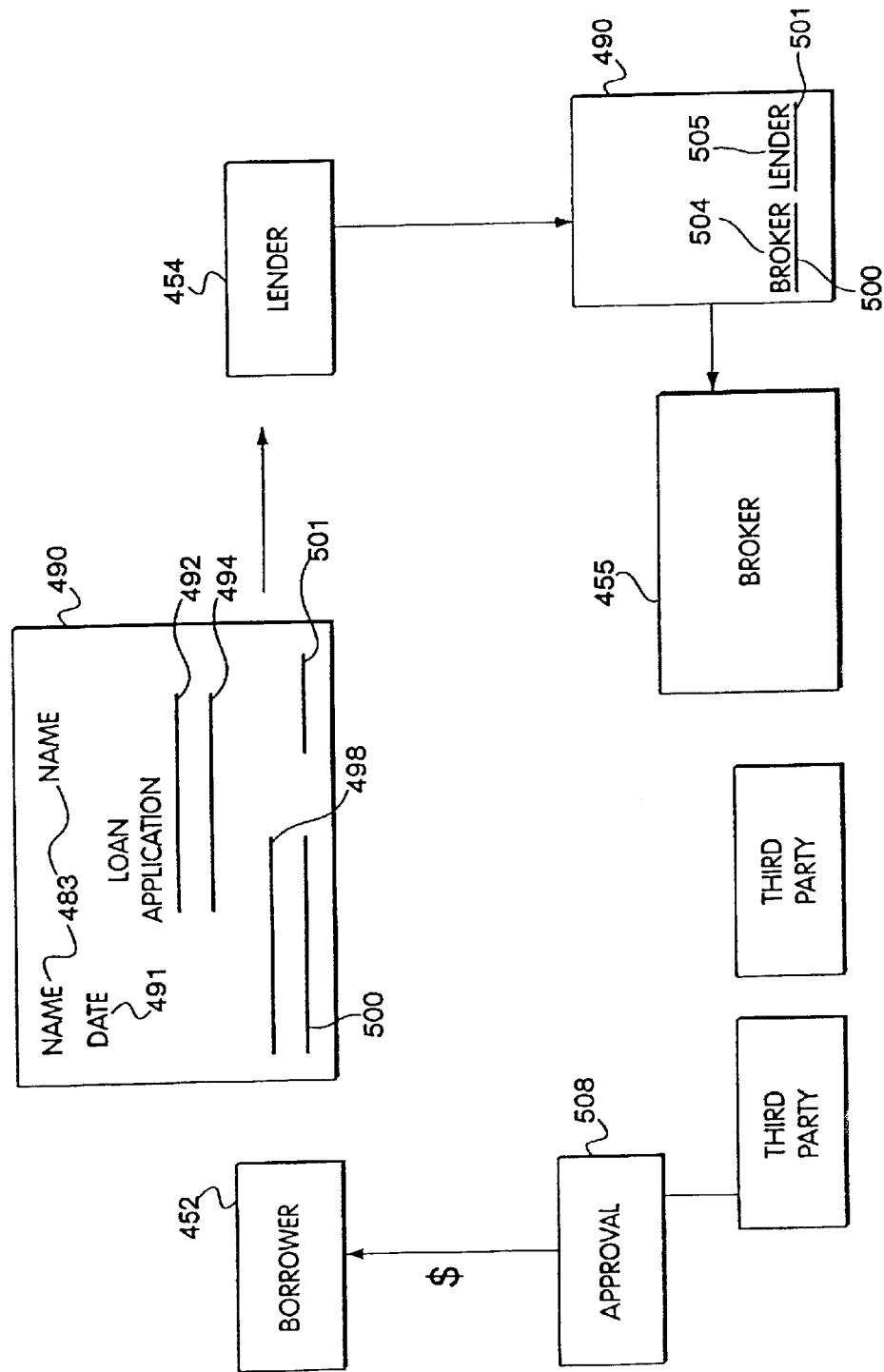
FIG. 22 is a block diagram depicting additional details of a loan application transaction.
Figure 23:
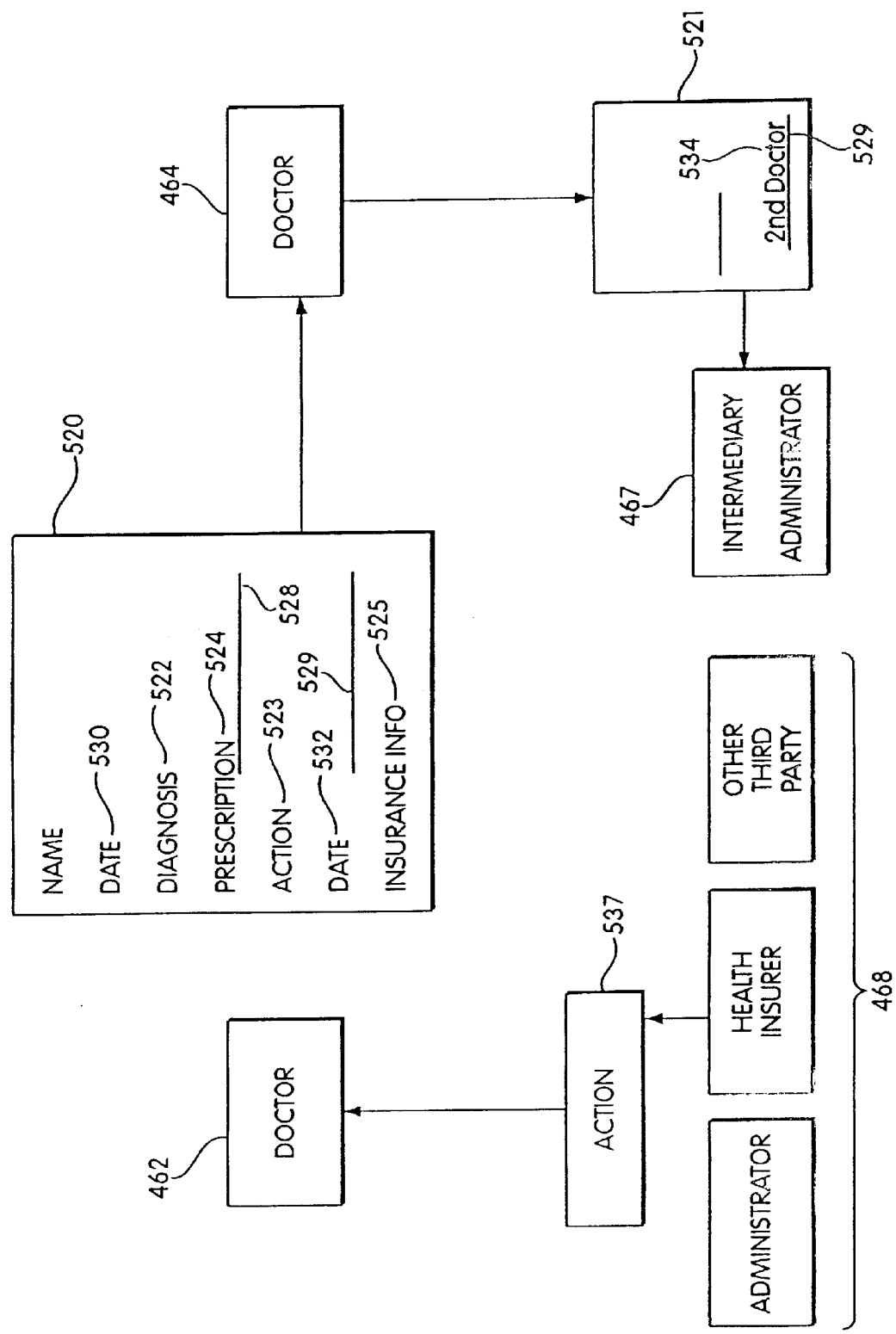
FIG. 23 is a block diagram depicting additional details of a medical record transaction.

The electronic check functions in an environment of programmatic tools, including interacting API's, modules and protocols. As seen in FIGS. 17A and 17B, an electronic check is generated at the payer's workstation using signature card API's 300 and electronic checkbook API's 302. The electronic check is transmitted by the payee using electronic mail and transport API's 304. the payee's workstation also receives the electronic check through its electronic mail and transport API's 306. The electronic check is integrated into the software of the payee's workstation using an electronic check translator module and is acted upon by the software in application modules 308. The electronic check modules 310 include extraction of the check from the transmission, electronic check validation, and extraction of the remittance originally sent from the payee to the payer. After applying endorsement API's 312 to endorse the electronic check, the payee's workstation transmits the endorsed electronic check to the payee's bank for deposit using its electronic mail and transport API's 306.

The payee's bank receives the endorsed electronic check via its electronic mail and transport API's 314 according to a defined transport and deposit protocol 316. The modules applied by the payee's bank include an electronic-check translator 318, electronic check validation and application integration modules 320. After interbank clearing, the electronic check with the payee bank's endorsement is sent electronically to the payer's bank, which receives the processed electronic check through its electronic mail and transport API's 322. The payer's bank also has modules such as an electronic check translator 324, and electronic check validation and application integration modules 326. The electronic check infrastructure is governed by a computer at the payer's bank or its agents which contains protocols 328 for the key server, public keys and the CRL.

The electronic processing scheme may also be applied to "exceptional" cases, such as electronic checks returned due to insufficient funds in the payer's account. Since exceptions processing provides for dealing with a problem in the normal flow of the electronic check through the system, the conventional paper check procedure may be necessary, although aspects of the electronic procedure may be used as support for more expedited exceptions processing.

Solutions to the problem of potential fraudulent usage of electronic checks must be built into the system at each stage of the processing of an electronic check to ensure the integrity of the entire system.

The security measures discussed above will eliminate most of the causes of losses due to bad checks, including forgery, alteration, duplication, and fraudulent depositing. Forgery is prevented by ensuring that digital signature keys are stored in secure hardware devices and through appropriate controls over the validity of electronic check certificates. Alteration is prevented by the application of digital signatures to the electronic check and through the use of the SHA function which creates a unique digest of the electronic document.

Duplication is a somewhat more difficult problem to prevent, since by its very nature an all-electronic document can be easily reproduced. Although each of the payee, the payee's bank and the payor's bank verifies that there is no recent duplicate check, the problem of duplication is addressed in several additional ways. First, electronic checks must be dated and will expire more rapidly than paper checks. Second, electronic check certificates will also expire, preventing their use after a given time period. This ensures that the accounts are periodically refreshed, and that the bank has an opportunity to ensure the integrity of the secure key storage device. Third, the issuer bank keeps an archive of electronic checks which have been presented previously. In addition, an "active" check file will be used against which checks can be matched. This file need only store the checks for valid dates, as mentioned above, and the electronic check serial number and hash information to identify a duplicate. Also, the payer may send check details such as the check number, date, signature, payee and amount to the payer's bank at the same time as the electronic check is sent so that the issuer's bank can maintain a file of used electronic checks. This file can be used to determine if a duplicate electronic check was issued and paid by the payer's bank. The combination of these efforts should effectively minimize the risk of a duplicate electronic check successfully flowing through the payments system.

Fraudulent depositing is another significant issue, since electronic checks which are sent unencrypted could conceivably be deposited or "cashed" by someone other than the intended recipient. The electronic check provides for application of the intended recipient's cryptographic keys to minimize this problem.

In the event that an electronic checkbook is compromised, e.g., lost, stolen, or repudiated by a customer, then the certificates for that electronic checkbook can be revoked.

Ensuring the confidentiality of critical customer information is a priority for any network payments instrument. To this end, the electronic check need not contain existing checking account numbers which could be intercepted and then used to commit fraud by paper checks. Digital account numbers may be linked with non-electronic account numbers so that both types of transactions may take place with respect to the same account. Encryption of an electronic check is not required to prevent fraud due to the use of private key cryptographic signatures. However, electronic checks and other parameterized payment instruments may be encrypted, where possible, during transmission between parties to ensure confidentiality.

Tamper-resistance of the PCMCIA card is also needed to the extent necessary to make it economically unattractive for attackers to steal signature cards, extract the private key, and pass bad checks using the private signature key before the card is reported stolen and disabled. Any attempt to extract the private signature key should result in evident alteration of the card and should take at least a few days to succeed. However, an extremely high degree of tamper-proofing is not necessary, since the card only contains private information for one or several accounts (rather than system level secrets) and since the card holder has an incentive to report theft or tampering (rather than to extract a secret to use for fraud or counterfeiting).

Most importantly, the account and bank certificates can have expiration dates in order to limit the time during which electronic checks can be written. An account may be closed prior to the expiration of the account certificate for other security reasons, preventing verifiers from knowing that the signature on the electronic check is good until it clears. If the account is closed, its associated certificates are revoked. This is no different from the current situation in which someone continues to write checks using check blanks from a closed account. The rapid clearing of electronic checks will deter this behavior, and banks can offer automated check verification services which verify signatures, account status and funds availability.

Although FSML is primarily described with respect to electronic checks, FSML is a flexible structure that allows many other documents to be built from these primitives while retaining a standard format which can be partially verified during processing.

The present system and method offers a number of advantages over existing systems for processing of signed documents. The document type definitions of the present invention permit the design of transaction document types according to the logical purpose of blocks of content of such signed documents. The document type definitions thus permit a wide range of flexibility in structuring documents for meeting legal requirements and other requirements for such documents. For example, in the electronic check embodiment of the present invention, documents may be produced that comply with existing legal structures for paper checks.

The flexible document structures also permit the user to design documents that can be accessed by a wide range of transport systems and that can be manipulated by a wide range of computer systems. Thus, in the electronic check embodiment of the present invention, the instruments created with the present system may be accessed and manipulated by existing computer systems for demand deposit accounts.

Other embodiments of the present invention are further described and are within the scope of the invention.

Figure 24:
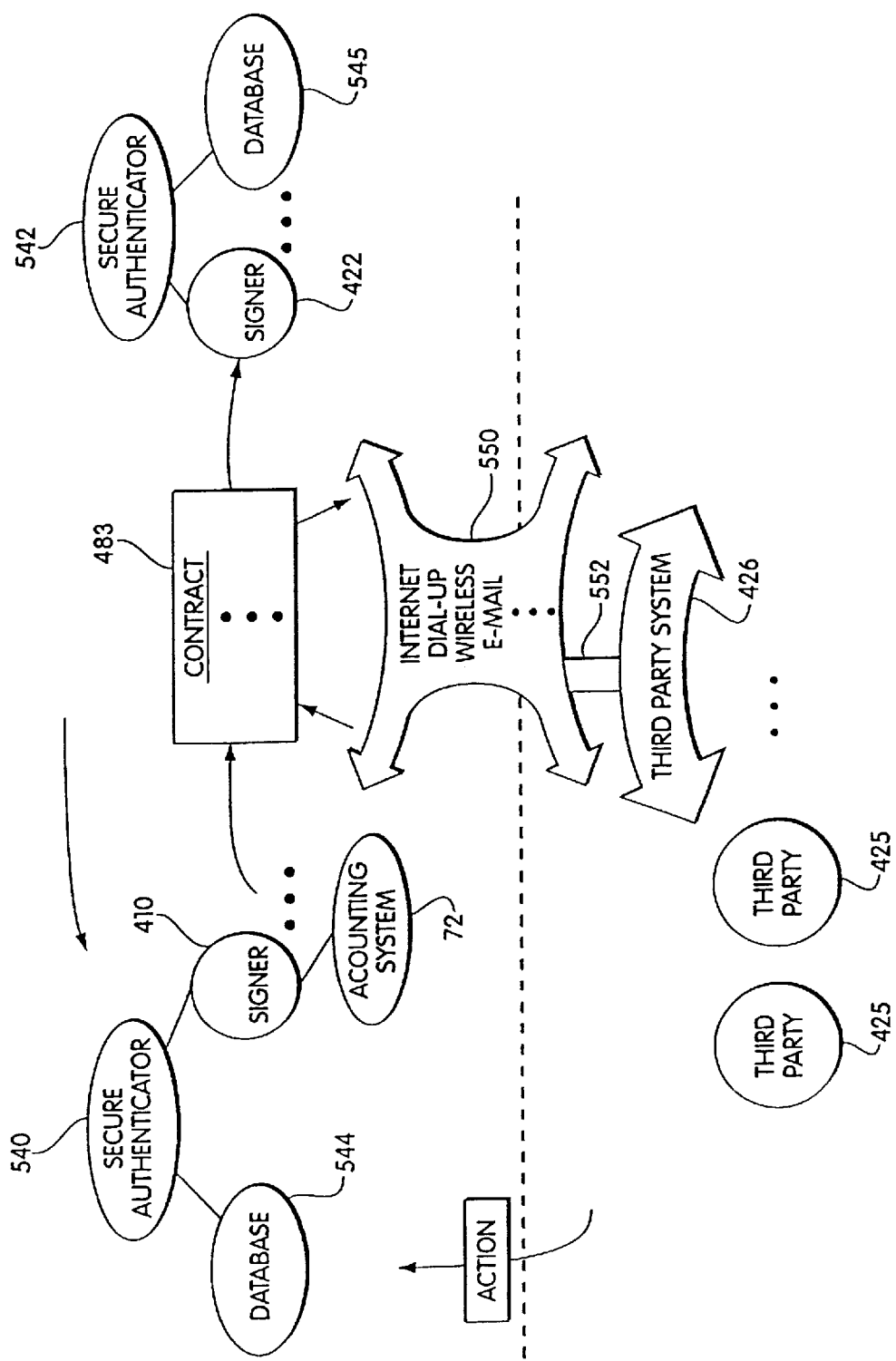
FIG. 24 is a block diagram depicting use of a computer network in a contract transaction.

As seen in FIG. 24, the execution of a contract 483 may take advantage of publicly available electronic networks 550 such as the Internet, dial-up networks, wireless networks or e-mail. As seen in FIG. 24, a transaction is initiated when a first signer 410 signs a legal document 483. The first signer may have a secure authenticator 540 which enables the first signer 410 to digitally sign the legal document 483. The first signer may have a database 544 which records the transaction in which the first signer 410 signs the legal document 483. The document may then be transmitted to a second signer 422 by the network 550. The second signer may then sign the document using the second signer's secure authenticator 542 which permits the second signer 422 to digitally sign the legal document 483. The second signer's computer system also includes an electronic database 548 to record the second signer's signature. When signed by the second signer, the document may be sent via the network 550 through a network connection 552 to one or more third parties 425. The third parties 425 may have various types of proprietary networks 426 including ATMs or the like. Signatures, transmissions, data storage and other functions are highly similar to those detailed for the electronic check above, as will be readily apparent to and still in the act.

Figure 27:
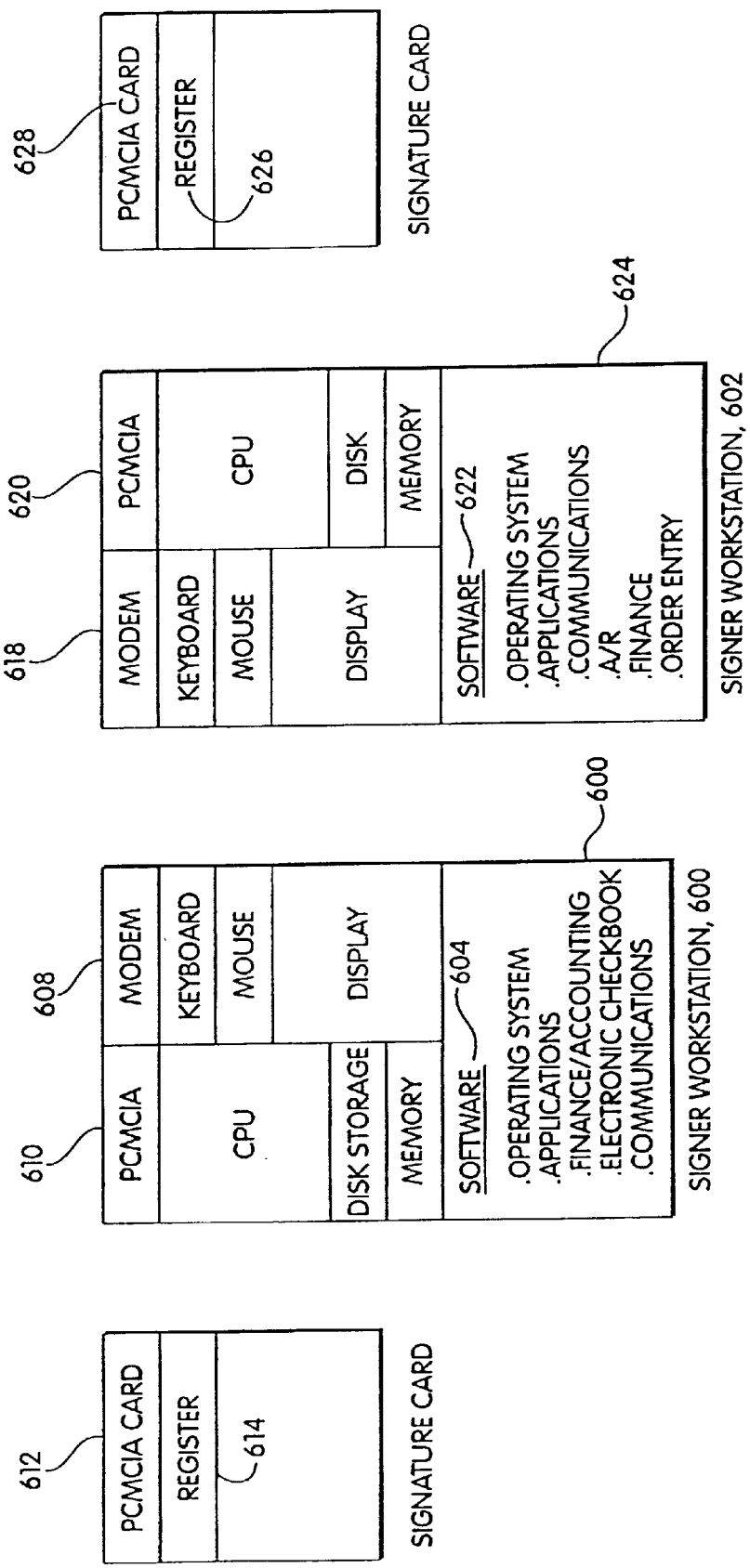
FIG. 27 is a block diagram depicting a computer hardware system for the signatories of a contract.

Referring to FIG. 27, the hardware necessary for participation of a first signer and a second signer in a legal transaction is depicted in which a first signer workstation 600 is provided including a PCMCIA 610, a modem 608, CPU, keyboard, mouse, display, and memory. Residing on the computer is software 604 which includes an operating system as well as a number of applications 606. The applications may include communications applications, database applications and one or more applications for executing transaction documents, such as signature applications. The first signer system may also include a PCMCIA card 612 as well as a register 614 as part of a digital signature card that works in connection with the workstation 600. The second signer has a second signer workstation 602 which is similarly configured in that it includes a modem 618, a PCMCIA 620, a PCMCIA card 628 with a register 626, a keyboard, mouse, CPU, display, disk and memory. Also, the second signer workstation 602 includes software 622 that includes an operating system as well as various applications 624 which include communications, database applications and signature applications, among others. The configuration of hardware and the software are similar to those described in the electronic check embodiment. Additional software for contract preparation and manipulation may also be provided.

Figure 25:
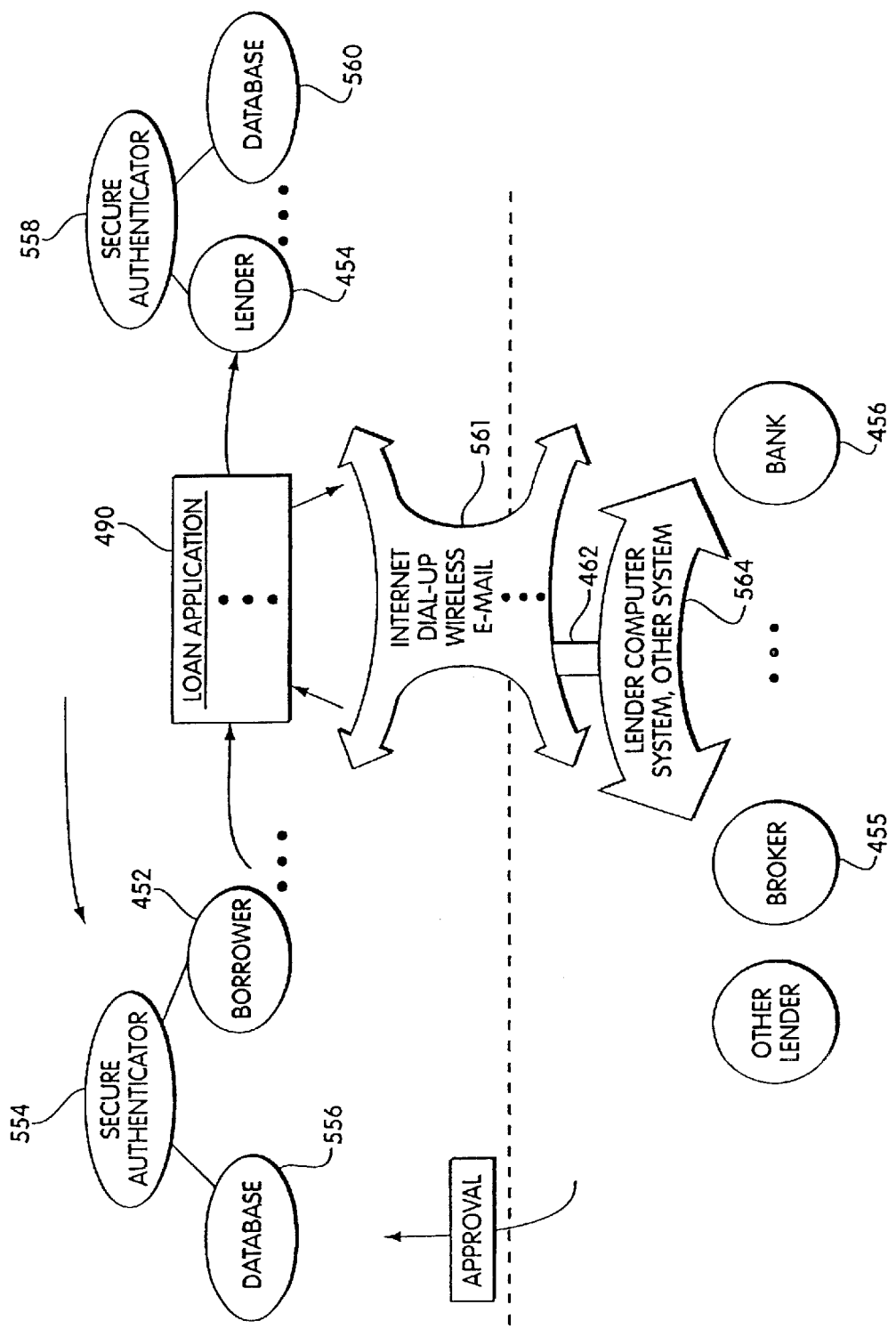
FIG. 25 is a block diagram depicting use of a computer network in a loan application transaction.

As seen in FIG. 25, a mortgage transaction may also take advantage of a network 561. The borrower 452 may sign the loan application 490 with the borrower's secure authenticator 554 which permits a digital signature of the loan application 490. A database 556 of the borrower's system permits the borrower to record the transaction. Once the borrower has signed the loan application 490, it may be transmitted by the network 561 to the lender 454. The lender may digitally sign the loan application 490 using the lender's secure authenticator 558. This transaction may be recorded by the lender's database 560. Once the broker 455 has signed the loan application 490, it may be transmitted via the network 561 through a network connection 462 to a proprietary network or intranet 564 of one or more banking institutions 456. Signatures, authentication, data manipulations, storage and retrieval, and other functions are accomplished in a manner similar to that used for the electronic check.

Figure 28:
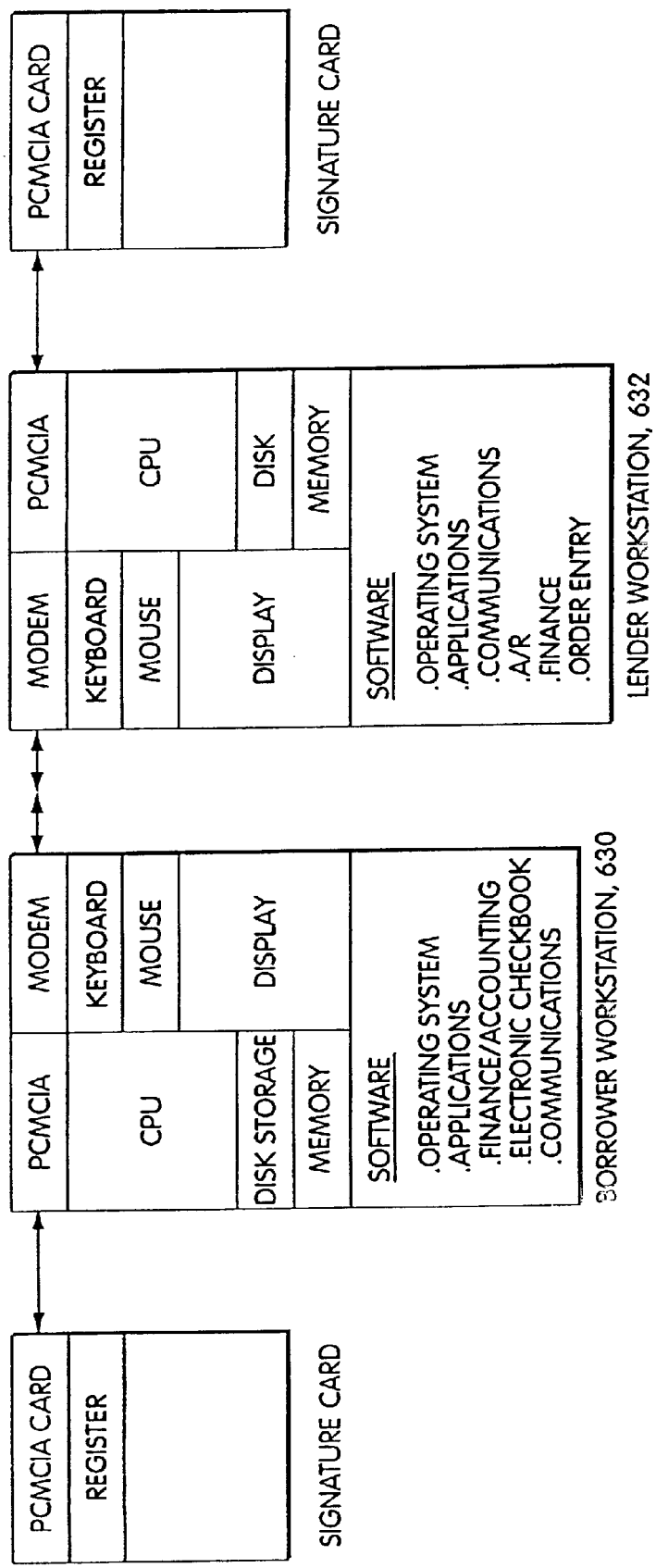
FIG. 28 is a block diagram depicting a computer hardware system for the parties to a loan application transaction.

Referring to FIG. 28, the hardware necessary for participation of the borrower and lender in a mortgage loan transaction is depicted in which a borrower workstation 630 is provided including various components similar to the components required for the electronic check or financial transaction. The lender workstation 632 is similarly configured. Software for preparation and manipulation of loan applications are also located on the workstations 630 and 632.

Figure 26:
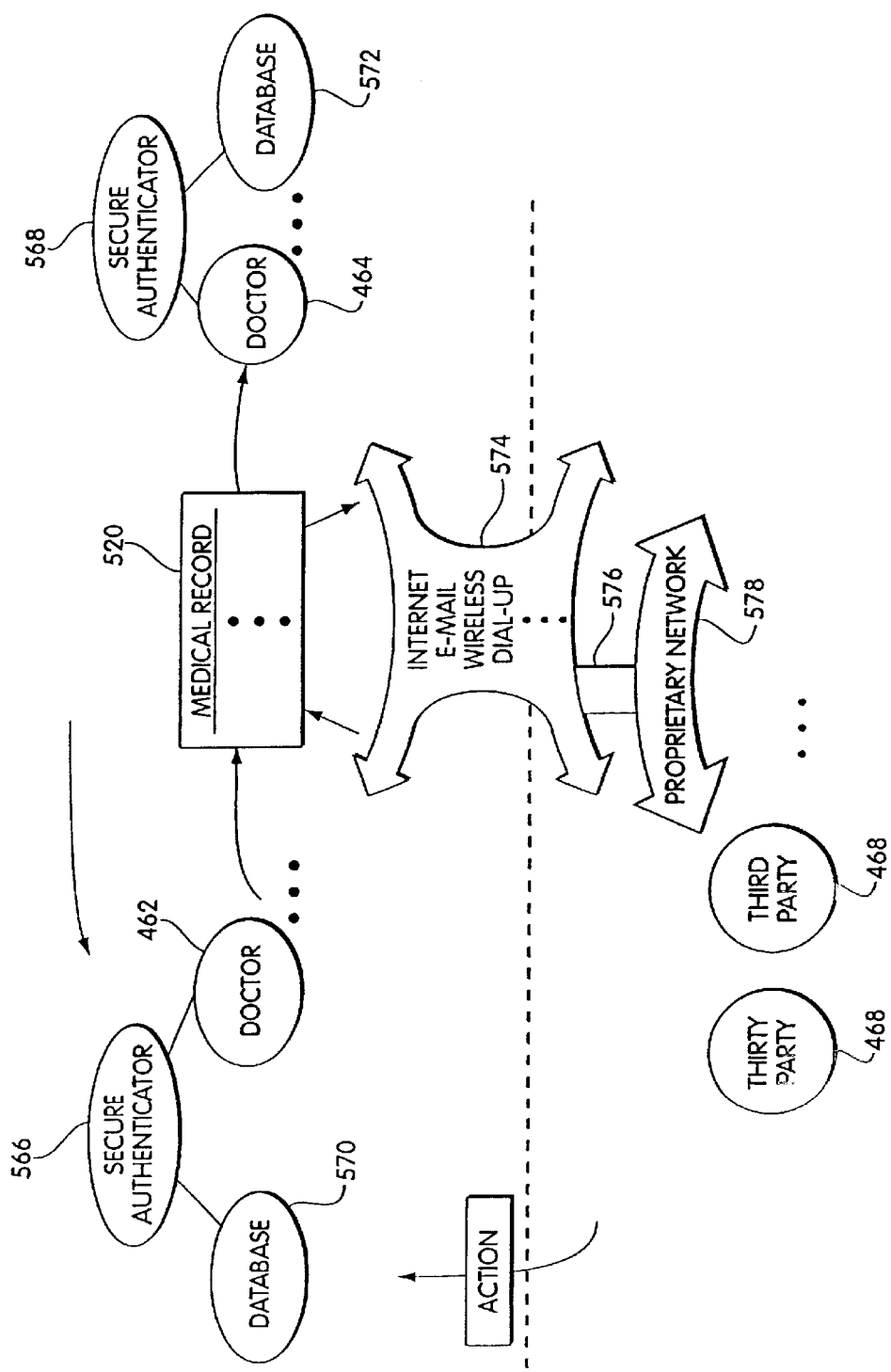
FIG. 26 is a block diagram depicting use of a computer network in a medical record transaction.

Referring to FIG. 26, the transmission of a medical record 520 is depicted wherein a first doctor 462 signs the medical record or a portion thereof 520 with the first doctor's secure authenticator 566 which permits a digital signature of the medical record 520. The signature may then be recorded in a database 570 which is responsive to the first doctor's secure authenticator. Once signed, the medical record 520 may be transmitted to a third party or to a second doctor 464. The second doctor may add material including a signature using the second doctor's secure authenticator 568. The second doctor's database 572 will record the signature and the additional information. Once signed by one or more doctors, the medical record 520 may be sent by a network 574 through a network connection 576 to a proprietary system 578 of one or more third parties 468, which could include an insurance company an administrative, or the like. Signatures, authentication, data manipulations, storage and retrieval, and other functions are accomplished in a manner similar to that used for the electronic check.

Figure 29:
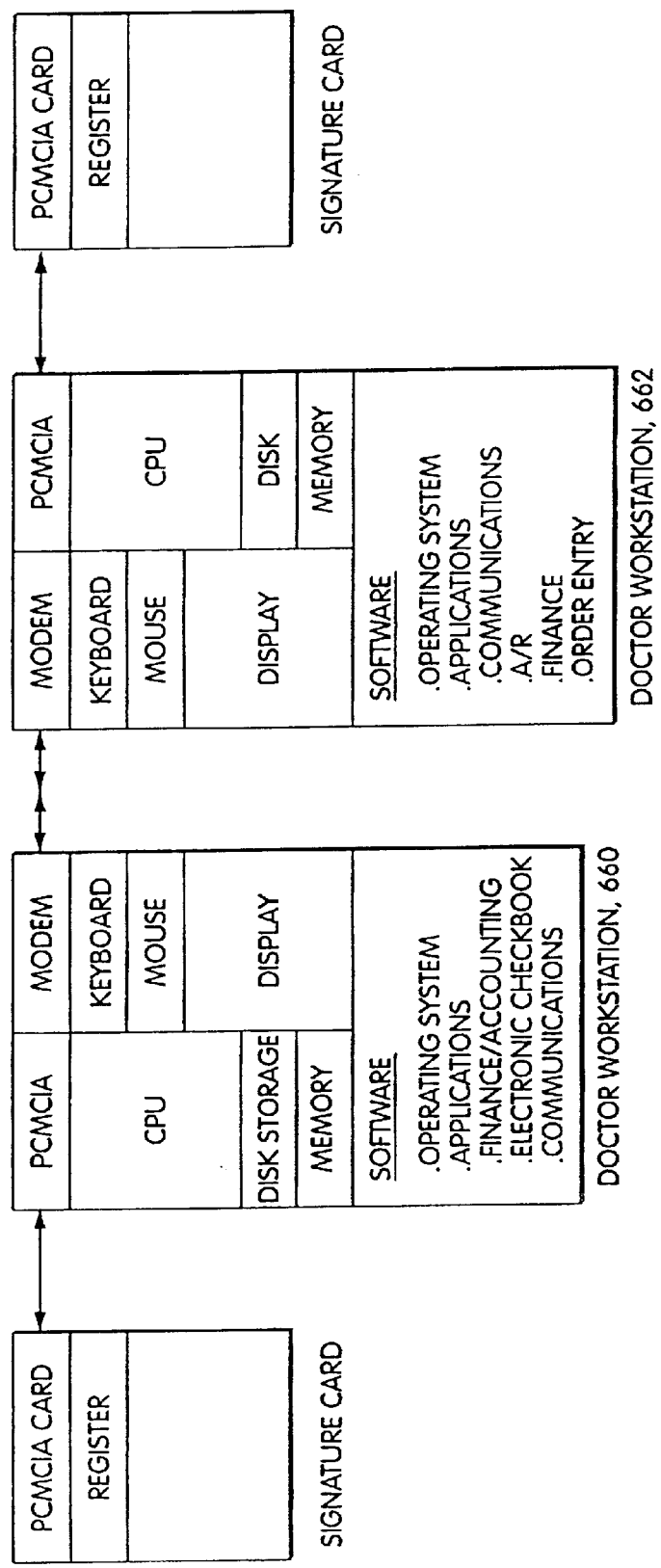
FIG. 29 is a block diagram depicting a computer hardware system for the participants in a medical record transaction.

Referring to FIG. 29, the hardware required for a medical record transaction or transmission is provided in which a first doctor workstation 660 and a second doctor workstation 662 are provided. The workstations are similarly configured to the workstations necessary for other transactions of the present invention, such as an electronic check transaction, or the execution of a contract. Software residing on the workstations 660 and 662 may include applications for creating and manipulating medical records, including wage processing software.

The many features and advantages of the present invention are apparent from the written description and appendices. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A markup language for authenticating a document, the markup language in the form of program code embodied on a computer-readable medium, the markup language comprising instructions to
   determine a document type by the constituent parts of the document and the structure of the document, the document being human readable and machine readable,
   separate the document into blocks,
   assign a digital signature to one or more of the blocks, and,
   insert at least one of a start-tag at a beginning of the blocks and an end-tag at an end of the blocks.

2. The markup language of claim 1, wherein the start-tag and the end-tag enclose the contents of the blocks.

3. The markup language of claim 1, wherein the instructions to assign a digital signature comprise instructions to generate a signature block and bind the blocks with the signature block.

4. The markup language of claim 3, wherein the instructions to bind the blocks comprise instructions to digitally sign the signature block.

5. The markup language of claim 3, wherein the instructions to generate a signature block comp se instructions to
   generate a digital hash of the contents of the blocks,
   generate a combined digital hash of the names of the blocks and the digital hashes of the contents of the blocks, and
   incorporate at least one of the digital hash of the contents of the blacks and the digital hash of the names of the blocks into the signature block.

6. The markup language of claim 3, wherein the instructions to generate a signature block comprise instructions to
   generate a digital hash of e contents of the blocks, and
   incorporate the digital hash of the contents of the blocks into the signature block.

7. The markup language of claim 6, wherein comprising instructions to digitally sign the digital hash of the contents of the blocks to generate a hash signature.

8. The markup language of claim 7, further comprising instructions to incorporate the hash signature into the signature block.

9. The markup language of claim 3, wherein the instructions to generate a signature block comprise instructions to
   generate a digital hash of the contents of the blocks,
   generate a combined digital hash of the names of the blocks and the digital hashes of the contents of the blocks,
   digitally sign the combined digital hash to generate a hash signature, and
   incorporate at least one a the digital hashes of the contents of the blocks, the names of the blocks, and the bash signature into the signature block.

10. The markup language of claim 9, wherein the instructions to generate a digital hash of the contents of the blocks comprise instructions to insert at least one of a start-tag at a beginning of the blocks and an end-tag at an end of the blocks.

11. The markup language of claim 10, wherein the start-tag and the end-tag enclose the content of the blocks.

12. The markup language of claim 10, further comprising instructions to transmit the document from a first programmable digital computer to a second programmable digital computer.

13. The markup language of claim 12, further comprising instructions to accept the document when identified elements of the document type are provided by the constituent parts of the document and the structure of the document.

14. The markup language of claim 12, further comprising instructions to identify at the second compute the document type by the constituent parts of the document and the structure of the document and verify the signature block.

15. The markup language of claim 14, further comprising instructions to append a digital signature to the document.

16. The markup language of claim 15, further comprising instructions to append a certificate to the document to provide a relationship between an owner of the signature and a public key of the owner.

17. The markup language of claim 14, further comprising instructions to verify cryptographically sign certificates appended to the document.

18. A system for authenticating a document, comprising:
a first programmable digital computer, the first programmable digital computer including,
a definition module to determine a document type by the constituent parts of the document and the structure oft document, the document being human readable and machine readable;
a block module to separate the document into blocks, the block module comprising a tag module to insert at least one of a start-tag at a beginning of the blocks and an end-tag at an end of the blocks; and
a signature module to assign a digital signature to one or more of the blocks.

19. The system of claim 18, wherein the start-tag and the end-tag enclose the contents of the blocks.

20. The system of claim 18, wherein the signature module comprises:
a generate module to generate a signature block; and
a join module to bind the plurality of blocks with the signature block.

21. The system of claim 20, wherein the generate module comprises:
a hash module to generate a digital hash of contents of the blocks and a combined digital hash of names of the blocks and e digital hashes of the contents;
a digital signature module to digitally sign the combined digital hash to generate a hash signature; and
a finalizing module to incorporate at least one of the digital hashes of the contents of the blocks, the names of the blocks, d the hash signature into the signature block.

22. The system of claim 21, wherein the join module comprises a second digital signature module t digitally sign the signature block.

23. The system of claim 20, wherein the hash module comprises a tag module to insert at least one of a tart-tag at a beginning of the blocks and an end-tag at an end of the blocks.

24. The system of claim 23, wherein the start-tag and the end-tag enclose the contents of the blocks.

25. The system of claim 23, wherein the first programmable digital computer further includes:
a parser to identify the document type by the constituent parts of the document and the structure of the document; and
an authenticator to verity e signature block of the document.

26. The system of claim 25, wherein the parser comprises an acceptance module to accept the document when identifying elements of the document type are provided by the constituent parts f the document and the structure of the document.

27. The system of claim 25, wherein the authenticator comprises an appending module to append a digital signature to the document.

28. The system of claim 27, wherein the appending module comprises a certifier module to append a certificate to the document providing a relationship between an owner of the digital signature and a public key of the owner.

29. The system of claim 25, wherein the first programmable digital computer further includes a verified module to verify cryptographically signed certificates appended to the document.

30. A markup language for processing a document, the markup language in the form of program code embodied on a computer-readable medium, the markup language comprising instructions to
determine a document type by the constituent parts of the document and the structure of the document, the document being human readable and machine readable, the document associated with blocks and at least one of a start-tag at a beginning of the blocks and an end-tag at an end of the blocks, and
verify a signed portion of e document.

31. The markup language of claim 30, further comprising instructions to append a digital signature to the document.

32. The markup language of claim 31, further comprising instructions to append a certificate to the document to provide a relationship between an owner of the signature and a public key of the owner.

33. The markup language of claim 30, further comprising instructions to verify cryptographically signed certificates appended to the document.

34. The markup language of claim 30, further comprising instructions to accept the document when identifying elements of the document type are provided by the constituent parts of the document and the stricture of the document.

35. A program storage device readable by a machine, tangibly embodying a program of instructions executable by the machine to process a document, comprising:
a typing module to determine a document type by the constituent parts of the document and the structure of the document, the document being human readable and machine readable, where the document is associated with blocks and at least one of a start-tag at a beginning of the blocks and an end-tag at an end of the blocks; and,
a verification module to verify a signed portion of the document.

36. The program storage device of claim 35, further comprising a signature module to append a digital signature to the document.

37. The program storage device of claim 36, further comprising a certification module to append a certificate to the document to provide a relationship between an owner of the digital signature an a public key of the owner.

38. The program storage device of claim 35, further comprising a cryptographic module to verify cryptographically signed certificates appended to the document.

39. The program storage device of claim 35, further comprising an acceptance module to accept the document when identifying elements of the document type are provided by the constituent parts of the document and the structure of the document.

40. A system for processing a document, comprising:
a programmable digital computer, the programmable digital computer including,
a parser to determine a document type by the constituent parts of the document and the structure of the document, the document being human readable and machine readable, where the document is associate with blocks having at least one of a start-tag at a beginning of the blocks and an end-tag at an end of the blocks; and an authenticator verify a signed portion of the document.

41. The system of claim 40, wherein the parser comprises an acceptance module to accept the document when identifying elements of the document type are provided by the constituent parts of the document and the structure of the document.

42. The system of claim 40, wherein the authenticator comprises an appending module to append a digital signature to the document.

43. The system of claim 42, wherein the appending module comprises a certifier module to append a certificate to the document providing a relationship between an owner of the digital signature and a public key of the owner.

44. The system of claim 40, wherein the first programmable digital computer Thither includes a verifier module to verify cryptographically signed certificates appended to the document.

45. A markup language for authenticating a document the markup language in the form of program code embodied on a computer-readable medium, the markup language comprises instructions to parse a document into fields, the document being human readable and machine readable, associate the fields with blocks and at least one of a start-tag at a beginning of the blocks and an end-tap at an end of the blocks, and assign a digital signature of at least one of the blocks.

46. Th markup language of claim 45, wherein the document type includes at least one of a loan application, a contract, a medical record, a prescription, a transcript, a notarized document, and a financial instrument.

47. The markup language of claim 45, wherein the blocks include data associated with a transaction.

48. The markup language of claim 45, wherein the blocks are associated with a logical purpose.

49. The markup language of claim 45, wherein the instructions to assign a digital signature to at least one of the blocks comprise instructions to generate a signature block and bind the signature block with at least one other block.

50. The markup language of claim 45, further comprising instructions to record data associated with the document.

51. Th markup language of claim 45, wherein the blocks include at least one of a type block, a header block, a logged data block, and a contents block.

52. The markup language of claim 51, wherein the header block includes data associated with the version of e document.

53. The markup language of claim 51, wherein the logged data block includes data for storage on a data base.

54. The markup language of claim 51, wherein the contents block includes data associated with a signature.

55. The markup language of claim 53, wherein data for storage include at least one of transaction dates and transaction parties.

56. The markup language of claim 54, wherein data associated with a signature include at least one of a document and a portion of a document.

57. The markup language of claim 51, wherein the type block includes data associated with the document type.

58. A system for authenticating a document, the system comprising:

a first programmable digital computer, the first programmable digital computer including, a parse module to parse the document into fields, the document being human readable and machine readable, an association module to associate the fields with blocks and at least one of a start-tag at a beginning of the blocks and an end-tag at an end of the blocks, and a signature module to assign a digital signature to at least one of the blocks.

59. The system of claim 58, wherein the blocks include data associated with a transaction.

60. The system of claim 58, wherein the blocks are associated with a logical purpose.

61. The system of claim 58, wherein the blocks include at least one of a type block, a header block, a logged data block, and a contents block.

62. The system of claim 61, wherein the header block includes data associated with the version of the document.

63. The system of claim 61, wherein the logged data block includes data for storage on a database.

64. The system of claim 61, wherein the contents block includes data associated with a signature.

65. The system of claim 58, wherein the document type includes at least one of a Joan application, a contract, a medical record, a prescription, a transcript, a notarized document, and a financial instrument.

66. The system of claim 63, wherein data for storage include at least one of transaction dates and transaction parties.

67. The system of claim 64, wherein data associated with a signature include at least one of a document and a portion of a document.

68. The system of claim 58, wherein the signature module comprises a generate module to generate a signature block and join module to bind the signature block with at least one other block.

69. The system of claim 58, wherein the first programmable digital computer further includes a data storage and retrieval device to record data associated with the document.

70. The markup language of claim 51, wherein the type block includes data associated with the document type.

* * * * *